US008531696B2

(12) United States Patent
Sawada et al.

(10) Patent No.: US 8,531,696 B2
(45) Date of Patent: Sep. 10, 2013

(54) MANAGEMENT APPARATUS, MANAGEMENT SYSTEM, AND MANAGEMENT METHOD

(75) Inventors: Masaichi Sawada, Tokyo (JP); Yasushi Nakazato, Tokyo (JP); Kohji Ue, Kanagawa (JP); Mikiko Imazeki, Kanagawa (JP); Osamu Satoh, Kanagawa (JP); Masahide Yamashita, Tokyo (JP); Jun Yamane, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 167 days.

(21) Appl. No.: 13/247,148

(22) Filed: Sep. 28, 2011

(65) Prior Publication Data

US 2012/0075659 A1 Mar. 29, 2012

(30) Foreign Application Priority Data

Sep. 29, 2010 (JP) ................................ 2010-219640

(51) Int. Cl.
*G06K 15/02* (2006.01)

(52) U.S. Cl.
USPC ............................. 358/1.14; 358/1.1; 358/1.9

(58) Field of Classification Search
USPC .......................................... 358/1.1, 1.14, 1.9
See application file for complete search history.

(56) References Cited

U.S. PATENT DOCUMENTS

| | | | | |
|---|---|---|---|---|
| 6,141,507 | A * | 10/2000 | Sawada | 399/8 |
| 7,952,757 | B2 * | 5/2011 | Kaneko et al. | 358/1.9 |

FOREIGN PATENT DOCUMENTS

| | | |
|---|---|---|
| JP | 5-164800 | 6/1993 |
| JP | 2001-175328 | 6/2001 |
| JP | 2003-215986 | 7/2003 |
| JP | 2007-164724 | 6/2007 |
| JP | 3970430 | 6/2007 |
| JP | 2007-298875 | 11/2007 |
| JP | 2009-37141 | 2/2009 |
| JP | 2009-42361 | 2/2009 |
| JP | 2009-206850 | 9/2009 |
| JP | 2010-8617 | 1/2010 |

* cited by examiner

*Primary Examiner* — King Poon
*Assistant Examiner* — Iriana Cruz
(74) *Attorney, Agent, or Firm* — Oblon, Spivak, McClelland, Maier & Neustadt, L.L.P.

(57) ABSTRACT

A management apparatus includes: a receiver that receives, via a network, status data based on control system data for stabilizing image forming from an image forming apparatus formed by image forming units; an inference unit that determines abnormality occurrence symptom, and calculates an index of the abnormality occurrence symptom, of the image forming units based on the received status data; a replacement part information acquisition unit that acquires information including a replacement date from a maintenance management system via the network when receiving a diagnosis request from a terminal of a maintenance person; a judgment table generator that calculates weight information of the symptom determination index value; a integrated diagnostic information generator for the image forming units based on the symptom determination index value and the weight information; and a integrated diagnostic information notification unit transmitting the integrated diagnostic value information to the terminal of the maintenance person.

9 Claims, 33 Drawing Sheets

CHANGE OF CHARACTERISTIC LINE DUE TO LIGHT SCUMMING (SOLID LINE)

FIG.19

| NUMBER OF LEARNING =i | WEAK DETERMINER NO. | FEATURE AMOUNT TO BE REFERRED: Di (REFERENCE AXIS USED FOR STAMP DETERMINATION) | THRESHOLD: bi | DETERMINATION POLARITY: sgn i | WEIGHT: α i |
|---|---|---|---|---|---|
| 1 | FIRST STAMP | C3 | 7 | -1 | 0.895 |
| 2 | SECOND STAMP | C10 | 6 | 1 | 0.804 |
| 3 | THIRD STAMP | C10 | 4 | -1 | 1.47 |
| 4 | FOURTH STAMP | C8 | 12 | 1 | 0.4667031 |
| 5 | FIFTH STAMP | C2 | 8 | -1 | 0.2376683 |
| ⋮ | ⋮ | ⋮ | ⋮ | ⋮ | ⋮ |
| 29 | 29TH STAMP | C6 | 5 | 1 | 0.50110407 |
| 30 | 30TH STAMP | C1 | 7 | -1 | 0.29755588 |
| 31 | 31ST STAMP | C1 | 74 | 1 | 0.37246236 |

FIG.24

| APPARATUS IDENTIFIER | PRODUCT SERIAL NUMBER | RECEIVED YEAR MONTH DAY HOUR MINUTE | TOTAL COUNTER (CUMULATIVE NUMBER OF IMAGES) | Rv1 | Rv2 | Qy | Qm | Qc | Qk | Py | Pm | Pc | Pk | ........... | | |
|---|---|---|---|---|---|---|---|---|---|---|---|---|---|---|---|---|
| L36 | 111111 | 2009/7/1 10:00 | 10500 | 1.5 | 0.5 | 2 | 1.2 | 1.5 | 1.8 | 4.2 | 4 | 4.3 | 4.4 | | | |
| L36 | 111111 | 2009/7/5 11:00 | 12500 | 2 | 1.2 | 1.5 | 1.8 | 4.2 | 4 | 4.3 | 4.4 | 3.8 | 3.7 | | | |
| L36 | 111111 | 2009/7/10 11:00 | 14500 | 2 | 1.2 | 1.5 | 1.8 | 4.2 | 4 | 4.3 | 4.4 | 3.6 | 3.7 | | | |
| | | | | | | | | | | | | | | | | |
| L89 | 222222 | | | ...... | | | ...... | | | ...... | | | | | | |
| L89 | 222222 | | | | | | | | | | | | | | | |
| L89 | 222222 | | | ...... | | | ...... | | | ...... | | | | | | |
| | | | | | | | | | | | | | | | | |
| | | | | ...... | | | ...... | | | ...... | | | | | | |
| | | | | | | | | | | | | | | | | |
| | | | | | | | | | | | | | | | | |

FIG.25

| TOTAL COUNTER | FEATURE AMOUNT (CONDITION DATA Cj) | | | | | | | | | | | | | | | | | |
|---|---|---|---|---|---|---|---|---|---|---|---|---|---|---|---|---|---|---|
| | C1 | C2 | C3 | C4 | C5 | C6 | C7 | C8 | C9 | C10 | FIRST STAMP | SECOND STAMP | THIRD STAMP | FOURTH STAMP | FIFTH STAMP | ...... ... | 30TH STAMP | 31TH STAMP |
| 1000 | 1 | 2 | 4 | 16 | 87 | 7 | 67 | 21 | 6 | 45 | 1 | 1 | -1 | 1 | 1 | ...... ... | -1 | 1 |
| 2000 | 3 | 5 | 8 | 14 | 85 | 4 | 56 | 24 | 7 | 43 | -1 | 1 | -1 | 1 | 1 | ...... ... | -1 | 1 |
| 3000 | 2 | 3 | 10 | 13 | 89 | 7 | 65 | 21 | 4 | 48 | -1 | 1 | -1 | 1 | 1 | ...... ... | -1 | 1 |
| ⋮ | | | ⋮ | | | ⋮ | | | ⋮ | | ⋮ | | ⋮ | | ⋮ | | ⋮ | |

FIG.30

(A) SYMPTOM INDEX VALUE TABLE AT TIME WHEN STATUS DATA IS RECEIVED & SYMPTOM DETERMINATION DIAGNOSIS IS PERFORMED

| APPARATUS IDENTIFIER | | SYMPTOM DETERMINATION YEAR MONTH DAY HOUR MINUTE | SYMPTOM DETERMINATION VALUE (DIAGNOSTIC VALUE: F VALUE) FOR EACH UNIT | | | | | |
|---|---|---|---|---|---|---|---|---|
| APPARATUS IDENTIFIER | SERIAL No. | | PHOTO-SENSITIVE ELEMENT (Y) | PHOTO-SENSITIVE ELEMENT (M) | PHOTO-SENSITIVE ELEMENT (C) | PHOTO-SENSITIVE ELEMENT (K) | DEVELOPING UNIT (K) | ... ... ... ... ... |
| L36 | 111111 | 2010/3/1 10:25:10 | 5 | -2 | 3 | 1 | 4 | ... ... ... ... ... |

(B) CONVERSION TABLE OF DIAGNOSTIC VALUE (F VALUE) INFORMATION

| APPARATUS IDENTIFIER | SYMPTOM DETERMINATION YEAR MONTH DAY HOUR MINUTE | SYMPTOM DETERMINATION VALUE (DIAGNOSTIC VALUE: F VALUE) FOR EACH UNIT | | | | | | |
|---|---|---|---|---|---|---|---|---|
| | | [POSITIVE MAX VALUE] | [NEGATIVE MIN VALUE] | PHOTOSENSITIVE ELEMENT (Y) | | PHOTOSENSITIVE ELEMENT (M) | | |
| | | | | D1MAX VALUE | D1MIN VALUE | D2MAX VALUE | D2MIN VALUE | ... ... ... ... ... |
| L36 | 2010/3/1 10:25:10 | 12 | -6 | 5 | 3 | 10 | -2 | ... ... ... ... ... |
| M09 | 2010/2/20 11:05:10 | 5 | -2 | 3 | 1 | 4 | -1 | ... ... ... ... ... |
| V15 | 2010/2/1 12:00:10 | 7 | -3 | 6 | -2 | 5 | 1 | ... ... ... ... ... |
| | | | | | | | | ... ... ... ... ... |
| ⋮ | ⋮ | | ⋮ | | ⋮ | | | ⋮ ⋮ |
| | | | | | | | | ... ... ... ... ... |

(C) INFORMATION TABLE OF DIAGNOSTIC VALUE (F VALUE) AFTER CONVERSION (INFORMATION FROM DIAGNOSTIC VALUE INFORMATION GENERATOR & STORAGE UNIT FOR EACH UNIT)

| APPARATUS IDENTIFIER | | SYMPTOM DETERMINATION YEAR MONTH DAY HOUR MINUTE | SYMPTOM DETERMINATION VALUE (DIAGNOSTIC VALUE: F VALUE) FOR EACH UNIT | | | | | |
|---|---|---|---|---|---|---|---|---|
| APPARATUS IDENTIFIER | SERIAL No. | | PHOTO-SENSITIVE ELEMENT (Y) | PHOTO-SENSITIVE ELEMENT (M) | PHOTO-SENSITIVE ELEMENT (C) | PHOTO-SENSITIVE ELEMENT (K) | DEVELOPING UNIT (K) | ... ... ... ... ... |
| L36 | 111111 | 2010/3/1 10:25:10 | 11 | -3 | 4 | 5 | 3 | ... ... ... ... ... |
| M09 | | 2010/2/20 11:05:10 | 7 | -1 | 2 | 4 | 5 | ... ... ... ... ... |
| V15 | | 2010/2/1 12:00:10 | 6 | -5 | 3 | -2 | 4 | ... ... ... ... ... |
| | | | | | | | | ... ... ... ... ... |
| ⋮ | | ⋮ | | ⋮ | | ⋮ | | ⋮ ⋮ |
| | | | | | | | | ... ... ... ... ... |

FIG.31

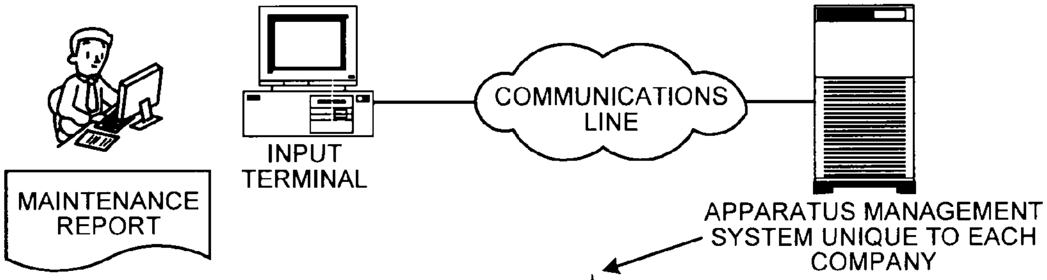

| CUSTOMER ID | MODEL NO. | PRODUCT SERIAL NUMBER | MAINTENANCE DATE AND TIME | VISIT PURPOSE CATEGORY | TOTAL COUNT INFORMATION | REPLACED PART | ROM INFORMATION | MAINTENANCE ITEMS |
|---|---|---|---|---|---|---|---|---|
| A111 | L36 | 111111 | 20100201 | PREVENTIVE MAINTENANCE | 15500 | PHOTOSENSITIVE ELEMENT (Y),(M) (2) DEVELOPING UNIT (K) (1) | B213h MAIN CONTROL | PART REPLACEMENT· ROM REPLACEMENT· CLEANING· IMAGE QUALITY ADJUSTMENT |
| A111 | L36 | 111111 | 20100215 | URGENT FAILURE | 17800 | REGISTRATION ROLLER (1) | | PART REPLACEMENT |
| E555 | M09 | 777777 | 20100115 | PREVENTIVE MAINTENANCE | 25700 | PHOTOSENSITIVE ELEMENT (K) (2) TRANSFER BELT (1) CLEANING ROLLER (2) | B432k CONTROLLER | PART REPLACEMENT· ROM REPLACEMENT· CLEANING· IMAGE QUALITY ADJUSTMENT |
| E555 | M09 | 777777 | 20100215 | URGENT FAILURE | 35800 | REGISTRATION ROLLER (1) | | PART REPLACEMENT |
| E123 | V15 | 555555 | 20100110 | PREVENTIVE MAINTENANCE | 54500 | PHOTOSENSITIVE ELEMENT (K) (4) | | PART REPLACEMENT· QUALITY ADJUSTMENT |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |

MANAGEMENT APPARATUS, MANAGEMENT SYSTEM, AND MANAGEMENT METHOD

CROSS-REFERENCE TO RELATED APPLICATIONS

The present application claims priority to and incorporates by reference the entire contents of Japanese Patent Application No. 2010-219640 filed in Japan on Sep. 29, 2010.

BACKGROUND OF THE INVENTION

1. Field of the Invention

The present invention relates to a management apparatus, a management system, and a management method of an image forming apparatus.

2. Description of the Related Art

Various inventions have been proposed that predict occurrence of abnormality based on status information of an image forming apparatus and effectively manage service operation of the image forming apparatus.

For example, Japanese Patent Application Laid-open No. 2003-215986 discloses a system that predicts an occurrence of abnormality based on the number of times of abnormal events. Japanese Patent Application Laid-open No. H5-164800 discloses a diagnosing method and a diagnosing apparatus that summarize abnormality occurrence information and status information relating to the occurrences of abnormality of copying machines, and find a common cause in particular abnormalities by statistically processing the information. Japanese Patent Application Laid-open No. 2001-175328 discloses a technique by which a copying machine identifies the cause of an occurrence of abnormality by integrating information on sensors, counters, or the like provided to the copying machine.

In the system disclosed in Japanese Patent Application Laid-open No. 2003-215986, the collected information is limited to the number of occurrence times of abnormal events. As a result, predictable abnormalities are limited to certain types.

In the invention disclosed in Japanese Patent Application Laid-open No. H5-164800, information obtained from the copying machines is transmitted to a server through a network, causing the load imposed on the network to increase. In addition, the server needs to have a high computational power for intensively processing the information from a large number of copying machines in the market, resulting in an increase in system establishment costs.

In the invention disclosed in Japanese Patent Application Laid-open No. 2001-175328, the load on a management system is small because abnormality occurrence symptom determination is performed inside the copying machine. However, the invention also employs a technique requiring a high computational power, such as a neural network prediction and the Bayesian inference, as another abnormality occurrence symptom determination method. Thus, the load on a processing unit and a storage unit included in the copying machine is increased. As a result, other operations performed by the copying machine, such as image processing and mechanical control, may be adversely affected to cause processing delay and a decrease in processing speed, for example.

Japanese Patent Application Laid-open No. 2009-037141 discloses a management apparatus developed aiming to solve the above-described problems and enable determination of a symptom that may lead to a likely occurrence of abnormality. The management apparatus receives a plurality of types of status data from an image forming apparatus, stores the data in a database having status data, generates a plurality of types of target data for abnormality occurrence symptom determination based on the plurality of types of status data, determines whether the plurality of types of target data exceed reference values set for each of a corresponding type of status data, and determines whether abnormality occurrence symptom is present or absent for the whole of the plurality of types of status data based on majority decision by weighting a determination result for each type of status data using a weight set for each type of status data.

Various maintenance operations are performed on image forming apparatuses by each of manufacturer thereof so that the apparatuses can be used in good conditions. When receiving a request, from a customer of an image forming apparatus, of maintenance operation related to a failure such as an image defect, a maintenance person estimates the cause of a phenomenon such as the image defect based on the contents of the latest maintenance operations, the types of parts or consumable parts having been replaced recently, and the characteristics of the apparatus, for example.

Then, typically, the maintenance person reproduces the failure and eliminates the failure at the site of the customer who has requested the maintenance operation. In some cases, a test is required to reproduce a condition in which various causes leading to the phenomenon such as the image defect occur, making it difficult to identify the root cause of the failure.

When a remote diagnosing system is connected to the image forming apparatus, history of information relating to an image control voltage for image forming can be checked with a central management apparatus of the remote diagnosing system. The current remote diagnosing system, however, stores therein only notification history of abnormal phenomena, and no information history relating to the image control voltage for image forming performed every day at a scheduled time or after a fixed number of printouts is completed. Therefore, it is difficult to accurately identify the cause of the image defect.

In particular, the image control voltage varies for every printing due to the sensitivity change of a consumable part, and also varies when the consumable part is replaced with a new part, because the new part has different sensitivity from the old part. Therefore, it is difficult to accurately estimate the cause of the failure such as the image defect at the customer site even if past maintenance operation results are known.

For example, even when the reproducibility of a phenomenon of a broken apparatus is confirmed at a customer site, the cause of a defect is identified as a drum failure due to deterioration, for example, and the image defect is eliminated by replacing the deteriorated drum with a new drum, the image defect due to drum deterioration may occur again within several days although the failure is temporarily eliminated by replacement of the drum if the root cause of the defect is early deterioration of the drum due to abnormal output of an electric charger, for example.

SUMMARY OF THE INVENTION

It is an object of the present invention to at least partially solve the problems in the conventional technology.

According to an aspect of the present invention, there is provided a management apparatus, including: a receiver that is connected to a network and receives a plurality of pieces of status data based on control system data for stabilizing image forming from an image forming apparatus forming an image by a plurality of image forming units operating in conjunction with each other; an inference unit that determines abnormality occurrence symptom of each of the image forming units based on the plurality of pieces of received status data, and calculates a symptom determination index value representing an index of the abnormality occurrence symptom of each of the image forming units; a replacement part information acquisition unit that acquires, when receiving a diagnosis request from a terminal of a maintenance person maintaining the image forming apparatus, replacement part information including a replacement date of the image forming unit from a maintenance management system connected to the network; a judgment table generator that calculates weight information with respect to the symptom determination index value based on the acquired replacement part information; a integrated diagnostic information generator that calculates integrated diagnostic value information for each of the image forming units based on the symptom determination index value and the weight information; and a integrated diagnostic information notification unit that transmits the integrated diagnostic value information to the terminal of the maintenance person.

According to another aspect of the present invention, there is provided a management system, including: a plurality of image forming apparatuses; and a management apparatus connected to the image forming apparatuses with a network. Each of the image forming apparatuses includes a transmitter that transmits a plurality of pieces of status data based on control system data for stabilizing image forming to the management apparatus. The management apparatus includes: a receiver that receives the pieces of status data; an inference unit that determines abnormality occurrence symptom of each of the plurality of image forming apparatuses based on the pieces of received status data, and calculates a symptom determination index value representing an index of the abnormality occurrence symptom of each of the image forming apparatuses; a replacement part information acquisition unit that acquires, when receiving a diagnosis request from a terminal of a maintenance person maintaining the image forming apparatus, replacement part information including a replacement date of each of the image forming apparatuses from a maintenance management system connected to the network; a judgment table generator that calculates weight information with respect to the symptom determination index value based on the acquired replacement part information; a integrated diagnostic information generator that calculates integrated diagnostic value information for each of the image forming apparatuses based on the symptom determination index value and the weight information; and a integrated diagnostic information notification unit that transmits the integrated diagnostic value information to the terminal of the maintenance person.

According to still another aspect of the present invention, there is provided a management method performed by a management apparatus, the method including: receiving a plurality of pieces of status data based on control system data for stabilizing image forming from an image forming apparatus forming an image by a plurality of image forming units operating in conjunction with each other through a network with which the image forming apparatus is connected; determining abnormality occurrence symptom of each of the image forming units based on the pieces of received status data, and calculating a symptom determination index value representing an index of the abnormality occurrence symptom of each of the image forming units; acquiring, when receiving a diagnosis request from a terminal of a maintenance person maintaining the image forming apparatus, replacement part information including a replacement date of the image forming unit from a maintenance management system connected to a network; calculating weight information with respect to the symptom determination index value based on the acquired replacement part information; calculating integrated diagnostic value information for each image forming unit based on the symptom determination index value and the weight information; and transmitting the integrated diagnostic value information to the terminal of the maintenance person.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 19 is a table exemplarily illustrating reference values b used for abnormality occurrence tendency determination of target data and weight values attached to the abnormality occurrence tendency of the target data in calculation of an abnormality occurrence symptom determination index value F in abnormality occurrence symptom determination;

FIG. 24 is an explanatory view illustrating an example of the status data registered in a status database for each apparatus identifier;

FIG. 25 is a schematic diagram illustrating an example of a tendency determination table;

FIGS. 30A, 30B, and 30C are explanatory tables illustrating examples of symptom determination index values before conversion, during conversion, and after conversion;

FIG. 31 schematically illustrates maintenance management operation and entries of maintenance reporting;

DETAILED DESCRIPTION OF THE PREFERRED EMBODIMENTS

Embodiments of a management apparatus, a management system, and a management method of an image forming apparatus according to the present invention are described in detail below with reference to the accompanying drawings.

First Embodiment

Figure 1:
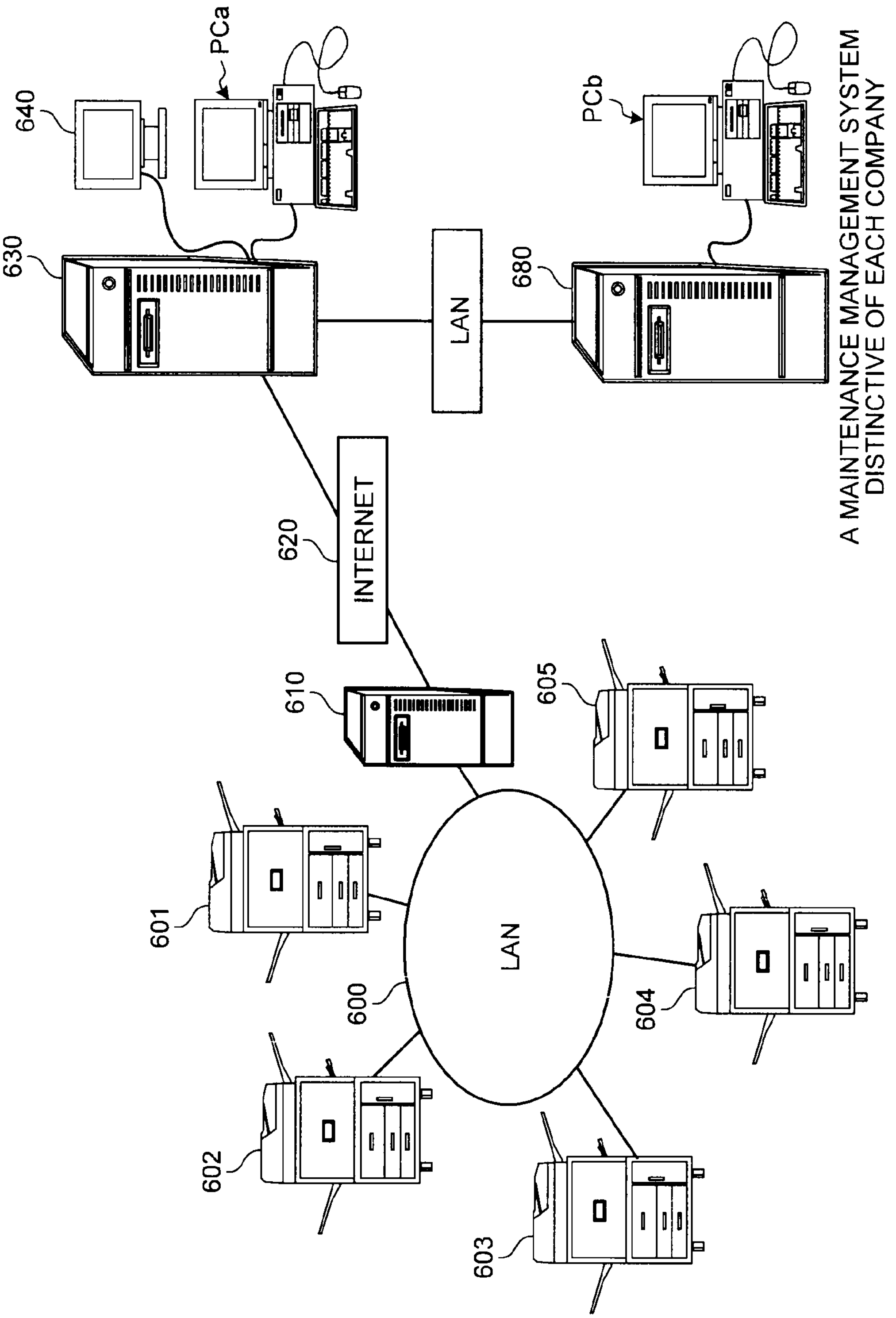
FIG. 1 is a block diagram illustrating an overview of a management system of a first embodiment.

FIG. 1 is a schematic example of a copying machine management system including a multifunction copying machine 601 according to a first embodiment. The copying machine 601 is an image forming apparatus connected to copying machines 602 to 605 each having the same function as the copying machine 601 through a LAN 600, and is connected to a management apparatus 630 outside the LAN 600 through the Internet 620. The management apparatus 630 is connected to a maintenance management system 680 distinctive of each company through a network such as the Internet. The maintenance management system 680 stores therein information on working record of maintenance operation performed by the maintenance person, information on a replacement part, and the like. The information can be read at any time from the maintenance management system 680.

Each copying machine transmits status data representing the current status of the copying machine to the management apparatus 630 at designated operational timing (at which the cumulative number of printouts exceeds a set value, and immediately after an operating voltage is turned on or after printing operation is completed).

The management apparatus 630 includes a database that accumulates therein status data for an identifier of the apparatus (an apparatus identifier and information on the serial number of a product). The management apparatus 630 reads status data from the database for the identifier of the apparatus, and performs abnormality occurrence symptom determination for each of a plurality of copying machines to be managed by using an abnormality occurrence symptom determination system (PAD in FIG. 15). The abnormality occurrence symptom determination system performs a diagnosis for each of a plurality of image forming units (image forming functional parts).

The management apparatus 630 performs abnormality occurrence symptom determination for each image forming unit (for each image forming functional part) upon receiving status information transmitted from the apparatus at every time a certain number of printouts are output (or at every time a certain length of a time interval elapses), and stores a symptom determination index value F (also referred to as a F value or a diagnostic value) of each image forming unit, which is information of a temporarily calculated result, in a diagnostic value information storage unit for each unit described later, for each apparatus identifier together with a day entry ((3) in FIG. 30).

The management apparatus 630 is connected to the maintenance management system 680 distinctive of each company through a network such as the Internet. The maintenance management system 680 stores therein information on working record of maintenance operation performed by the maintenance person, replacement part information, for example. The information can be read at any time from the maintenance management system 680.

The management apparatus 630 reads information on the maintenance date and the replacement part information at the maintenance from the maintenance management system 680 and determines, based on the acquired replacement part information and the information on the maintenance date, a difference in dates between a date when the replacement part information and the information on the maintenance date have been acquired and another date when the maintenance person requests information. The management apparatus 630 weighs the replacement part information based on the determination result, combines symptom diagnostic value information and weighted replacement part information for each unit, and diagnoses again based the combined information. When a maintenance person requests the management apparatus 630 to acquire abnormality occurrence symptom determination value information for each unit, the management apparatus 630 provides the information diagnosed again based on the symptom diagnostic value information and the weighted replacement part information in the order from high priority to low priority.

A computer PCa controlled by an operator is connected to the management apparatus 630. The operator uses the computer PCa to, based on status data of each copying machine stored in the database of the management apparatus 630, newly create or correct a abnormality occurrence symptom determiner (FIG. 18) and a symptom determination reference data table (FIG. 19), newly add the abnormality occurrence symptom determiner and the symptom determination reference data table to the management apparatus 630, delete an existing abnormality occurrence symptom determiner and a symptom determination reference data table of the management apparatus 630, and such, to update the abnormality occurrence symptom determination system (PAD in FIG. 15) of the management apparatus 630.

Figure 2:
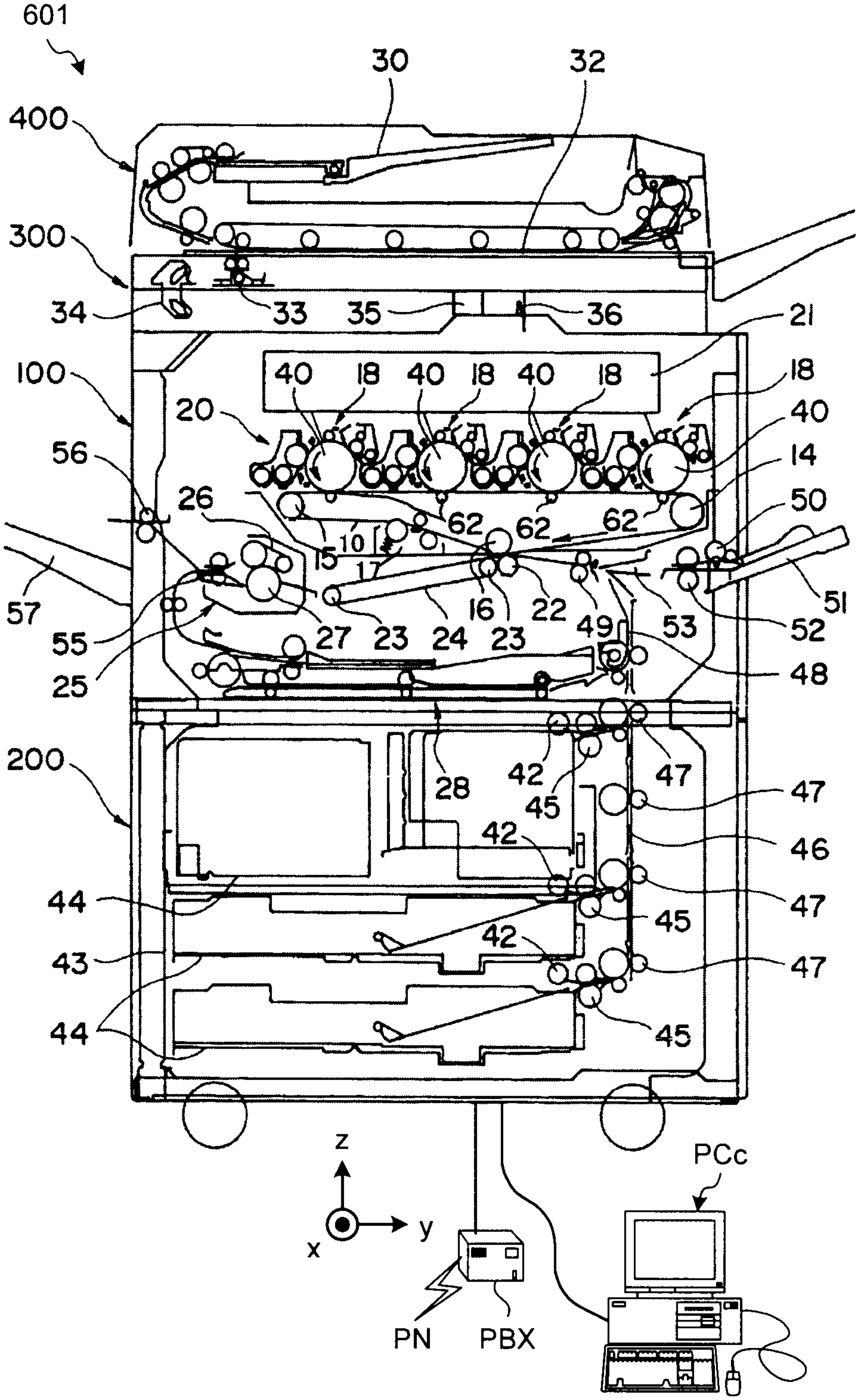
FIG. 2 is a cross-sectional view along the vertical direction illustrating a structural overview of a multifunction color copying machine 601 illustrated in FIG. 1.
Figure 3:
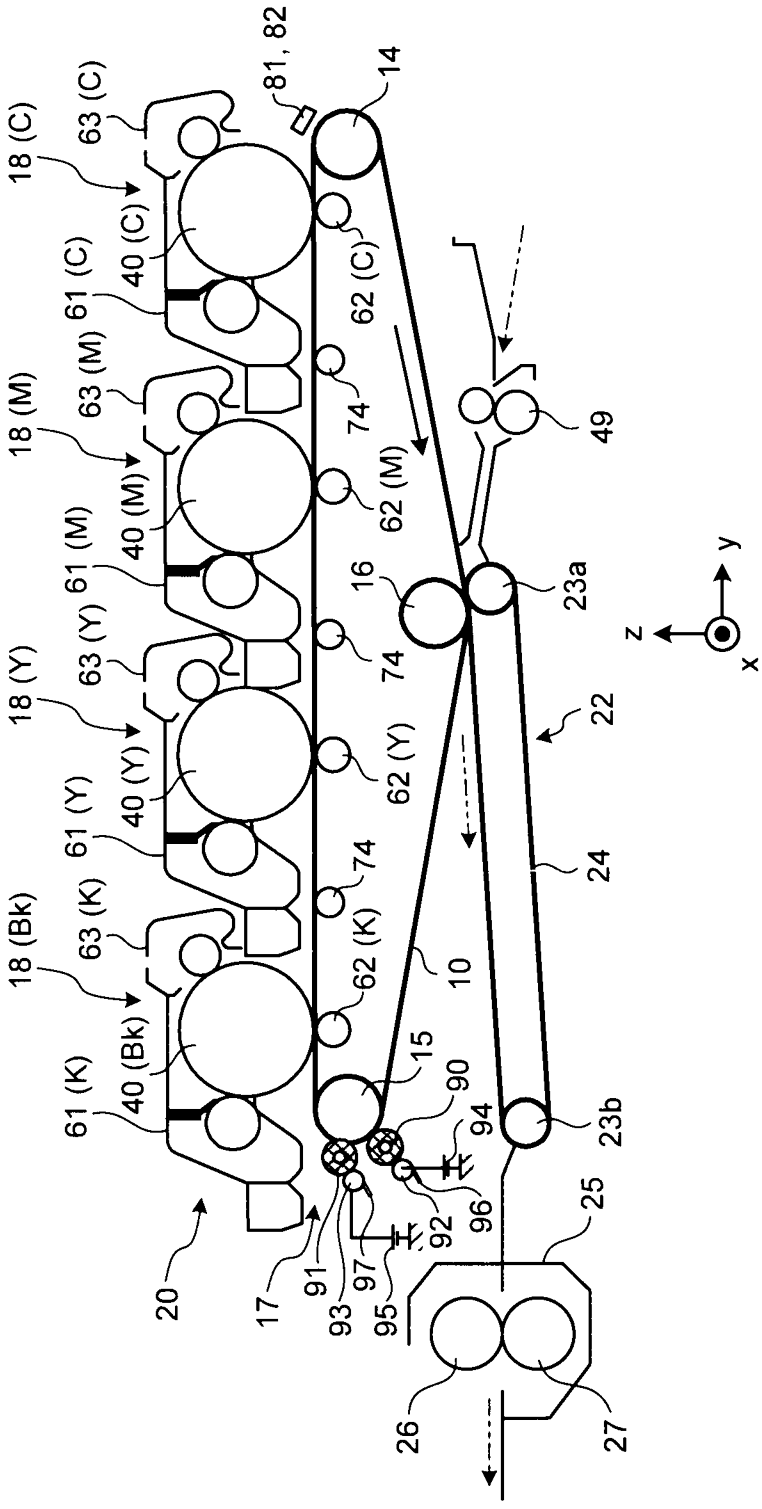
FIG. 3 is a cross-sectional view along the vertical direction illustrating an enlarged view of an intermediate transfer belt 10 illustrated in FIG. 2 and mechanical elements around thereof.
Figure 4:
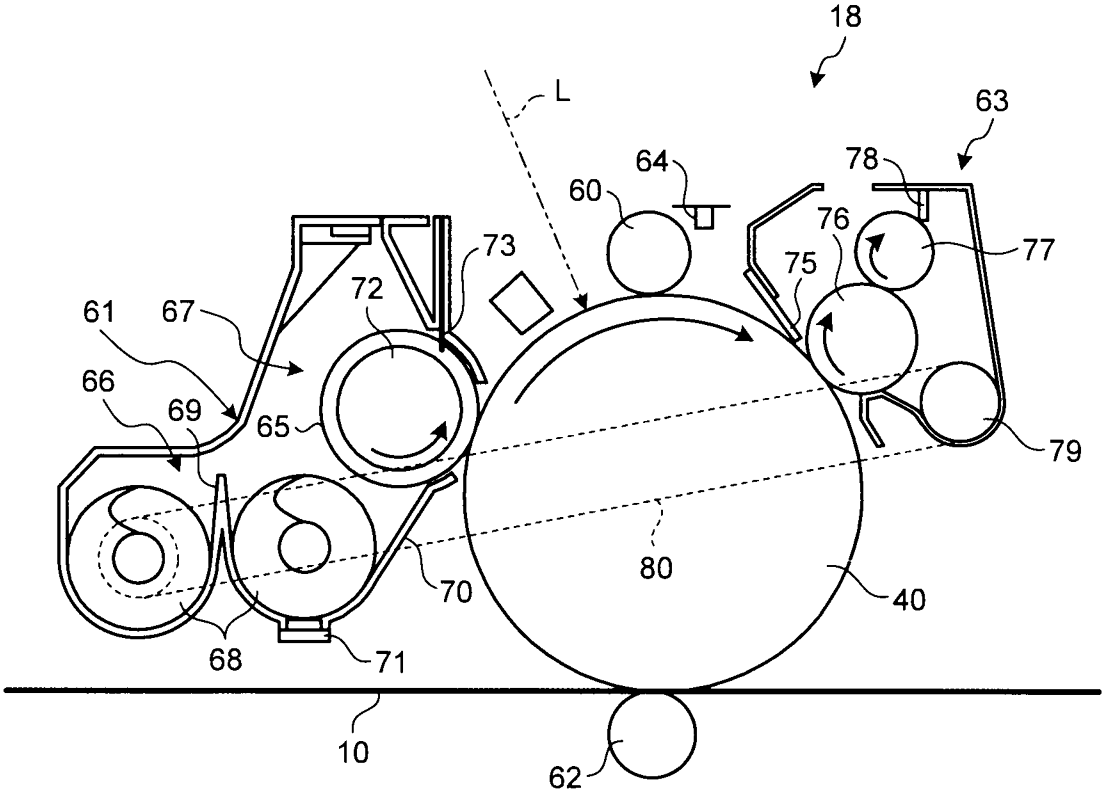
FIG. 4 is an enlarged cross-sectional view illustrating a common structure to four sets of image forming units illustrated in FIG. 3.
Figure 8:
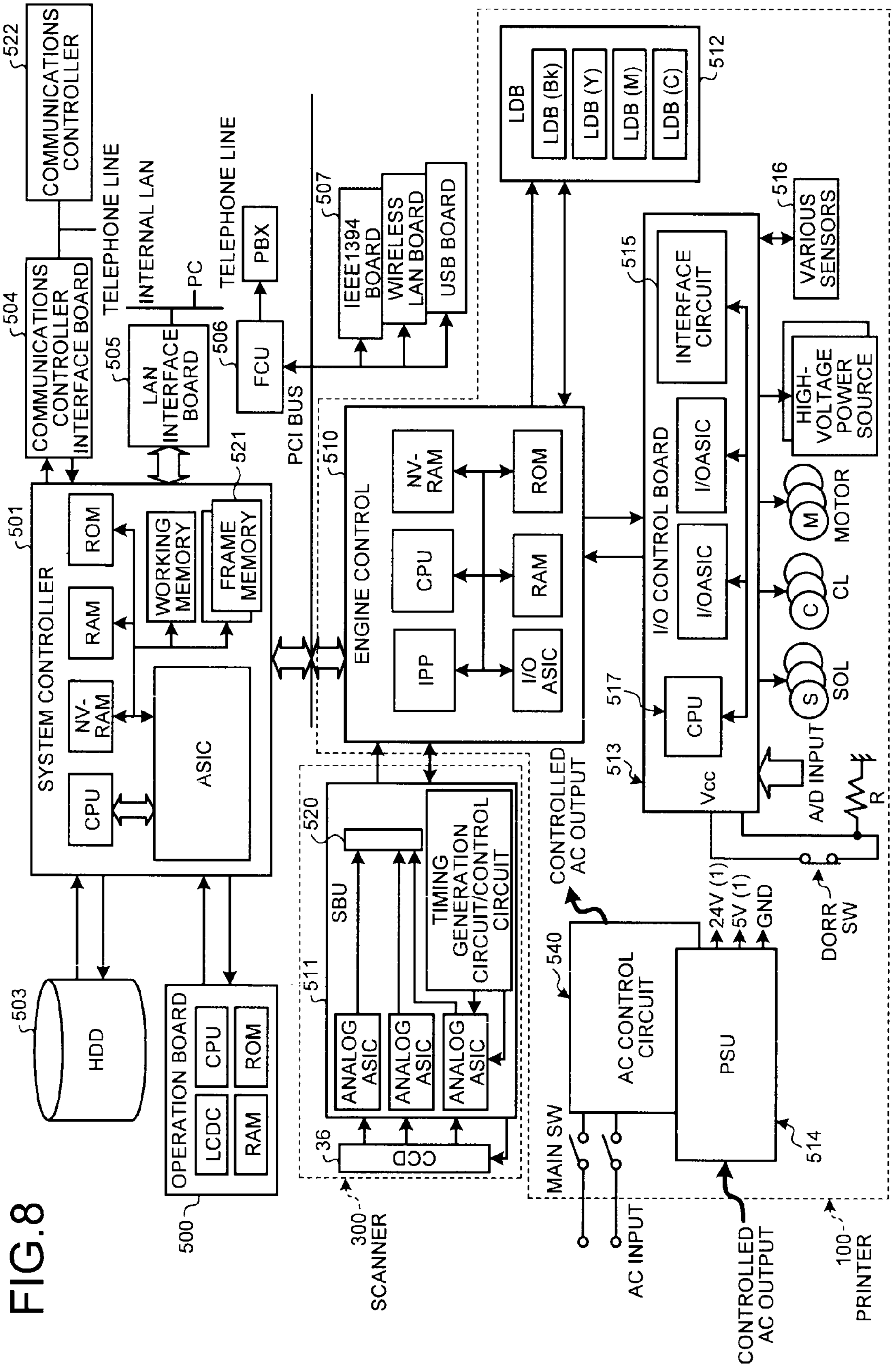
FIG. 8 is a block diagram illustrating an overview of an image processing system of the copying machine illustrated in FIG. 2.

FIG. 2 is a schematic diagram illustrating a structural overview of the copying machine 601. The copying machine 601 includes an image forming unit formed by a printer 100 and a paper feeding unit 200, a scanner 300, and an automatic document feeder (ADF) 400. The scanner 300 is mounted on the printer 100, and the ADF 400 is mounted on the scanner 300. The scanner 300 reads image information of an original placed on an exposure glass 32 by a scanning sensor (charge coupled device (CCD) in the embodiment) 36, and transmits the read image information to an image processing processor (hereinafter, simply referred to as IPP) of an engine control 510 (FIG. 8). The engine control 510, based on the image information received from the scanner 300, controls a laser and a light-emitting diode (LED) arranged inside an exposure device 21 of the printer 100 (the laser and the LED are not illustrated) to irradiate four drum-shaped photosensitive elements 40 (K, Y, M, C: FIG. 3) with laser writing light L (FIG. 4). Static latent images are formed on the surfaces of the photosensitive elements 40 (K, Y, M, C) by the irradiation. The latent images are developed into toner images after being subjected to a predetermined developing process. The additional characters K, Y, M, and C assigned to the reference numerals represent, respectively, black, yellow, magenta, and cyan.

The printer 100 includes a primary transfer rollers 62 (K, Y, M, C) and a secondary transfer device 22 that serve as transfer units, a fixing device 25, a discharging device, a toner supplying device, and a toner disposal device (not illustrated), in addition to the exposure device 21 that is an exposure unit. The paper feeding unit 200 includes an automatic paper feeding unit provided under the printer 100, and a manual paper feeding unit provided on the side surface of the printer 100. The automatic paper feeding unit includes three paper feed cassettes 44 arranged in a paper bank 43 in a step manner, a paper feeding roller 42 sending out a transfer sheet serving as a recording medium from the paper feed cassette 44, and a separating roller 45 that separates the sent out transfer sheet and sends the transfer sheet to a paper feeding path 46. The automatic paper feeding unit also includes a carriage roller 47 that conveys the transfer sheet to a paper feeding path 48 of the printer 100. On the other hand, the manual paper feeding unit includes a manual paper feeding tray 51, a separation roller 52 that separates transfer sheets on the manual paper feeding tray 51 one by one toward a manual paper feeding path 53.

A registration roller pair 49 is disposed near an end of the paper feeding path 48 of the printer 100. The registration roller pair 49 receives the transfer sheet conveyed from the paper feed cassette 44 or the manual paper feeding tray 51, and thereafter feeds the transfer sheet at predetermined operational timing to a secondary transfer nip formed between an intermediate transfer belt 10 serving as an intermediate transfer body and the secondary transfer device 22.

When making a copy of a color image with the copying machine 601, the operator sets an original on an original table 30 of the ADF 400. Alternatively, the operator opens the ADF 400 and sets an original on the exposure glass 32 of the scanner 300, and thereafter closes the ADF 400 to hold the original. Then, the operator presses a start button (not illustrated). When the start switch is pressed, the scanner 300 starts operation after the original is conveyed onto the exposure glass 32 if the original is set on the original table 30 of the ADF 400 whereas the scanner 300 starts operation immediately after the start button is pressed if the original is placed on the exposure glass 32. Then, a first carriage 33 and a second carriage 34 move. Light transmitted from a light source of the first carriage 33 is reflected by the surface of the original, and thereafter is routed toward the second carriage 34. The reflected light is further reflected by a mirror of the second carriage 34 to pass through an imaging lens 35, and reaches the scanning sensor 36, by which the light is read as image information.

After image information is read in this way, the printer 100 causes a drive motor (not illustrated) to rotate one of supporting rollers 14, 15, and 16, and other two supporting rollers to be driven to rotate. The rotating rollers stretch to support the intermediate transfer belt 10 serving as the intermediate transfer body, and move the intermediate transfer belt 10 in an endless manner. In addition, the above-described laser writing and a developing process to be described later are performed. Monochromatic images of black, yellow, magenta, and cyan are formed on the respective photosensitive elements 40 (K, Y, M, C) that are in rotation. The respective color images are sequentially superposed one after another by means of electrostatic transfer at respective primary transfer nips for K, Y, M, and C where the respective photosensitive elements 40 (K, Y, M, C) and the intermediate transfer belt 10 come into contact with each other to form a four-color superposed toner image. In this way, the respective color toner images are formed on the photosensitive elements 40 (K, Y, M, C).

The paper feeding unit 200 allows any one of three paper feeding rollers to rotate so as to feed the transfer sheet having an appropriate size according to the image information read by the scanning sensor 36, and guides the transfer sheet to the paper feeding path 48 of the printer 100. The transfer sheet guided to the paper feeding path 48 is nipped by the registration roller pair 49 to be halted once. Then, by keeping operational timing, the transfer sheet is fed into the secondary transfer nip where the intermediate transfer belt 10 and a first secondary transfer roller 23*a*, which is one of a pair of secondary transfer rollers 23*a* and 23*b*, of the secondary transfer device 22 are in contact with each other. The four-color superposed toner image on the intermediate transfer belt 10 and the transfer sheet are made, in a synchronized manner, to come into tight contact with each other at the secondary transfer nip. Caused by a transfer electric field formed in the nip and a nip pressure, the four-color superposed toner image is secondary-transferred onto the transfer sheet and, coupled with the white background color of the transfer sheet, a full-color image is formed.

The transfer sheet after passing through the secondary transfer nip is fed into the fixing device 25 by an endlessly motion of a secondary transfer belt 24 included in the secondary transfer device 22. The full-color image is fixed by effects of an applied pressure of a pressing roller 27 and heat supplied from a heating belt of the fixing device 25. Thereafter, the transfer sheet is discharged onto a discharge tray 57 mounted on the side surface of the printer 100 after passing through a discharge roller pair 56.

FIG. 3 is an enlarged view illustrating the intermediate transfer belt 10 and related units and elements in a vicinity of the intermediate transfer belt 10 of the printer 100. The printer 100 includes a belt unit, four process units 18 (K, Y, M, C) for forming the respective color toner images, the secondary transfer device 22, a belt cleaning device 17, and the fixing device 25. The belt unit endlessly moves the intermediate transfer belt 10 that is stretched and supported by a plurality of rollers so that the intermediate transfer belt 10 is in contact with the photosensitive elements 40 (K, Y, M, C). The primary transfer rollers 62 (K, Y, M, C) push the intermediate transfer belt 10 from the back surface thereof toward the respective photosensitive elements 40 (K, Y, M, C) at the respective primary transfer nips where the respective photosensitive elements 40 (K, Y, M, C) are in contact with the intermediate transfer belt 10. A primary transfer bias is applied to the primary transfer rollers (K, Y, M, C) from respective power sources (not illustrated). As a result, primary transfer electric fields are formed at the primary transfer nips for K, Y, M, and C. The primary transfer electric fields electrostatically move the toner images of the photosensitive elements 40 (K, Y, M, C) toward the intermediate transfer belt 10. Conductive rollers 74 (K, Y, M, C) are disposed between the primary transfer rollers 62 (K, Y, M, C) that are in contact with the back surface of the intermediate transfer belt 10 as illustrated in FIG. 3. The conductive rollers 74 prevent the primary transfer bias charges applied to the primary transfer rollers 62 (K, Y, M, C) from flowing into the adjacent process units through a mid-resistance base layer 11 provided on the back surface side of the intermediate transfer belt 10.

Each of the process units 18 (K, Y, M, C) supports the corresponding photosensitive elements 40 (K, Y, M, C) and other corresponding units on a common supporting body as a unit, and can be attached to and detached from the printer 100. Taking the process unit 18K for black is described as an example, the process unit 18K includes, in addition to the photosensitive element 40K, a developing device 61K that serves as a developing unit to develop a static latent image formed on the surface of the photosensitive element 40K into a black toner image. The process unit 18K also includes a photosensitive element cleaning device 63K that cleans transfer residual toner remaining on the surface of the photosensitive element 40K after passing through the primary transfer nip. Furthermore, the process unit 18K includes a neutralization apparatus (not illustrated) that neutralizes the surface of the photosensitive element 40K after the cleaning, a charging device (not illustrated) that serves as a charging unit to uniformly charge the surface of the photosensitive element 40K after the neutralization. Each of the process units 18 (Y, M, and C) for the colors other than K has almost the same structure as the process unit 18K except for toner colors to be handled. The copying machine employs a so-called tandem structure in which the four process units 18 (K, Y, M, C) are arranged along, and facing, the endless moving direction of the intermediate transfer belt 10.

FIG. 4 is an enlarged view of a unit structure common to the four process units 18 (K, Y, M, C), that is, each of the four process units 18 (K, Y, M, C) has the structure illustrated in FIG. 4. As illustrated in FIG. 4, the process unit 18 includes, by surrounding the photosensitive element 40, a charging device 59 serving as the charging unit, the developing device 61 serving as the developing unit, the primary transfer roller 62 serving as a primary transfer unit, the photosensitive element cleaning device 63, and a neutralization device 64. The photosensitive element 40 uses a raw tube that has a drum shape and that is made of aluminum, for example. An organic photosensitive material having photosensitivity is applied on the raw tube to form a photosensitive layer. As the shape of the photosensitive element 40, an endless belt made of photosensitive material, instead of a raw tube of aluminum, may also be used. The charging device 59 employed herein is a charging roller 60 to which a charging bias is applied and rotated by being in contact with the photosensitive element 40. However, a scorotron charger that charges the photosensitive element 40 in a contactless manner may also be used as the charging device 59.

The developing device 61 develops latent images by using two-component developer including magnetic carrier and non-magnetic toner. The developing device 61 includes a stirring unit 66 and a developing unit 67. The stirring unit 66 conveys the two-component developer stored inside the developing device 61 while agitating the two-component developer, and supplies the two-component developer to a developing sleeve 65. In the developing unit 67, the toner of the two-component developer stuck to the developing sleeve 65 is transferred onto the photosensitive element 40.

The stirring unit 66 is provided below the developing unit 67. The stirring unit 66 includes two screws 68 disposed in parallel to each other, a partition 69 disposed between the screws 68, and a toner density sensor 71 disposed on the bottom surface of a developing case 70.

The developing unit 67 includes the developing sleeve 65 that faces the photosensitive element 40 through the opening of the developing case 70, a magnet roller 72 provided inside the developing sleeve 65 so as to be incapable of rotating, and a doctor blade 73 edge of which is positioned close to the developing sleeve 65. The minimum gap between the doctor blade 73 and the developing sleeve 65 is set as approximately 500 [μm]. The developing sleeve 65 has a tubular shape, is nonmagnetic, and can rotate. The magnet roller 72 that is configured not to rotate together with the developing sleeve 65 has five magnetic poles N1, S1, N2, S2, and S3 in the rotational direction of the developing sleeve 65 from the position facing the doctor blade 73, for example. The magnetic poles exert magnetic power on the two-component developer on the developing sleeve 65 at a predetermined position in the rotational direction. As a result, the two-component developer conveyed from the stirring unit 66 is attracted by and carried on the surface of the developing sleeve 65 and a magnetic brush is formed on the surface of the sleeve 65 along a magnetic line.

With the rotation of the developing sleeve 65, the magnetic brush is regulated to have an appropriate layer thickness when passing through the position facing the doctor blade 73 and conveyed to a developing region facing the photosensitive element 40. Thereafter, the magnetic brush is transferred onto a static latent image by a potential difference between the developing bias applied to the developing sleeve 65 and the static latent image on the photosensitive element 40, and contributes to the development of the static latent image. With further rotation of the developing sleeve 65, the magnetic brush is returned in the developing unit 67, separated from the surface of the sleeve 65 by an effect of a repulsive magnetic field between the magnetic poles of the magnet roller 72, and returned to the stirring unit 66. In the stirring unit 66, an appropriate amount of toner is supplied to the two-component developer based on a detection result of the toner density sensor 71. Single-component developer having no magnetic carrier may be used for the developing device 61 instead of the two-component developer.

The photosensitive element cleaning device 63 adopts a method in which a cleaning blade 75 made of polyurethane rubber is pressed to the photosensitive element 40. However, the photosensitive element cleaning device 63 may adopt another method. In the embodiment, for the purpose of enhancing cleaning property, the photosensitive element cleaning device 63 includes a fur brush 76 that has conductivity, makes contact with the outer circumferential surface of the photosensitive element 40, and can rotate in a rotational direction indicated by the arrow in FIG. 4. In addition, a metal electric field roller 77 is disposed that applies a bias to the fur brush 76 and can rotate in the rotational direction indicated with the arrow in FIG. 4. The edge of a scraper 78 is pressed to the electric field roller 77. Toner removed from the electric field roller 77 by the scraper 78 falls onto a collecting screw 79, and thereafter is collected.

In the photosensitive element cleaning device 63 thus structured, the fur brush 76 rotates in the opposite direction (a counter direction, i.e., clockwise direction) to the rotational direction of the photosensitive element 40, and removes residual toner remaining on the photosensitive element 40. Toner stuck to the fur brush 76 is removed by the electric field roller 77 to which a bias is applied and that rotates in the counter direction (the opposite direction to the rotational direction of the fur brush 76) and makes contact with the fur brush 76. The toner stuck to the electric field roller 77 is cleaned by the scraper 78. Toner collected by the photosensitive element cleaning device 63 is moved toward one side inside the photosensitive element cleaning device 63 by the collecting screw 79, returned to the developing device 61 by a toner recycle unit 80, and reused. The neutralization device 64 includes a neutralization lamp that irradiates the photosensitive element 40 with light to remove surface potential of the photosensitive element 40. The surface of the photosensitive element 40 thus neutralized is uniformly charged by the charging device 59, and thereafter subjected to optical writing processing.

Referring back to FIG. 3, the secondary transfer device 22 is disposed below the belt unit. The secondary transfer device 22 has the secondary transfer belt 24 that is supported between the pair of secondary transfer rollers 23*a* and 23*b* and moved in an endless manner. The first secondary transfer roller 23*a*, to which a secondary transfer bias is applied from a power source (not illustrated), and the supporting roller 16 of the belt unit sandwich the intermediate transfer belt 10 and the secondary transfer belt 24. As a result, the secondary transfer nip is formed in which both belts move in the same direction while being in contact with each other at the contact area. A four-color superposed toner image on the intermediate transfer belt 10 is secondary-transferred at once onto the transfer sheet fed into the secondary transfer nip from the registration roller pair 49 by the effects of the secondary transfer electric field and the nip pressure, so that a full-color image is formed. The transfer sheet after passing through the secondary transfer nip is separated from the intermediate transfer belt 10 and conveyed to the fixing device 25 with endless movement of the secondary transfer belt 24 while being carried on the surface of the secondary transfer belt 24. The secondary transfer may be performed by using a transfer charger, for example, instead of the secondary transfer roller.

The surface of the intermediate transfer belt 10 after passing through the secondary transfer nip approaches a position supported by the supporting roller 15. At the position, the intermediate transfer belt 10 is sandwiched between the belt cleaning device 17 and the supporting roller 15 by being in contact with the front surface (the outer surface of the loop) of the intermediate transfer belt 10 and the back surface of the intermediate transfer belt 10. Then, residual toner remaining on the surface of the intermediate transfer belt 10 is removed by the belt cleaning device 17. Thereafter, the intermediate transfer belt 10 moves into the primary transfer nips for K, Y, M, and C in this order, so that next four color toner images are superposed one after another.

The belt cleaning device 17 has two fur brushes 90 and 91, rotating while a plurality of pieces of their standing fur are being in contact with the intermediate transfer belt 10 with the implant direction opposite to the moving direction of the intermediate transfer belt 10 (counter direction) to mechanically scrape the residual toner remaining on the intermediate transfer belt 10. In addition, the scraped residual toner after transfer is electrostatically attracted and collected by a cleaning bias applied to the belt cleaning device 17 from a power source (not illustrated).

Metal rollers 92 and 93 rotate in a forward or reverse direction while being in contact with the fur brushes 90 and 91, respectively. A power source 94 applies a voltage having a negative polarity to the metal roller 92 disposed upstream from the metal roller 93 in the rotational direction of the intermediate transfer belt 10. On the other hand, a power source 95 applies a voltage having a positive polarity to the metal roller 93 disposed downstream from the metal roller 92 in the rotational direction of the intermediate transfer belt 10. Blades 96 and 97 are in contact with the metal rollers 92 and 93, respectively, with edges thereof. In the structure, with the endless movement of the intermediate transfer belt 10 in the direction indicated by the arrow in FIG. 4, the fur brush 90 located upstream cleans the surface of the intermediate transfer belt 10. In the cleaning, when a voltage of −400 [V] is applied to the fur brush 90 while a voltage of −700 [V] is being applied to the metal roller 92, for example, toner having a positive polarity on the intermediate transfer belt 10 electrostatically transfers toward the fur brush 90. The toner transferred to the fur brush 90 further transfers to the metal roller 92 due to the potential difference, and is scraped and dropped from the metal roller 92 by the blade 96.

Although toner on the intermediate transfer belt 10 is removed by the fur brush 90 in this way, much toner still remains on the intermediate transfer belt 10. The residual toner is charged with a negative polarity by a bias having a negative polarity applied to the fur brush 90. It is conceivable that toner is charged by charge injection or discharging. Subsequently, a bias having a positive polarity is applied to the fur brush 91 located downstream, and the fur brush 91 thus biased cleans the intermediate transfer belt 10, resulting in residual toner being removed. The removed toner is transferred from the fur brush 91 to the metal roller 93 by the potential difference, and removed and dropped by the blade 97. Toner scraped and dropped by the blades 96 and 97 are collected in a tank (not illustrated).

Although most of toner is removed, little toner still remains on the surface of the intermediate transfer belt 10 after being cleaned by the fur brush 91. The residual toner on the intermediate transfer belt 10 is charged with a positive polarity by a bias that has a positive polarity and is applied to the fur brush 91 as described above. Thereafter, the charged toner is transferred to the photosensitive element 40 (K, Y, M, C) by the respective transfer electric fields applied at the respective primary transfer positions, and collected by the respective photosensitive element cleaning devices 63.

Generally, the registration roller pair 49 is mostly used by being grounded. However, a bias can be applied for removing paper powder of the transfer sheet fed into the registration roller pair 49.

A transfer sheet reversing unit 28 (FIG. 2) is provided below the secondary transfer device 22 and the fixing device 25. The transfer sheet reversing unit 28 is such shaped that it extends in parallel with a tandem structure 20 described above. A transfer path of the transfer sheet after having completed image fixing processing on one surface thereof is switched toward the transfer sheet reversing unit 28 by a switching claw. Then, the transfer sheet is reversed in the transfer sheet reversing unit 28 and fed into the secondary transfer nip again. The secondary transformation processing and the fixing processing are performed on the other surface of the transfer sheet, and thereafter the sheet is discharged onto the discharge tray 57.

Figure 5A:
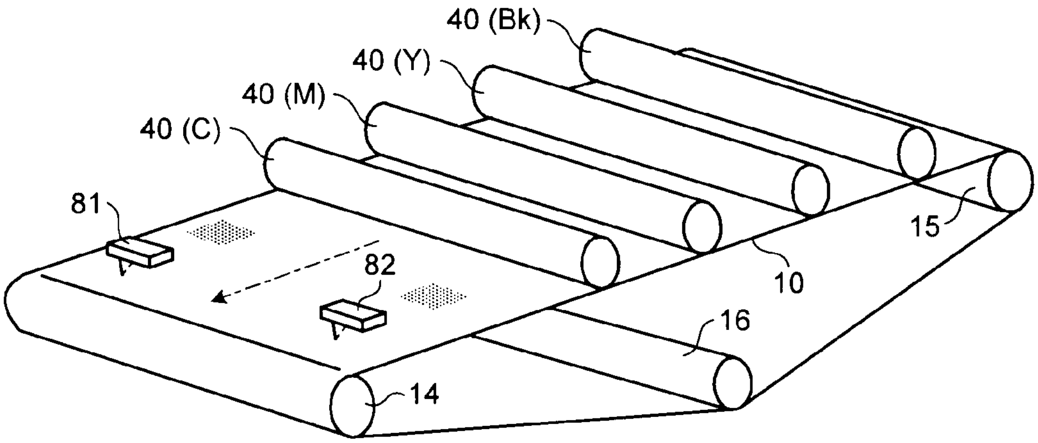
FIG. 5A is a perspective view illustrating optical sensors 81 and 82 that detect toner density on a surface of the intermediate transfer belt 10 illustrated in FIG. 3.
Figure 5B:
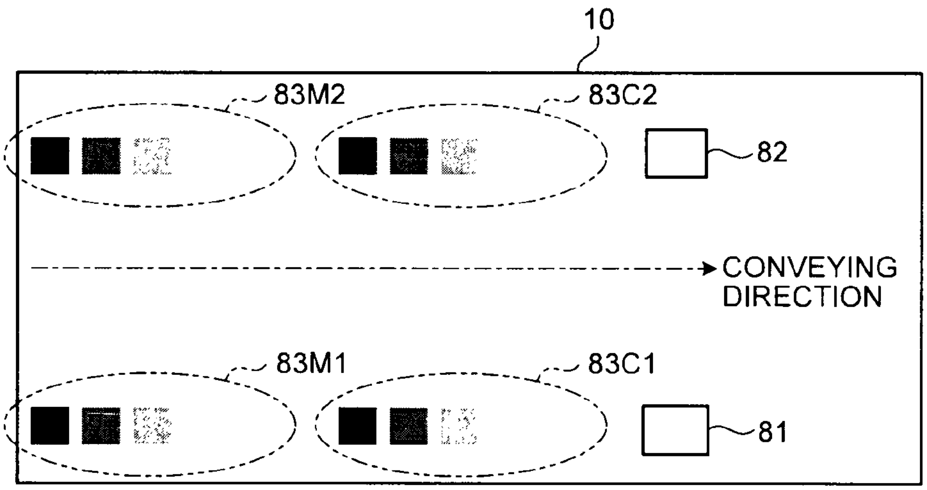
FIG. 5B is a plan view illustrating test patterns as toner images formed on the intermediate transfer belt 10.

Optical sensors 81 and 82 are disposed around the supporting roller 14 by facing the intermediate transfer belt 10. The optical sensors 81 and 82 are arranged as illustrated in FIG. 5A by facing the intermediate transfer belt 10 at both side edges. When toner image density detection and toner image density adjustment are performed, test marks (test pattern images) each having five-level density for each color (C, M, Y, Bk) are sequentially formed on both side edges of the intermediate transfer belt 10. The optical sensors 81 and 82 detect the density (toner amount). FIG. 5B illustrates test patterns 83C1 and 83C2 for cyan (C), and 83M1 and 83M2 for magenta (M) that are formed on the intermediate transfer belt 10.

Figure 6A:
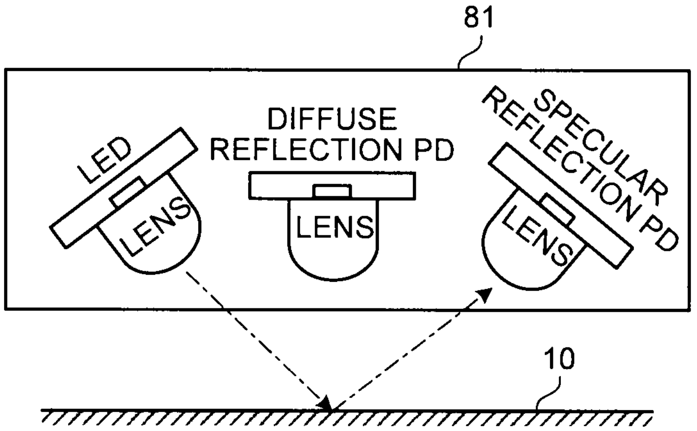
FIG. 6A is a block diagram schematically illustrating a structure of the optical sensor 81 when the optical sensor 81 detects stain on the belt surface.

FIG. 6A is a schematic illustrating a structure of the optical sensor 81. The optical sensor 81 includes the LED that emits light in an oblique direction toward the belt 10, a specular reflection photodiode (PD) that receives specularly reflected light from the belt 10, and a diffuse reflection PD that receives diffusely reflected light from the belt 10. The optical sensor 82 has the same structure as the optical sensor 81. Generally, material having extremely high smoothness is used for the intermediate transfer belt 10 in order to avoid the intermediate transfer belt 10 from toner sticking. For example, polyvinylidene fluoride (PVDF) or polyimide is used to make a belt material having a shiny surface.

Figure 6B:
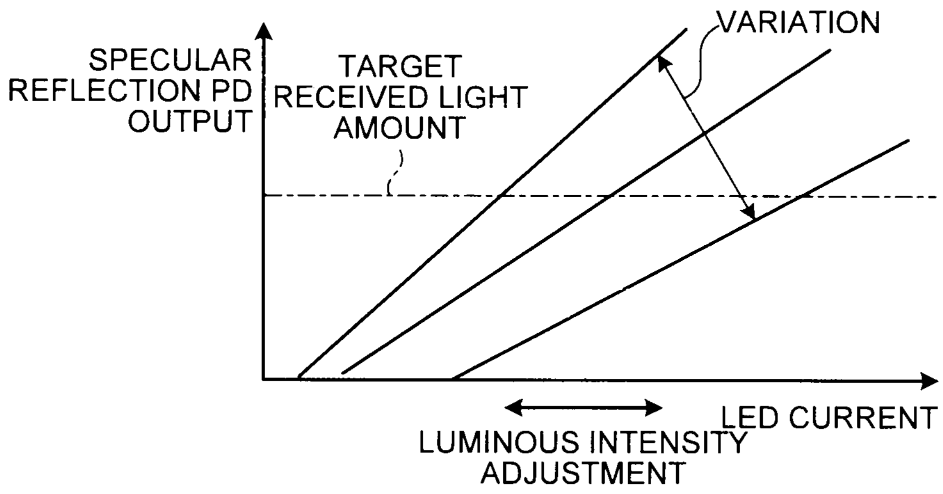
FIG. 6B is a graph illustrating a relationship between a current value of an LED in the optical sensor 81 that emits light onto the intermediate transfer belt 10 and a level of a photodetection signal of a specular reflection photodiode (PD)

In the toner image density adjustment, luminous intensity adjustment (adjustment value R), developing bias correction (adjustment value Q), and exposure correction (adjustment value P) are performed. In the luminous intensity adjustment, flowing current values of the LEDs of the optical sensors 81 and 82 are so adjusted that a reflected light amount from the intermediate transfer belt 10 is equal to a reference value (a target received light amount illustrated in FIG. 6B). In the developing bias correction, the correction is performed in such a manner that a characteristic line of developing potential versus toner image density coincides with a reference characteristic line. The developing potential indicates a difference between photosensitive element surface potential and developing roller potential. In the luminous intensity adjustment, the received light amounts of the optical sensors 81 and 82 are adjusted to the target received light amount illustrated in FIG. 6B in the following manner. Variation of a received light amount of the LED due to light emission efficiency difference of individual LED, temperature variation and aging variation, and variation of a received light amount of the optical sensors 81 and 82 due to surface stain of the intermediate transfer belt 10 are corrected by using received light signals of the specular reflection PDs of the optical sensors 81 and 82.

In the toner image density adjustment including the developing bias correction (adjustment value Q) and the exposure correction (adjustment value P), test patterns of the respective colors each having five-level density (a toner image, e.g., the test pattern 83C1 of FIG. 5B) are formed on the intermediate transfer belt 10. The optical sensors 81 and 82 detect the density of the test patterns.

Figure 7A:
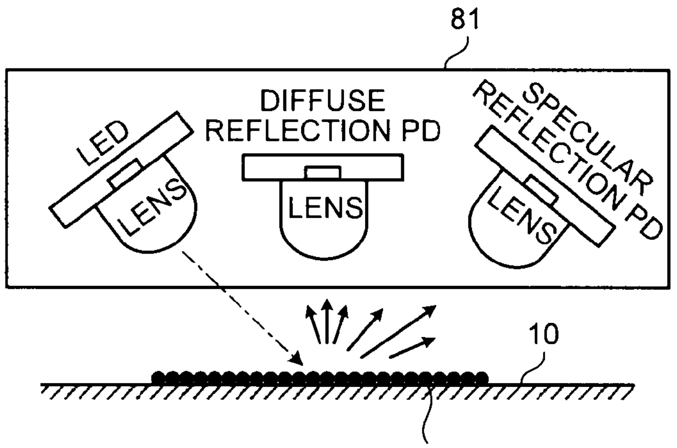
FIG. 7A is a block diagram schematically illustrating the structure of the optical sensor 81, and when the optical sensor 81 detects density of a test pattern toner image transferred on the belt 10.

FIG. 7A illustrates a state in which a toner image that is one mark of the test patterns passes directly under the optical sensor 81. When the toner image of the test pattern reaches the position facing the optical sensor 81, a detection signal of the diffuse reflection PD that mainly receives diffusely reflected light from the toner image of the optical sensor 81 is converted into diffuse reflection received-light data by analog to digital (A/D) conversion performed by a sub CPU 517 (FIG. 8) and read. Then, the diffusely reflected light-received data is converted into toner density data corresponding to the diffusely reflected light-received data in a lookup table (LUT) that is created based on the characteristics of the toner density versus the diffuse reflection PD output illustrated in FIG. 7B, and converts the diffuse reflection PD output into the toner density. That is, the diffusely reflected light-received data is converted into the toner density data.

Figure 7B:
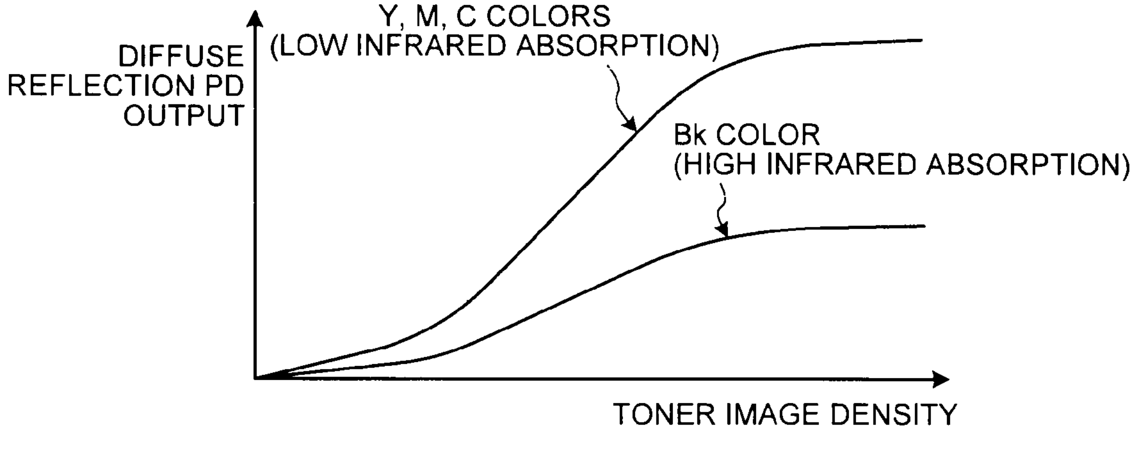
FIG. 7B is a graph illustrating a relationship between density of a toner image and a level of photodetection signal of a diffuse reflection PD of the optical sensor 81.

The LED light source for the optical sensors 81 and 82 emits light having a wavelength in near-infrared or infrared range, such as about 840 nm, which is not much adversely affected by colorants contained in each color toner. The back toner has a high light absorption in the infrared range because the toner is generally colored by inexpensive carbon black. As illustrated in FIG. 7B, the black toner, thus, has lower sensitivity to toner density compared to the other color toner.

FIG. 8 illustrates a system structure of an electrical system of the multifunction copying machine 601 illustrated in FIG. 2. The electrical system includes a system controller 501 that controls the whole of the image forming apparatus, an operation board 500 of the image forming apparatus connected to the system controller 501, an HDD 503 that stores therein image data, a communications controller interface board 504 that performs external communications using analog lines, a LAN interface board 505, a FAX control unit (FCU) 506 connected to a general-purpose PCI bus, boards 507 including an IEEE1394 board, a wireless LAN board, and a USB board, the engine control 510 connected to the controller with a PCI bus, an I/O control board 513 that controls I/O of the image forming apparatus and connected to the engine control 510, a scanner board (sensor board unit (SBU)) 511 that reads an original to be copied (image), and a laser diode board (LDB) 512 that irradiates (optical writing) a photosensitive element with image light based on image data. The communications controller interface board 504 immediately notifies, when trouble occurs in the apparatus, an external remote diagnosing apparatus of the trouble, enabling a maintenance person to understand the details and conditions of the trouble and quickly eliminate the trouble. The communications controller interface board 504 is also used to transmit the use conditions of the apparatus in addition to the above-described use.

The scanner 300, which optically reads an original, scans the original with light from an original illuminating light source and forms an original image on a CCD 36. The original image, i.e., reflected light from the original irradiated with light, is photoelectric-converted by the CCD 36 into R, G, and B image signals. The CCD 36 is a three-line color CCD, and generates R, G, B image signals of even pixel channel (EVENch)/odd pixel channel (ODDch). The R, G, B image signals are input to an analog application specific integrated circuit (ASIC) of the SBU. The SBU 511 includes the analog ASIC, the CCD, and a circuit that generates drive timing of the analog ASIC. The output of the CCD 36 is sample-held by a sample-holding circuit in the analog ASIC, and thereafter is A/D converted into R, G, B image data. The R, G, B image data is shading-corrected, and output to an image data processor IPP from an output interface (I/F) 520 through an image data bus.

The IPP is a programmable arithmetic processing unit that performs image processing. The IPP performs separation-generation (determination on whether an image is in a text region or a photo region, i.e., image region separation), background removal, scanner gamma conversion, filtering, color correction, magnification change, image processing, printer gamma conversion, and gradation processing. The signals of the image data transferred to the IPP from the SBU 511 are degraded caused by an optical system and quantization to digital signals (signal degradation in scanner system). The IPP corrects the signal degradation and writes the corrected image data to a frame memory 521.

The system controller 501 includes a ROM for controlling a CPU and a system controller board, a RAM as a working memory used by the CPU, a nonvolatile (NV)-RAM including a lithium battery, back-up of the RAM, and a built-in clock, ASIC for performing system bus control of the system controller board, frame memory control, and controlling the periphery of the CPU such as first-in first-out (FIFO), and an interface circuit for the ASIC.

The system controller 501 has functions of a plurality of applications such as a scanner application, a facsimile application, a printer application, and a copy application, and controls the overall system. The system controller 501 interprets an input to the operation board 500 to perform setting of the system and display the status of the system on a display unit of the operation board 500. A large number of units are connected to the PCI bus, and image data and control commands are transferred in a time division manner through an image data bus/control command bus.

The communications controller interface board 504 is a communications interface board between a communications controller and the system controller 501. Communications with the system controller 501 are performed based on full-duplex asynchronous serial communications. The communications controller interface board 504 and a communications controller 522 are connected by multi-drop connection based on the RS-485 interface standard. The communications with the remote management apparatus 630 are performed through the communications controller interface board 504.

The LAN interface board 505 is connected to the in-house LAN 600 (FIG. 1), serves as a communications interface board between the in-house LAN 600 and the system controller 501, and includes a PHY chip. The LAN interface board 505 and the system controller 501 are connected to each other through a standard communications interface such as a PHY chip I/F and an I2C bus I/F. Communications with external apparatuses are performed through the LAN interface board 505.

The HDD 503 is used as an application database that stores therein an application program for the system and apparatus bias information for the printer and an imaging process apparatus, and also as an image database that stores therein image data such as a read image and write-image, and document data. The HDD 503 is connected to the system controller 501 through a physical interface, and an electrical interface in accordance with the ATA/ATAPI-4 based interface.

The operation board 500 includes a CPU, a ROM, a RAM, and an ASIC (LCDC) for controlling a liquid crystal display (LCD) and key entry. A control program for the operation board 500 is written in the ROM. The control program controls read of input to the operation board 500 and display output. The RAM is the working memory used by the CPU. The operation board 500 controls input by a user who operates a panel to input system setting through communication with the system controller 501, and a display for displaying the content of the system setting and the status of the system to the user.

Write signals of the respective colors, i.e., black (Bk), yellow (Y) cyan (C), and magenta (M), that are output from the working memory of the system controller 501 are input to laser diode (LD) writing circuits for Bk, Y, M, C in the LDB 512, respectively. LD current control (modulation control) is performed in each of the LD writing circuits and is output to each LD.

The engine control 510 is a process controller that mainly controls image forming processing, and includes the CPU, IPP for image processing, a ROM storing therein a program necessary for controlling copy and print out, a RAM required for the control, and the NV-RAM. The NV-RAM includes SRAM and a memory for detecting power-off and storing a detection result in electrically erasable programmable ROM (EEPROM). An I/O ASIC includes a serial interface for exchanging signals with the CPU that controls other operations. The I/O ASIC controls I/O (a counter, a fan, a solenoid, a motor, etc.) provided near the engine control board. The I/O control board 513 and the engine control 510 are connected through a synchronous serial interface.

The I/O control board 513 includes the sub CPU 517. The sub CPU controls the following I/O processing of the image forming apparatus: reading of detection signals of the various sensors including a temperature sensor, a potential sensor, a photosensitive element toner density sensor (P sensor) serving as the toner amount sensor, and the optical sensors 81 and 82 serving as the toner density sensors, analog control, jam detection with reference to a detection signal of a sheet sensor, and sheet conveying control. An interface circuit 515 interfaces with various sensors 516 and actuators (motors, clutches, solenoids). The optical sensors 81 and 82 are included in the various sensors 516.

A power source unit (PSU) 514 supplies power for controlling the image forming apparatus. Commercial power is supplied when a main switch (SW) is turned on (closed). A commercial alternating current (AC) is supplied to an AC control circuit 540 from the commercial power source. The commercial AC is rectified and smoothed by the AC control circuit 540 as a controlled AC output. The power source unit PSU 514 supplies direct current (DC) voltages necessary for each control board by using the controlled AC output. The CPUs of the respective controllers are operated by constant voltages produced by the power source unit PSU 514.

The copying machine 601 includes a data acquisition unit that acquires various information relating to statuses of components thereof and internal events occurring therein. The data acquisition unit is mainly composed of the engine control 510, the I/O control board 513, the various sensors 516, and the operation board 500 illustrated in FIG. 8. The engine control 510 is a control unit that controls the whole hardware of the copying machine 601. The engine control 510 includes the ROM that serves as the data storage unit and stores therein a control program, the RAM that serves as the data storage unit and stores therein operation data and control parameters, and the CPU that serves as an arithmetic unit.

In the copying machine, the data acquisition unit mainly composed of the engine control 510, the I/O control board 513, the various sensors 516, and the operation board 500 detects various statuses at predetermined operational timing, and produces status evaluation data based on the detected data. The engine control 510 adjusts control parameters of various operation of the copying machine and determines or detects a failure. The detected data, the evaluation data, and the values of the control parameters are accumulated as status data in the NV-RAM of the engine control 510. In the present specification, the status data indicates any of the values of control parameters having influence on image forming property, detected data by the status sensors, and evaluation data produced based on the detected data. That is, the status data includes the detected data, the evaluation data, and the values of the control parameters.

Acquired Data

Various data acquired by the data acquisition unit of the copying machine 601 includes the status data, input data, and image read data. The data is described in detail below.

(a) Detected Data

The detected data represents status values detected for determining driving conditions, various characteristics of recording media, characteristics of developer, characteristics of photosensitive elements, various processing status of electrophotography processing, environmental conditions, and various characteristics of recording materials. An outline of methods of taking the detected data is described below.

(a-1) Data of Driving System

The data is obtained by detecting a rotational speed of the photosensitive element by an encoder, reading a current flow value of the drive motor, and reading a temperature of the drive motor.

In the same manner as above, the driving conditions of the rotating parts having a cylindrical or a belt shape, such as the fixing roller, the sheet carriage roller, and the drive roller is detected.

A sound generated by being driven is detected with a microphone provided inside or outside of the apparatus.

(a-2) Status of Conveyed Sheet

With a transmissive or reflective type optical sensor, or a contact-type sensor, the occurrence of a paper jam is detected, by reading the leading edge or the trailing edge of the conveyed sheet to detect, or a difference in passing timing between the leading edge and the trailing edge of the sheet and variation of sheet positioning in a direction perpendicular to a sheet feeding direction are read.

In the same manner as above, a moving speed of a sheet is obtained by reading a difference in detection timing among a plurality of sensors.

A slip between the paper feeding roller and a sheet when the sheet is being fed is obtained by comparing measurements of a revolution of the paper feeding roller with a moving amount of the sheet.

(a-3) Various Characteristics of Recording Media Such as a Sheet

This data strongly effects image quality and stability of sheet feeding. Data relating to a type of sheet is acquired by the following methods.

The thickness of a sheet is obtained as follows: the sheet is sandwiched with two rollers and a relative positional displacement of the rollers is detected with optical sensor, for example. Alternatively, a displacement amount is detected that is equivalent to a moving amount of a member lifted up when the sheet is inserted.

The surface roughness of a sheet is obtained as follows: a guide, for example, is made contact with a surface of the sheet before being subjected to transfer and vibration or sounds generated by sliding, for example, is detected.

The glossiness of a sheet is obtained as follows: a light beam having a specified open angle is entered on the sheet at a specified incident angle, and a light beam having a specified open angle reflected by the sheet in a specular reflection direction is measured by a sensor.

The stiffness of a sheet is determined by detecting a deformation amount (a bent amount) of the sheet after being pressed.

The determination of whether a sheet is a recycled paper is made as follows: the sheet is irradiated with ultraviolet rays and the transmittance of ultraviolet rays is detected.

The determination of whether a sheet is used paper one side of which is to be reused for printing is made as follows: the sheet is irradiated with light emitted from a linear light source such as an LED array, and light reflected from the transferred surface of the sheet is detected by a solid-state imaging device such as the CCD.

The determination of whether a sheet is for overhead projector (OHP) is made as follows: the sheet to be checked is irradiated with light, and specularly reflected light having a different angle from that of transmitted light is detected.

The amount of moisture contained in a sheet is obtained by measuring absorption of infrared rays or light having a wavelength of a micron range.

The curl amount of a sheet is detected by an optical sensor or a contact sensor, for example.

The electrical resistance of a sheet is obtained as follows: the resistance is directly measured by making a pair of electrodes (e.g., paper feeding rollers) contact with a recording sheet, or alternatively, surface potential of the photosensitive element or the intermediate transfer body after toner images are transferred onto the recording sheet is measured and the resistance value of the recording sheet is estimated based on the measured surface potential value.

(a-4) Developer Characteristics

The characteristics of developer (toner and carrier) in the apparatus greatly affect the core of functions of electrophotography processing. Therefore, the characteristics are important factors of system operation and output from the system. It is very important to acquire the information of developer. The characteristics of developer include the following items.

As for the toner, a charged amount and the distribution thereof, fluidity, cohesion level, bulk specific density, electrical resistance, an external additive amount, a consumed amount and remaining amount, fluidity, and a toner density (mixing ratio of toner to carrier) are exemplified.

As for the carrier, magnetic characteristics, a coated film thickness, a toner-spent amount are exemplified.

It is generally difficult to detect these data items individually in the copying machine. Thus, the data may be detected as the comprehensive characteristic of developer. The comprehensive characteristic of developer can be measured by the following exemplary manner.

A latent image for testing is formed on the photosensitive element, and then the latent image is developed with a predetermined developing condition. Thereafter, a reflection density (optical reflectance) of the formed toner image is measured.

A pair of electrodes is provided in a developing unit, and a relationship between an applied voltage and a current is measured (to obtain a resistance value, or permittivity, for example).

A coil is provided in a developing unit, and a voltage-current characteristic is measured (to obtain inductance, for example).

A level sensor is provided in a developing unit to detect the volume of developer. The level sensor may be an optical type or an electrostatic capacitance type.

(a-5) Photosensitive Element Characteristics

The photosensitive element characteristics closely relate to the functions of electrophotography processing like the developer characteristics. The data of the photosensitive element characteristics includes the following exemplary items: the film thickness of the photosensitive element, surface characteristics (friction coefficient, unevenness), surface potential (before and after processing), surface energy, scattering light, temperature, color, surface position (run-out), linear speed, potential decay speed, electrical resistance, electrostatic capacitance, and surface moisture amount. In the copying machine, the following items can be taken as data out of the above items.

The film thickness is determined as follows: the change of electrostatic capacitance caused by a film thickness change is detected by a current flowing to the photoelectric element from a charging member, and the applied voltage to the charging member is checked up a preset voltage-current characteristic with respect to a dielectric body thickness of the photosensitive element, so that the film thickness is obtained.

The surface potential and temperature can be obtained by using a conventionally known sensor.

The linear speed is detected by an encoder mounted on a rotation shaft of the photosensitive element.

Scattering light from the surface of the photosensitive element is detected by an optical sensor.

(a-6) Electrophotography Processing Status

A toner image is formed, as is known, by electrophotography processing with the following sequential steps. The photosensitive element is uniformly charged, a latent image is formed by laser light (image exposure), the latent image is developed by toner (colored particles) having charges, a toner image is transferred onto a transfer material (in a case of color toner image, color toner images are superposed on the intermediate transfer body or on a recording medium that is the final transfer material, or superposed on the photosensitive element in developing), and the toner image is fixed on a recording medium. Various information in each step has great effects on output such as an image of the system. It is important to acquire the information for evaluating stability of the system. Actual items acquired as the data of the electrophotography processing are exemplified as follows.

The charged potential and the exposed area potential are detected by a conventionally known surface potential sensor.

The gap between the charging member and the photosensitive element in noncontact charging is detected by measuring an amount of light after passing through the gap.

The electromagnetic waves generated by being charged are detected by a wideband antenna.

Sounds generated by being charged.

Exposure intensity

Exposure light wavelength.

Methods of acquiring various statuses of a toner image are exemplified as follows.

The pile height (the height of a toner image) is determined as flows: the depth in the vertical direction is measured by a displacement sensor, and the light-interception length in the horizontal direction is measured by a linear sensor detecting parallel light.

The toner charged amount is obtained as follows: potential of a static latent image of a solid image area, and potential of developed image after the static latent image is developed are measured by a potential sensor. The respective toner stuck amounts are obtained by converting the values of reflection density sensor measuring the same images. The toner charged amount is obtained as a ratio of the potential to the stuck amount.

The dot fluctuation or dot scattering is determined by detecting a dot pattern image by using an infrared light area sensor for the photosensitive element and area sensors of wavelength corresponding to each color for the intermediate transfer body, and then performing appropriate processing.

The offset amount (after fixing) is obtained by reading corresponding locations on the recording sheet and on the fixing roller with the optical sensor, and comparing the two obtained sensor values.

The transfer remain amount is determined by providing optical sensors above the PD and the belt after transfer processing and measuring the amount of reflected light from the remaining pattern after transfer of a specific pattern.

Color unevenness in superposition is detected by a full color sensor that senses the surface of the recording sheet after fixing.

(a-7) Characteristics of Formed Toner Image

Image density and color are detected optically (by either reflected light or transmitted light, the projection wavelength is selected according to the color). The density and single color information is obtained from a toner image on the photosensitive element or on the intermediate transfer body. However, a color combination, such as color unevenness, needs to be measured from a toner image on a sheet.

The gradation is determined, with the optical sensor, by detecting the reflection density of a toner image formed on the photosensitive element or a toner image transferred onto a transfer body at each gradation level.

Sharpness is detected, with a monocular sensor with a small spot diameter or a high resolution line sensor, by reading an image of a repeated line pattern developed or transferred.

Graininess (roughness) is determined by reading a halftone image in the same manner as the sharpness detection, and calculating noise components.

Registration skew is determined by providing an optical sensor at both ends in a main-scanning direction after registration, and measuring the difference between the ON timing of the registration rollers and the detection timing of the sensors.

Out of color registration is determined by detecting the edge of a superposed image on the intermediate transfer body or a recording sheet using a monocular small-diameter spot sensor or a high resolution line sensor.

Banding (density unevenness in the feed direction) is detected by measuring density unevenness on a recording sheet in a sub-scanning direction using a small-diameter spot sensor or a high resolution line sensor, and measuring the signal quantity at a specific frequency.

Glossiness (unevenness) is detected by providing a specular reflection type optical sensor such that the sensor detects a recording sheet on which a uniform image is formed.

Fogging is detected by the following methods. An image background is read by using an optical sensor that senses a comparatively wide region on the photosensitive element, the intermediate transfer body, or a recording sheet. Alternatively, image information is acquired for each area of the background by using a high resolution area sensor, and the number of toner particles in the image is counted.

(a-8) Physical Characteristics of Printed Materials of the Image Forming Apparatus Image deletion, image fading and the like are determined by sensing a toner image on the photosensitive element, the intermediate transfer body, or a recording sheet using an area sensor, and subjecting the obtained image information to image processing.

Toner scattering and stain are determined by scanning an image on a recording sheet using a high resolution line sensor or an area sensor, and calculating the amount of toner scattered around the periphery of patterns of the image.

Rear end white spots and solid cross white spots are detected by a high resolution line sensor scanning the surfaces of the photosensitive element, the intermediate transfer body, or a recording sheet.

Curling, rippling, and a fold of a recording sheet are detected by a displacement sensor. It is effective to dispose the sensor at a location near both ends of the recording sheet for detecting a fold.

Stain and flaws on the edge surface are detected by imaging and analyzing the edge surface when a certain amount of discharged sheets has accumulated with an area sensor provided vertically to the discharge tray.

(a-9) Environmental Conditions

Temperature is detected by the following method and elements: a thermocouple system that extracts as a signal a thermoelectric force generated at a junction joining two different metals or a metal and a semiconductor; a resistivity variation element utilizing the characteristic that the resistivity of a metal or semiconductor changes with temperature change; a pyroelectric element utilizing the characteristic that, in a certain type of crystal, polarization occurs with an increase in temperature to generate a surface potential; and a thermomagnetic effect element that detects a magnetic property change caused by temperature.

Humidity is detected by the following method and sensor: an optical measurement method that measures the optical absorption of $H_2O$ or an OH group; and a humidity sensor that measures an electrical resistance change of a material due to moisture adsorption.

Various gases are detected by measuring an electrical resistance change of an oxide semiconductor basically absorbing gases.

Airflow (direction, flow speed, gas type) is detected by an optical measurement method, for example. The use of an air-bridge type flow sensor is particularly useful for being mounted in the system because the sensor can be made in a compact size.

Air pressure and pressure is detected by using a pressure sensitive material, or measuring the mechanical displacement of a membrane, for example. The air pressure and pressure detection method is also used to detect vibration.

(b) Control Parameters

The operation of the copying machine is determined by the controller, hence it is effective to directly use the input-output parameters of the controller.

(b-1) Image Formation Parameters

The image forming parameters are output directly from the controller for image forming as a result of arithmetic processing, and exemplified as follows.

The setting values of process conditions by the controller. For example, the charging potential, the developing bias value, and the fixing temperature setting value.

The setting values of various image processing parameters for halftone processing, and color correction, for example.

The various parameters set by the controller to operate the apparatus. For example, the sheet conveying timing, and the execution period of a preparatory mode prior to image forming.

(b-2) User's Operation History

The frequency of various operations selected by a user, such as the number of colors, the number of sheets, and image quality instructions.

The frequency of sheet size selection performed by the user.

(b-3) Power Consumption

The total power consumption over the entire time period or a specific time period (e.g., one day, one week, and one month), or the distribution, variation (differential value), and cumulative value (value of integral) thereof.

(b-4) Consumable Supply Consumption Information

The consumption of toner, photosensitive elements, and sheets over the entire time period or a specific time period (e.g., one day, one week, and one month), or the distribution, variation (differential value), and cumulative value (value of integral) thereof.

(b-5) Abnormality Occurrence Information

The frequency of occurrence of abnormalities (by type) over the entire time period or a specific time period (e.g., one day, one week, and one month), or the distribution, variation (differential value), and cumulative value (value of integral) thereof.

(b-6) Operation Time Information

Operation time of the copying machine is measured by a timer unit and stored.

(b-7) Print Operation Frequency (Operation Frequency Information)

The count value is counted up every printout, and stored.

(c) Input Image Information

The following information can be acquired from image information transmitted from a host computer as direct data, or image information obtained by reading an original image with a scanner and subjecting the image to image processing.

The cumulative number of color pixels is obtained by counting each pixel of image data of each of the GRB signals.

The use of an image region separation method described in Japanese Patent No. 2621879, for example, can divide an original image into characters, halftone dots, photographs, and background, and obtain the ratio of the character area and halftone area. The ratio of color characters can be obtained in the same manner as above.

The toner consumption distribution in the main-scanning direction is obtained by counting the cumulative value of the color pixels for each region partitioned in the main-scanning direction.

The image size is obtained from an image size signal generated by the controller or the distribution of color pixels in image data.

The character type (size, font) is obtained from attribute data of the characters.

Specific methods of acquiring various data in the copying machine are described below.

(1) Temperature Data

The copying machine includes a temperature sensor using a resistivity variation element, which has a simple principle and structure and can be highly downsized, to acquire temperature information.

(2) Humidity Data

A humidity sensor that can be downsized to a small size is useful. The basic principle thereof is that when moisture is adsorbed to a moisture-sensitive ceramic, ion conduction is increased by the adsorbed water and the electrical resistance of the ceramic decreases. The moisture-sensitive ceramic is a porous material. Generally, an alumina-based ceramic, apatite-based ceramic, and $ZrO_2$—MgO based ceramic are used.

(3) Vibration Data

Vibration sensors are basically the same as sensors that measure air pressure and pressure. Particularly, a sensor using silicon is useful for being mounted in the system because the sensor can be downsized to a very compact size. Vibration is detected as a capacitance change between a vibrator and a counter electrode provided to face the vibrator formed on a diaphragm of thin silicon when the vibrator moves due to the vibration. Vibration is detected as a resistance change of the silicon diaphragm by using the piezoresistive effect of silicon.

(4) Toner Density in Developer (for Four Colors) Data

The toner density is detected for each color as data. A conventionally known sensor is used as the toner density sensor. For example, the toner density is detected by using a sensing system disclosed in Japanese Patent Application Laid-open No. H6-289717 in which a magnetic permeability change of developer in developing unit is measured.

(5) Uniform Charged Potential of Photosensitive Element (for Four Colors) Data

The uniform charged potential of each of the photosensitive elements 40 (K, Y, M, C) for the respective colors is detected. A known surface potential sensor that detects the surface potential of an object is used.

(6) Post-Exposure Potential of Photosensitive Element (for Four Colors) Data

The surface potential of each of the photosensitive elements 40 (K, Y, M, C) after optical writing is detected in the same manner as that described in (5).

(7) Colored Area Ratio (for Four Colors) Data

The colored area ratio is obtained for each color from the ratio of the cumulative value of the pixels to be colored to the cumulative value of all of the pixels based on input image information, and the colored area ratio is used.

(8) Developing Toner Amount (for Four Colors) Data

The density (toner adhesion amount per unit area) of each color toner image developed on the photosensitive elements 40 (K, Y, M, C) is obtained based on received light amount signals of the reflective photo sensors 88 and 89.

(9) Slant of Leading Edge Position of Sheet

A pair of optical sensors are disposed at locations on the sheet feeding path from the paper feeding roller 42 of the paper feeding unit 200 to the secondary transfer nip such that the pair of optical sensors detect transfer sheet at both ends in an direction orthogonal to the sheet conveying direction. The pair of optical sensors detects the both ends near the leading edge of the conveyed transfer sheet. The two optical sensors are used to measure the time period from time at which a driving signal of the paper feeding roller 42 is sent as reference time to time at which both ends near the leading edge of the transfer sheet pass through the optical sensors. The slant of the transfer sheet with respect to the sheet conveying direction is obtained based on the difference in the time period between both ends.

(10) Sheet Discharge Timing Data

The transfer sheet after passing through the discharge roller pair 56 in FIG. 1 is detected by the optical sensor. In this case, a time period is measured using the time at which the driving signal of the sheet feed roller is sent as reference time in the same manner as above.

(11) Total Current of Photosensitive Element (for Four Colors) Data

The current flowing to the grounding terminal from the photosensitive elements 40 (K, Y, M, C) is detected. The current can be detected by providing a current measuring unit between the substrate of the photosensitive element and the grounding terminal.

(12) Driving Power of Photosensitive Element (for Four Colors)

The driving power (current×voltage) consumed by the driving source (motor) of the photosensitive element during driving is detected by an ammeter and a voltmeter, for example.

Acquisition Timing of Various Data

The I/O control board 513 reads the various data (1) to (12) at the respective fixed operational timings in response to the instructions of the engine control 510 (the CPU of the engine control 510, hereinafter referred to in the same manner). The engine control 510 accumulates the read various data in a status information database (DB) allocated in the NV-RAM of the engine control 510 together with the cumulative number of printouts at the reading timing, determines the status of each unit of the copying machine based on the various data. If necessary, the engine control 510 adjusts the control parameters depending on the statuses, and determines a failure. The status evaluation data produced in the status determination, adjusted values of the control parameters, and the content of a failure if the failure occurs are also accumulated in the status information database (DB).

Figure 9:
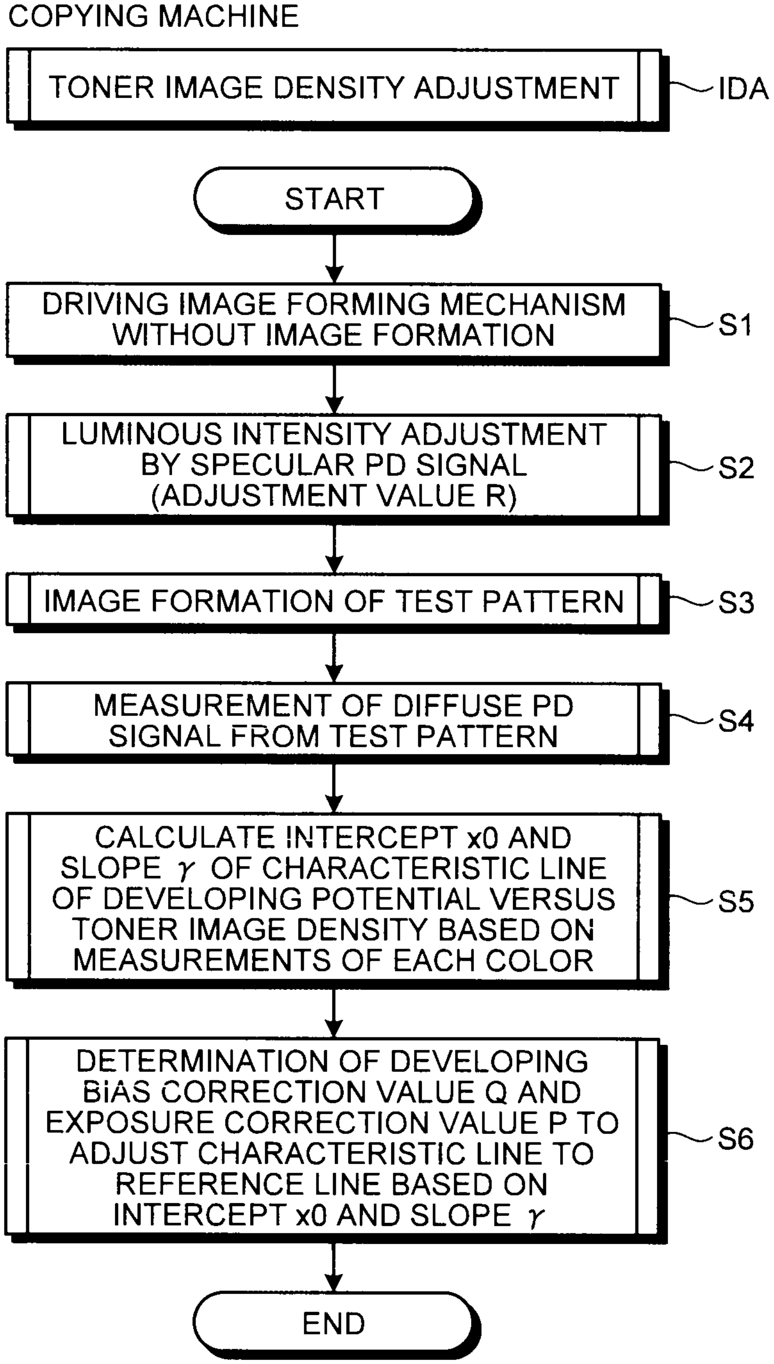
FIG. 9 is a flowchart illustrating an overview of toner image density adjustment by an engine control 510 illustrated in FIG. 8.

FIG. 9 illustrates a flowchart of "toner image density adjustment" IDA in which the luminous intensity adjustment value R, the developing bias adjustment value Q, and the exposure amount adjustment value P, which are the control parameters, are set. In the "toner image density adjustment" IDA, the engine control 510 drives an image forming mechanism (step S1), converts the received light signals of the specular reflection PDs received by the optical sensors 81 and 82 into digital data, and adjusts the flowing current values in the LEDs of the optical sensors 81 and 82 so that the digital data coincides with a reference value (the target received light amount in FIG. 6B) (step S2). As a result, the toner image density can be measured with high accuracy without being affected by the variations and aging of light-emitting elements and light receiving elements, and aging of the surface condition (scumming) of the photosensitive element and the transfer belt. In this adjustment, the adjustment value (an adjustment amount to the fixed reference current value) is R. The adjustment value R includes information relating to the surface condition (stain) of the photosensitive element and the transfer belt.

Figure 10:
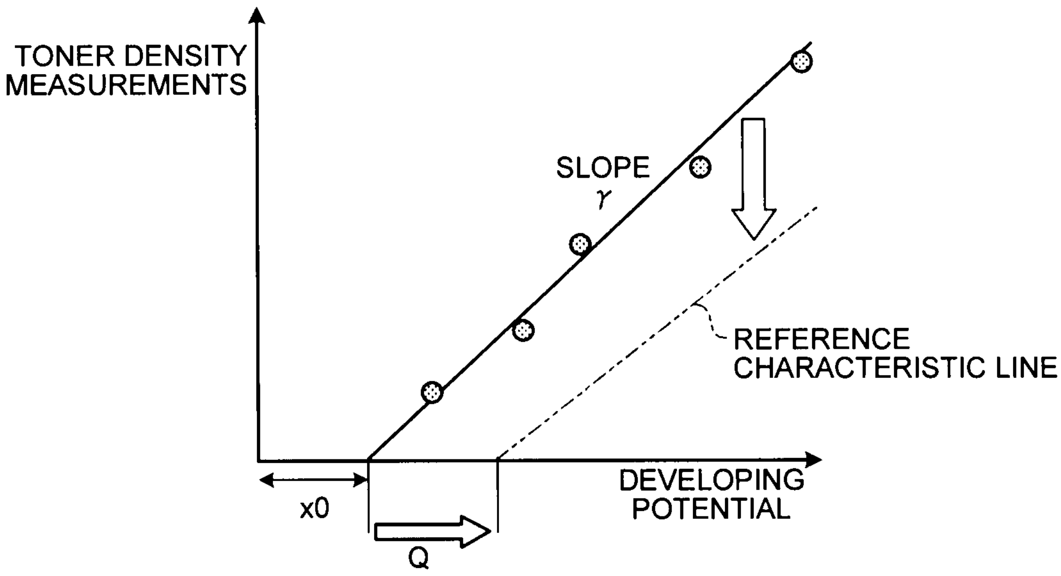
FIG. 10 is a graph illustrating a relationship (a characteristic line) between a developing potential at a time of forming a toner image of a test pattern transferred onto the transfer belt 10 and toner density detected by the optical sensors 81 and 82.

Then, the test pattern marks of the respective colors each having five-level density (toner images, e.g., the test pattern 83C1 illustrated in FIG. 5B) are formed on the respective photosensitive elements with the charging biases and the developing biases set to reference values, and thereafter the test pattern marks are transferred onto the intermediate transfer belt 10 (step S3). Then, toner density of the test patterns transferred on the intermediate transfer belt 10 is detected (step S4). Next, as illustrated in FIG. 10, a slope γ and an intercept x0 of a characteristic line, i.e., a developing potential/toner adhesion amount line that is linearly approximated by using light signals of five points from the test pattern for one color (step S5). The developing bias adjustment that corrects the intercept x0 to the intercept of the reference characteristic line, and the exposure amount adjustment that corrects the slope γ to the slope of the reference characteristic line are performed. In the respective adjustments, the respective adjustment values to the respective reference values are the developing bias correction value Q and the exposure correction value P. The values R, Q, and P are accumulated in the NV-RAM of the engine control 510 together with the cumulative number of printouts at the adjustments (step S6).

In the embodiment, the developing bias and the exposure amount are corrected. Obviously, other process control values contributing image density, such as charging potential and transfer current, may be corrected to obtain the same result as described above.

The process control is performed for the purpose of correcting variation of toner charged amount in a normal range due to variation of temperature and humidity, or variation of sensitivity of the photosensitive element. The measurements and the parameters determined based on the measurements may vary when a specific abnormality occurs or symptom of the occurrence of abnormality is found. For example, a blade cleaning method in which a urethane rubber blade comes into slide contact with the photosensitive element is frequently used for a cleaner provided for collecting toner remaining on the photosensitive element after transfer so as to maintain the photosensitive element to be normally charged and exposed. However, because of the structure, part of toner passes under the blade. Most of the passed toner can be collected by a developing stage after passing through the charging and exposing units. However, some of toner loses the charged characteristic or change the shape due to a frictional action of the blade, and non-electrostatically sticks to the transfer body regardless of an image area or a non-image area without being collected in the developing unit, and then is transferred without any changes. A minute amount of toner particles is stuck to the non-image area because of the above reason, for example. However, image quality is not greatly affected by the stuck toner particles because of its minute amount.

As the area making contact with the photosensitive element of the blade is worn caused by being in sliding contact for long periods, a scraping force lowers. Therefore, a pass-through toner amount described as above tends to increase at an accelerated rate. If a huge amount of residual toner passes under the blade at once, the charging device lowers charging capacity thereof due to stain caused by the toner, and the exposing unit also lowers function thereof due to attenuation caused by the toner. In addition, the developing unit cannot collect the huge amount of toner. As a result, an impermissible abnormal image of vertical lines occurs. This failure needs to be immediately corrected.

Figure 11A:
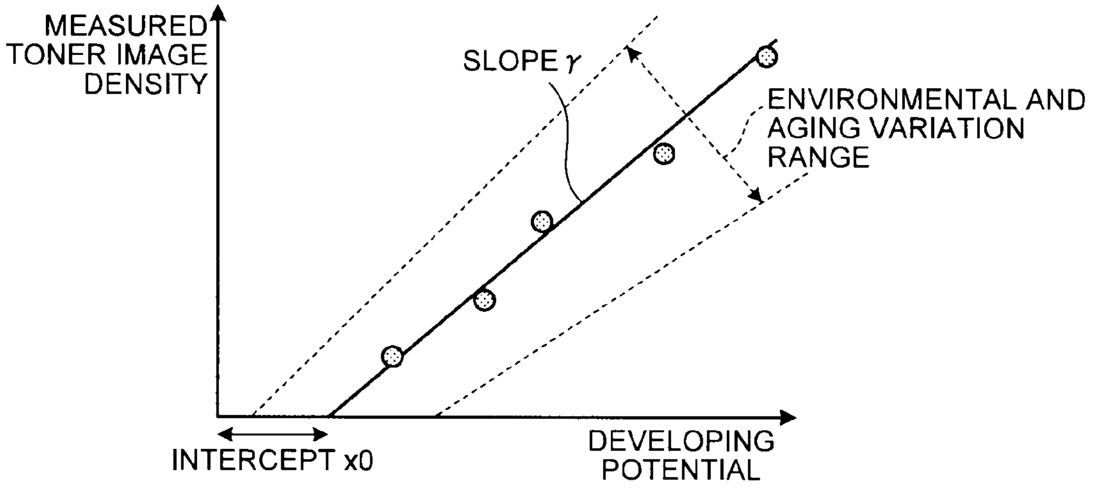
FIG. 11A is a graph illustrating the characteristic line (solid line) measured when no particular stain is present on the surface of the belt 10, and a variation range of the characteristic line.
Figure 11B:
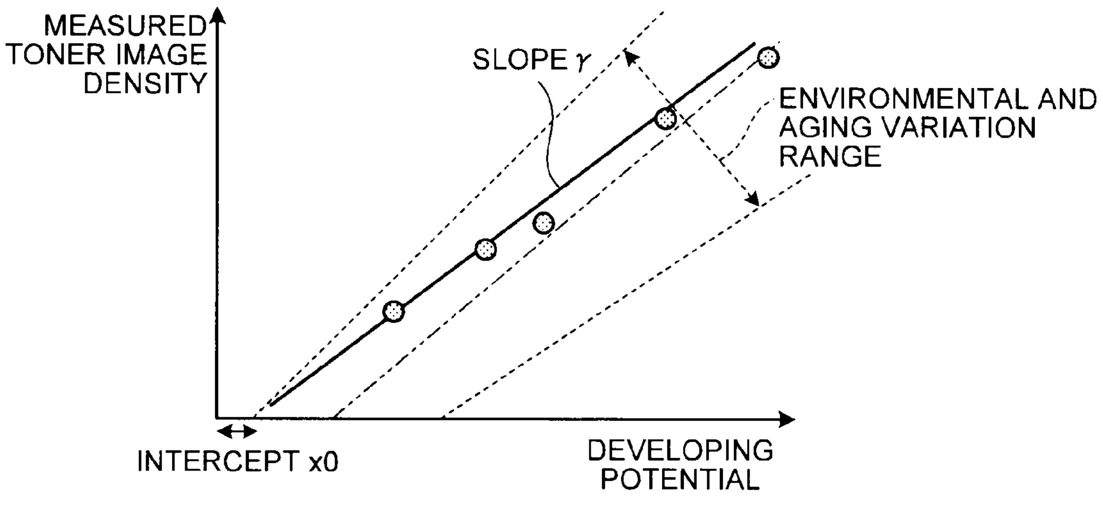
FIG. 11B illustrates the characteristic line when a tiny stain is present on the surface of the belt 10.
Figure 12:
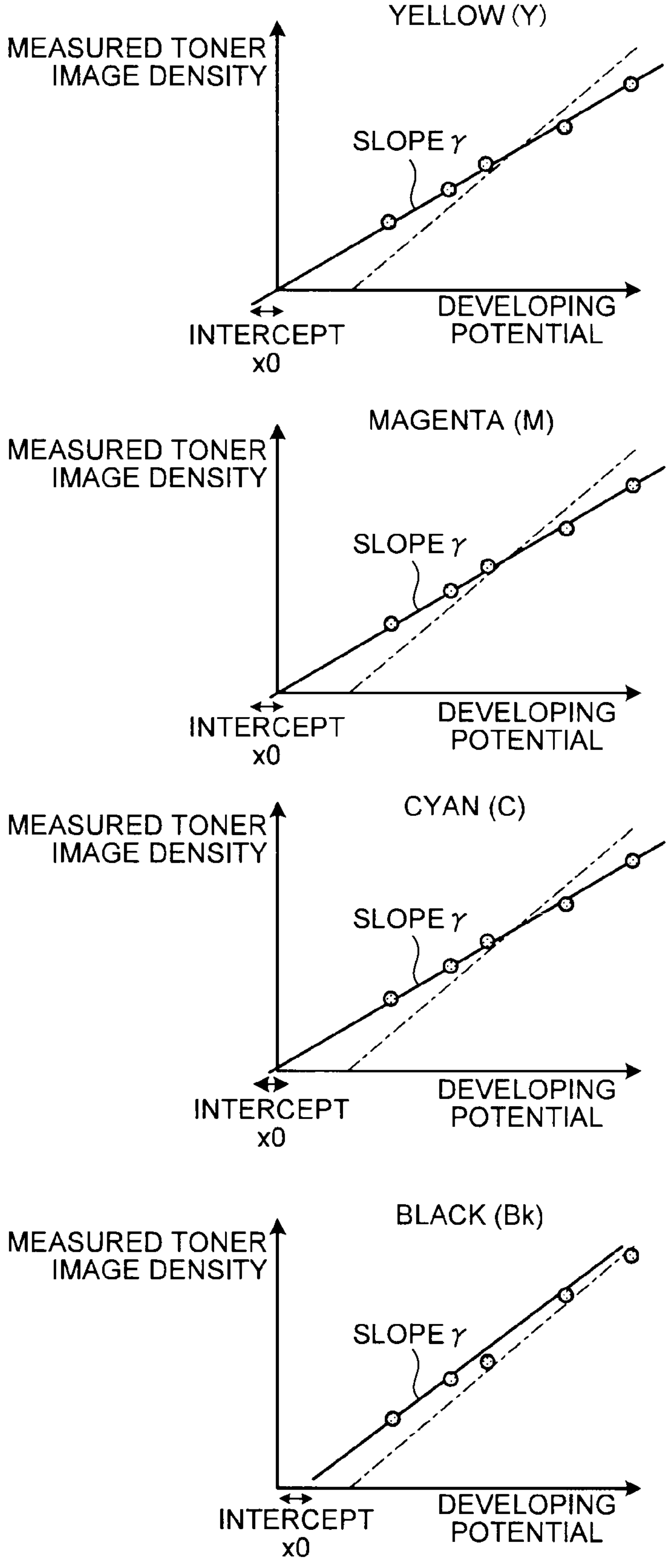
FIG. 12 illustrates graphs of the characteristic lines of respective colors when a stain is present on the belt 10.

The toner adhesion amount has been uniformly increased overall on the image carrier shortly before such a condition occurs. However, a user seldom realizes the increase because the increase does not cause image deterioration the user notices at this stage. This condition is called as a “light scumming”, and is considered as symptom status of cleaner abnormality (incomplete cleaning). The presence of such toner, as illustrated in FIG. 11B, adversely affects the measurement result in particularly in low density region such that it rises to a high value and thus, causes a slight decline of the slope γ the intercept x0. FIG. 12 illustrates the characteristic lines of the respective colors in the light scumming.

However, the change of the characteristic line is within the environmental and aging variation range. Therefore, it is very difficult to determine the occurrence of the light scumming based on the slope γ and the intercept x0 of one color or the correction parameters Q and P that are determined based on the slope γ and the intercept x0. The conventional apparatus only alarms abnormality or failure when the data obviously exceeds the normal range because it is difficult to generate an accurate symptom alarm. As a result, it is difficult for a user to quickly recognize a symptom of abnormality occurrence at a symptom stage of abnormality occurrence.

Figure 13:
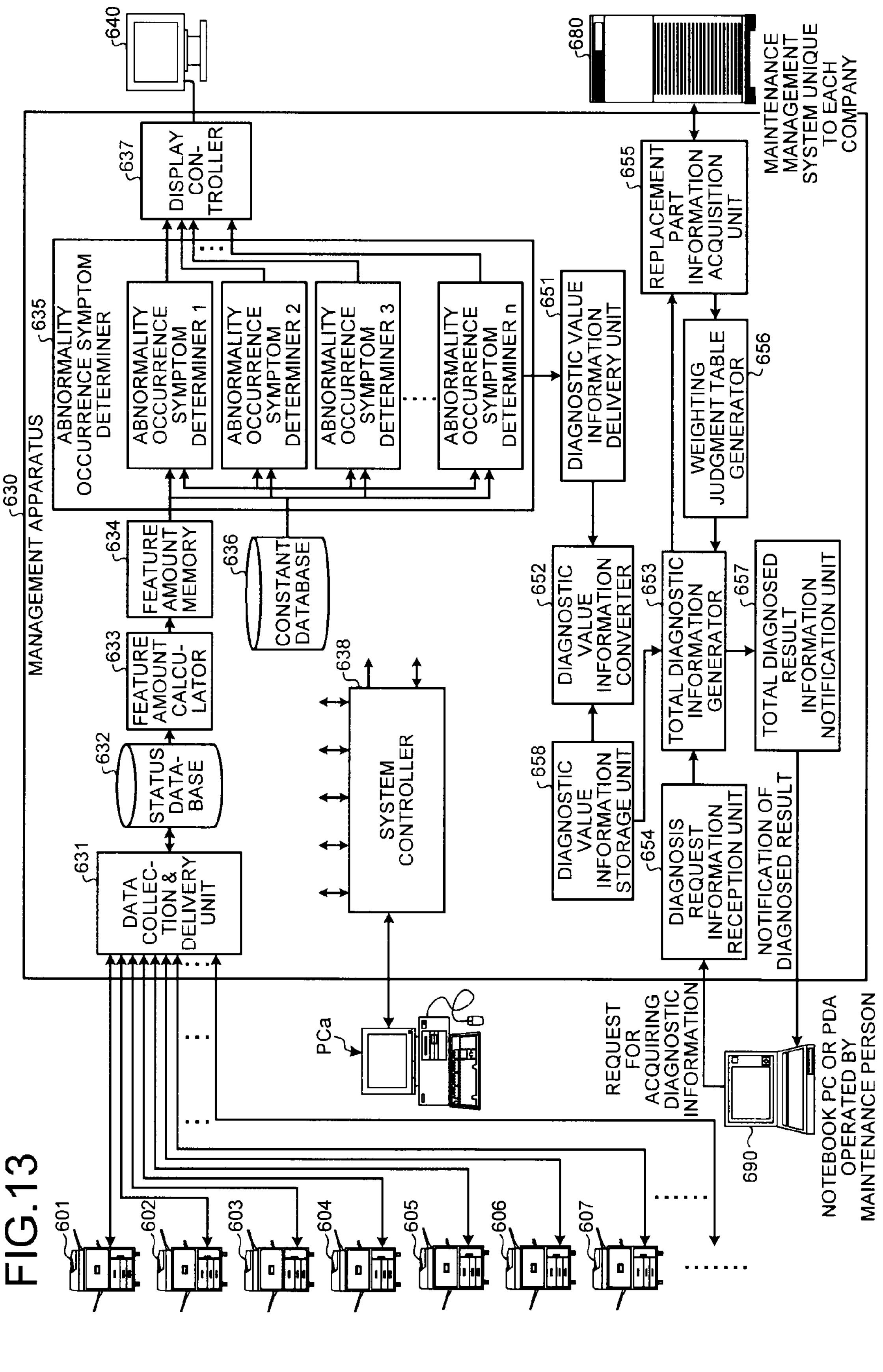
FIG. 13 is a block diagram illustrating a structural overview of a management apparatus 630 illustrated in FIG. 1.

FIG. 13 illustrates a structure of the management apparatus 630. The management apparatus 630 mainly includes a data collection & delivery unit 631, a status database 632, a feature amount calculator 633, a feature amount memory 634, a constant database 636, an abnormality occurrence symptom determiner 635, a display controller 637, a system controller 638, a diagnostic value information delivery unit 651 for each unit, a diagnostic value information converter 652 for each unit, a diagnostic value information storage unit 658 for each unit, a replacement part information acquisition unit 655, a weighting judgment table generator 656 for each replacement part information, a integrated diagnostic information generator 653, a diagnosis request information reception unit 654, and a total diagnosed result information notification unit 657.

When receiving a communications request from a certain copying machine, the data collection & delivery unit 631 of the management apparatus 630 instructs the copying machine to send status data, and receives the status data from the copying machine at once. After receiving, the data collection & delivery unit 631 adds and records, as a new file, the status data in the database for the copying machine based on the apparatus identifier of the status database 632 together with a day entry at the receiving and the accumulation. The number of copying machines to be communicated with the management apparatus 630 is in the order of several thousands. The status data of each copying machine is accumulated in the status database 632 from moment to moment in this way.

An inference engine that determines failure symptom is composed of the feature amount calculator 633, the feature amount memory 634, the abnormality occurrence symptom determiner 635, the constant database 636, and the display controller 637. The inference engine determines symptom of failure based on status data in the status database 632 for each apparatus identifier every receiving of the status data of each copying machine, and transfers the symptom determination index value F that is the symptom determination result to the diagnostic value information delivery unit 651 for each unit.

The constant database 636 stores therein a symptom determination reference table illustrated in FIG. 19 for each apparatus identifier and each image forming functional unit (image forming functional part).

The diagnostic value information delivery unit 651 for each unit receives the symptom determination index value F of each image forming unit (image forming functional part) from the abnormality occurrence symptom determiner 635, and outputs the symptom determination index value F to the diagnostic value information converter 652 for each unit.

Figure 28:
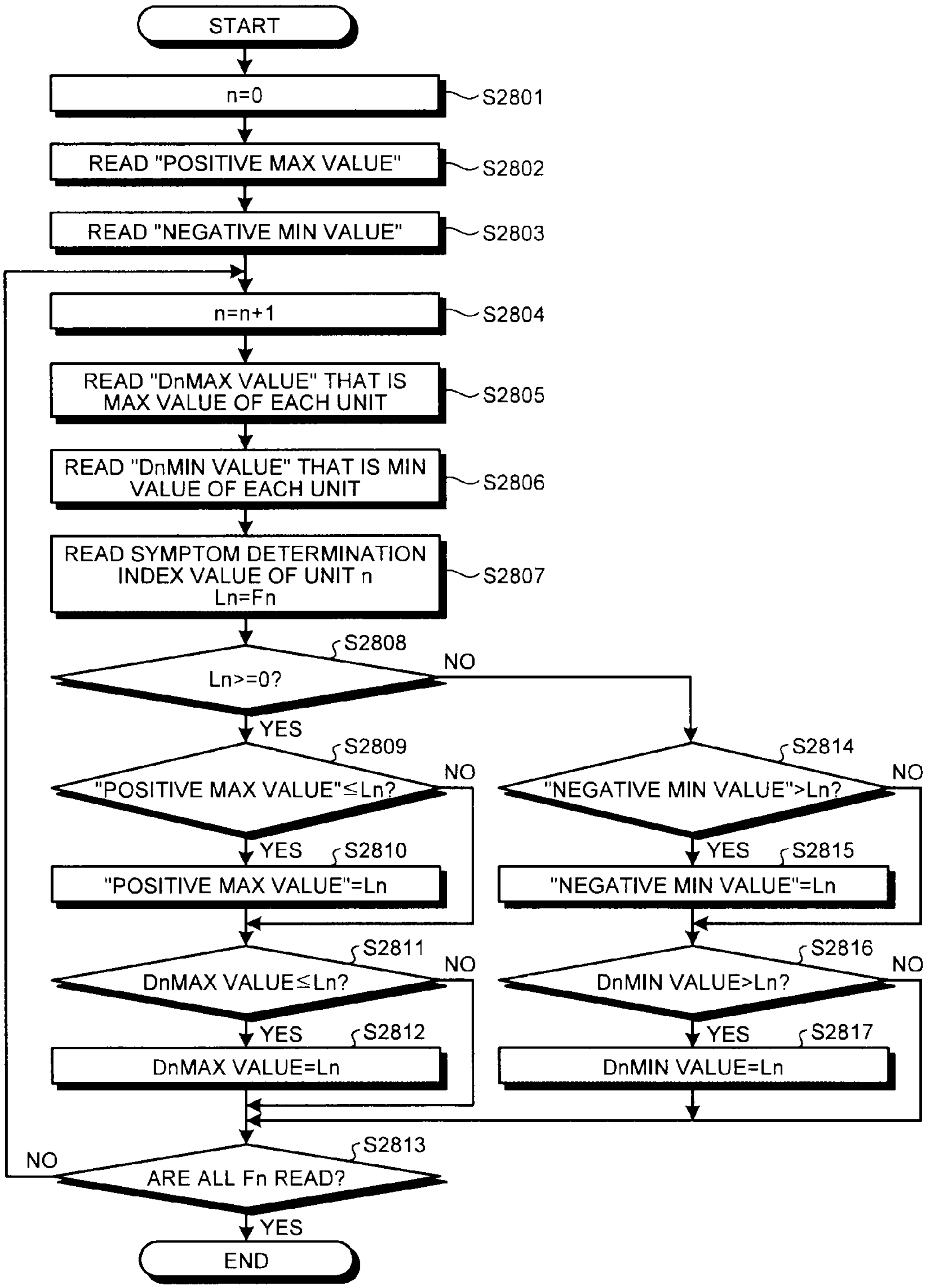
FIG. 28 is a flowchart illustrating a procedure of processing to generate a conversion table.
Figure 29:
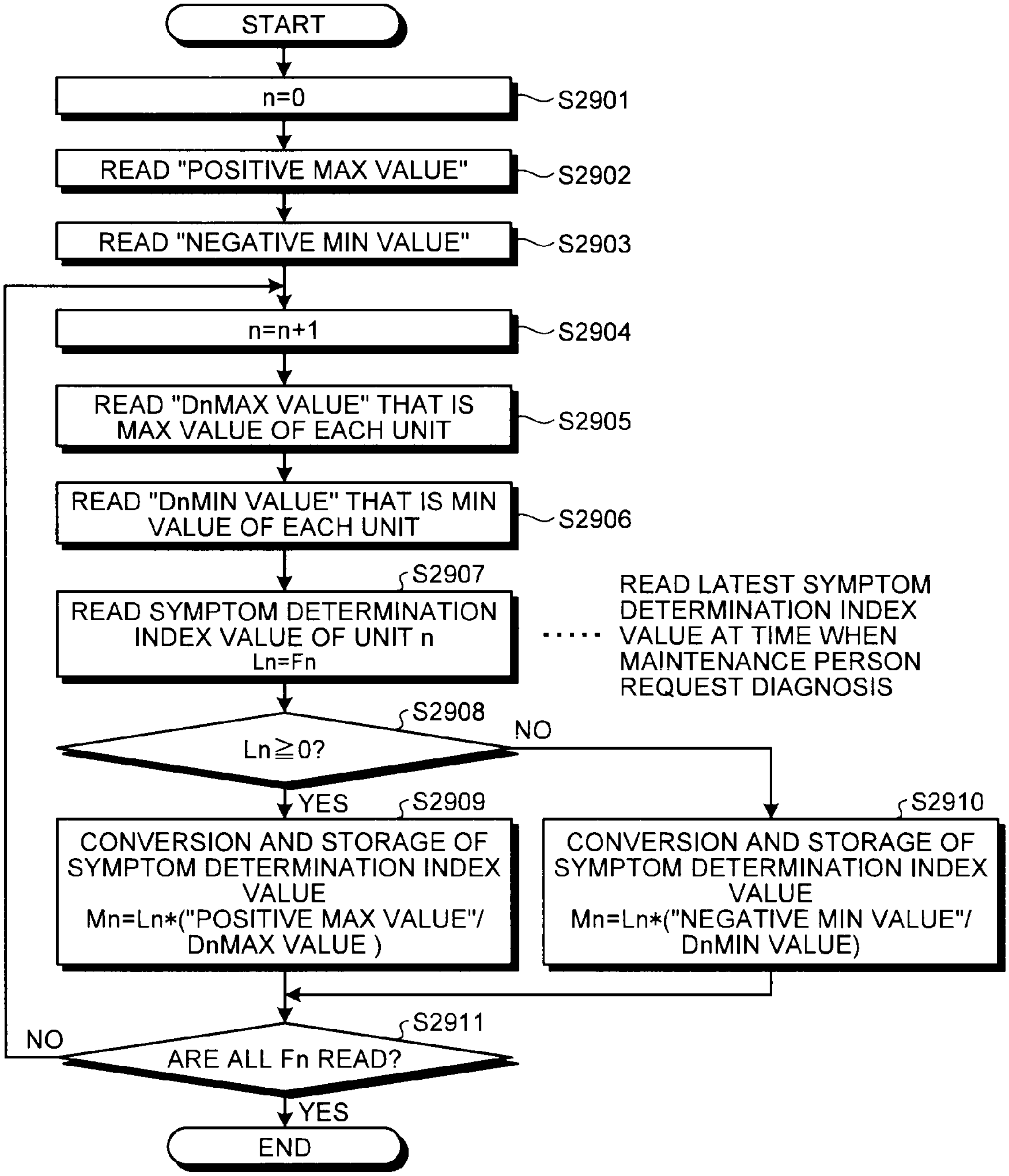
FIG. 29 is a flowchart illustrating a procedure of conversion processing for the symptom determination index value in each image forming unit.

The diagnostic value information converter 652 for each unit converts the symptom determination index value F of each image forming unit received by the diagnostic value information delivery unit 651 for each unit by using the conversion table, and stores the converted symptom determination index value to the diagnostic value information storage unit 658 for each unit as diagnostic value information. The reason why the symptom determination index value is converted is as follows. The symptom determination index values diagnosed by abnormality occurrence symptom determiners 1 to n for the respective image forming units (image forming functional parts) of the abnormality occurrence symptom determiner 635 have different maximum values (MAX values) and minimum values (MIN values) from each other. In order to uniform the ranges of the symptom determination index values, the MAX value and the MIN value are converted by using the conversion table. The converted symptom determination index value by using the conversion table is stored as the diagnostic value information for each abnormality occurrence symptom determiner (FIGS. 28, 29, and 30).

The diagnosis request information reception unit 654 receives a request of acquiring diagnostic information including apparatus identifier information from a PC 690 of a maintenance person who performs maintenance operation at a customer site, and transmits the apparatus identifier information included in the request of acquiring the diagnostic information to the integrated diagnostic information generator 653.

When receiving the apparatus identifier information included in the request of acquiring the diagnostic information, the integrated diagnostic information generator 653 reads replacement part information of the apparatus identifier from the maintenance management system 680 through the replacement part information acquisition unit 655 such that the information of past about two weeks from the diagnosis requested date is included, and transmits the replacement part information to the weighting judgment table generator 656 for each replacement part information. The replacement part information includes replaced part number information, the number of replaced parts, and replacement date information.

The weighting judgment table generator 656 for each replacement part information performs weight determination for each replacement part information, and calculates an inverse number of the weight. The weighting judgment table generator 656 for each replacement part information transmits the information of the inverse number of each replaced part to the integrated diagnostic information generator 653 as the weight information of each replaced part.

The weighting judgment table generator 656 for each replacement part information determines the weight of the replacement part information based on the replacement date information included in the replacement part information in the following manner.

Part replacement performed one day before the diagnosis requested day=weight 1

Part replacement performed two days before the diagnosis requested day=weight 2

Part replacement performed three days before the diagnosis requested day=weight 3

The information indicating how many days past from the replacement date till the diagnosis requested date and the weight value are registered in the judgment table in advance.

When receiving the request of acquiring the diagnostic information including the apparatus identifier information from the maintenance person as described above, the integrated diagnostic information generator 653 reads the latest diagnostic information of each image forming unit from the diagnostic value information storage unit 658 for each unit, and acquires the weight information (inverse number information) of each replacement part information relating to the apparatus identifier information from the weighting judgment table generator 656 for each replacement part information. The integrated diagnostic information generator 653 calculates the integrated diagnostic value information for each unit by using the following formula.

Integrated diagnostic value information for each image forming unit={a symptom determination index value after conversion for each image forming unit (image forming functional part)}+{weight value of each replacement part information (information of the squared value of the inverse number)}

The integrated diagnostic information generator 653 sorts the calculated final diagnostic value information of each image forming unit in the order from smallest (in the order from highest priority) to larger value. The total diagnosed result information notification unit 657 delivers the sorted final diagnostic value information of each image forming unit to the PC 690 of the maintenance person having made the request for acquiring the diagnostic information. The maintenance person utilizes the final diagnostic value information for maintenance operation.

A method may be employed in which the management apparatus 630 allows a display 640 to display an alarm for notifying an operator in a control center, when it is determined that abnormality is found after the inference engine of failure symptom composed of the abnormality occurrence symptom determiner 635, the constant database 636, and the display controller 637 performs failure symptom determination based on the status data of each apparatus identifier in the status database 632 every receiving of the status data of each copying machine.

The failure symptom determination is a calculation with comparatively few steps and can be performed by each copying machine. However it is advantageous the management apparatus 630 performs the failure symptom determination, because, when the target data creation method (e.g., feature amount calculation method) and the determination constant are modified to be improved, improvement is only performed for management apparatus 630 and the inference quality can be improved thoroughly in an integrated fashion. In addition, the determination is performed by using a boosting method with relatively few steps. Therefore, even extensive logs (accumulated status data) can be sequentially determined with high speed. The conventional determination method has a problem of a complicated determination. For example, primary status determination is performed by an apparatus, and secondary diagnosis is performed if necessary because of the limitation of the execution time. However, the use of the boosting method can resolve the problem.

Once an alarm that abnormality occurrence symptom is present is made from the inference engine of the failure symptom determination, an operator of the management apparatus 630 informs a user of the corresponding copying machine to confirm the status and arranges repair parts for the maintenance of the corresponding copying machine by using a parts management system. The arrangement of a service engineer is performed by informing a call center operator. The service engineer is dispatched to the location of the corresponding copying machine, and replaces parts to be repaired with new parts, for example. Thereafter, the service engineer inputs the maintenance report to the parts management system so as to keep the maintenance record.

Status Data Accumulation

Figure 14:
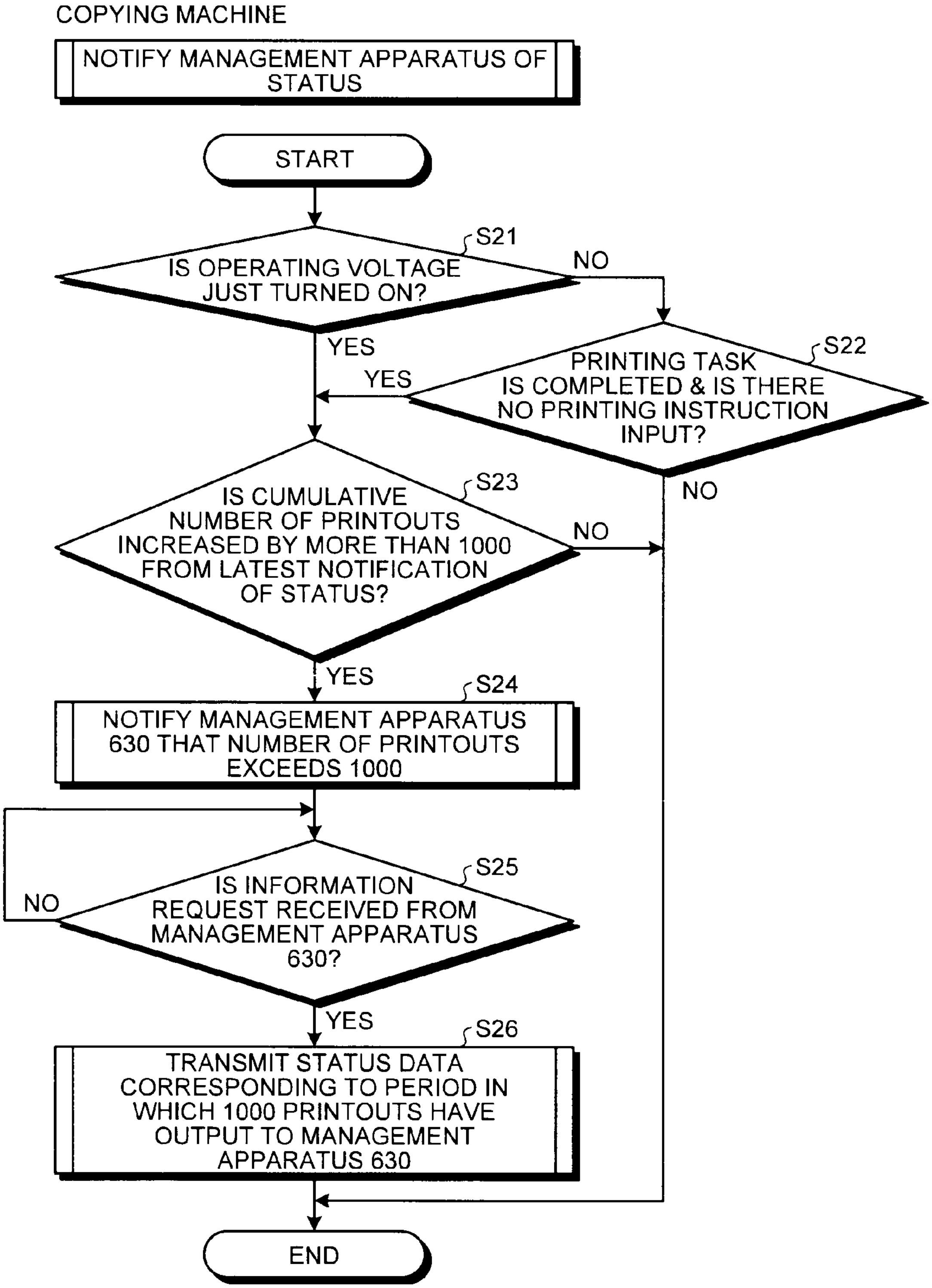
FIG. 14 is a flowchart illustrating operation of the copying machine 601 illustrated FIG. 1 when the copying machine 601 transmits status data to the management apparatus 630.

FIG. 14 illustrates a control overview of status data transmission performed by the engine control 510 of the copying machine 601. Just after the engine control 510 receives an operating voltage and completes initialization of the units to be controlled, or while waited for next printing instruction after completion of printing or copying (hereinafter both are referred to as printing), and the cumulative number of printouts increases by more than 1000 (sheets) from the latest notification of status data to the management apparatus 630 (step S21 to step S23), the engine control 510 notifies the management apparatus 630 that status data is accumulated through the system controller 501 of the copying machine 601

(step S24). In response to the notification, the data collection & delivery unit 631 of the management apparatus 630 requests the copying machine to transfer the status data (step S25). In response to the request, the system controller 501 of the copying machine transmits the status data accumulated after completion of the latest status data transmission in the NV-RAM of the engine control 510 to the management apparatus 630 (step S26). The other copying machines transmit status data to the management apparatus 630 in the same manner as described above. The communications request may be made to the management apparatus 630 every fixed time period of motor operation because the cumulative number of printouts does not always equal to a time period in which the apparatus deteriorates as being driven by the motor. The data amount in communications may be adjustable by setting the communication interval if necessary or by setting the communications interval to be adjustable.

Abnormality Occurrence Symptom Determination

Figure 15:
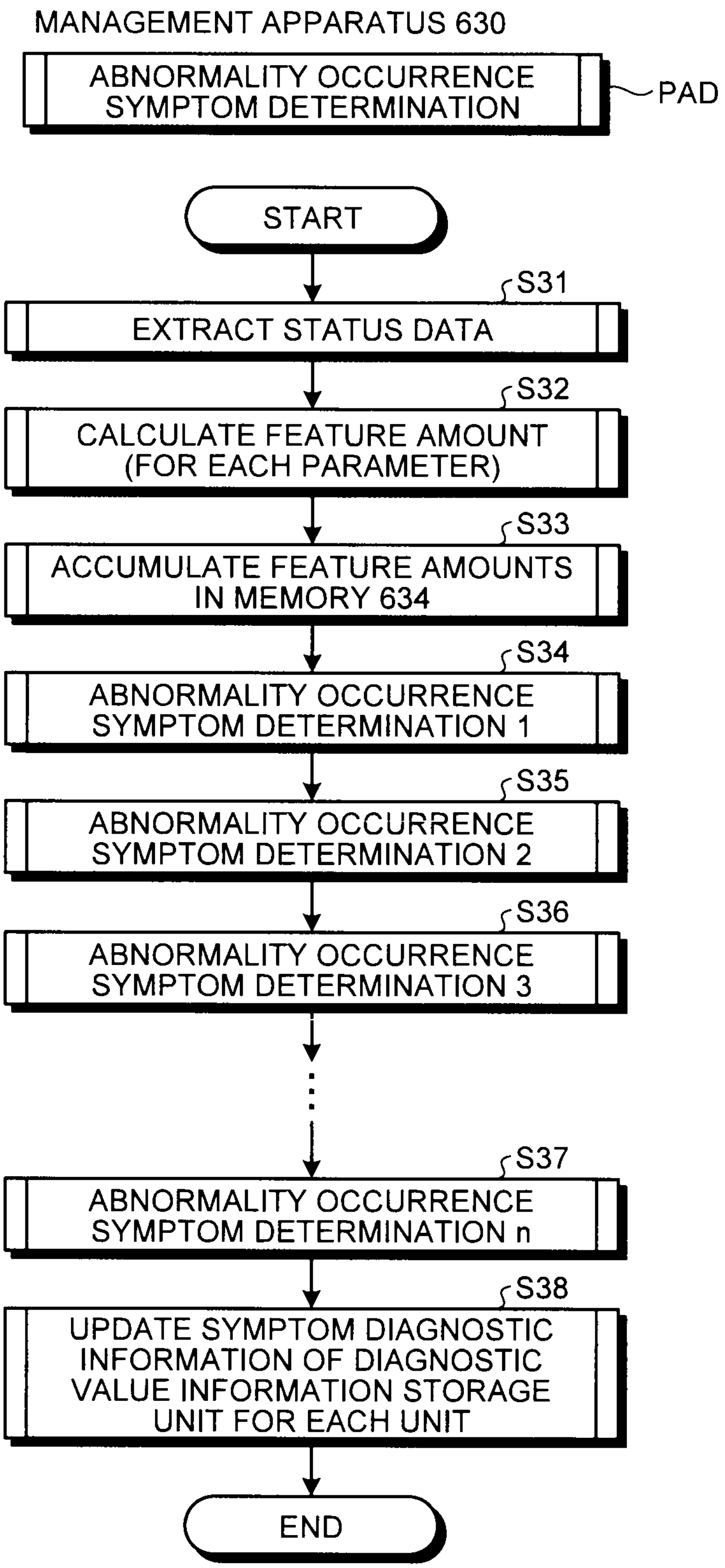
FIG. 15 is a flowchart illustrating an overview of abnormality occurrence symptom determination performed by the management apparatus 630 illustrated in FIG. 1.

FIG. 15 illustrates an overview of abnormality occurrence symptom determination processing performed by the system controller 638 of the management apparatus 630. The processing is performed, when a certain copying machine transmits status data, on a status data group of the copying machine in the status database 632. In the embodiment, 31 types of status data are subjected to the processing out of the status data group.

Figure 16:
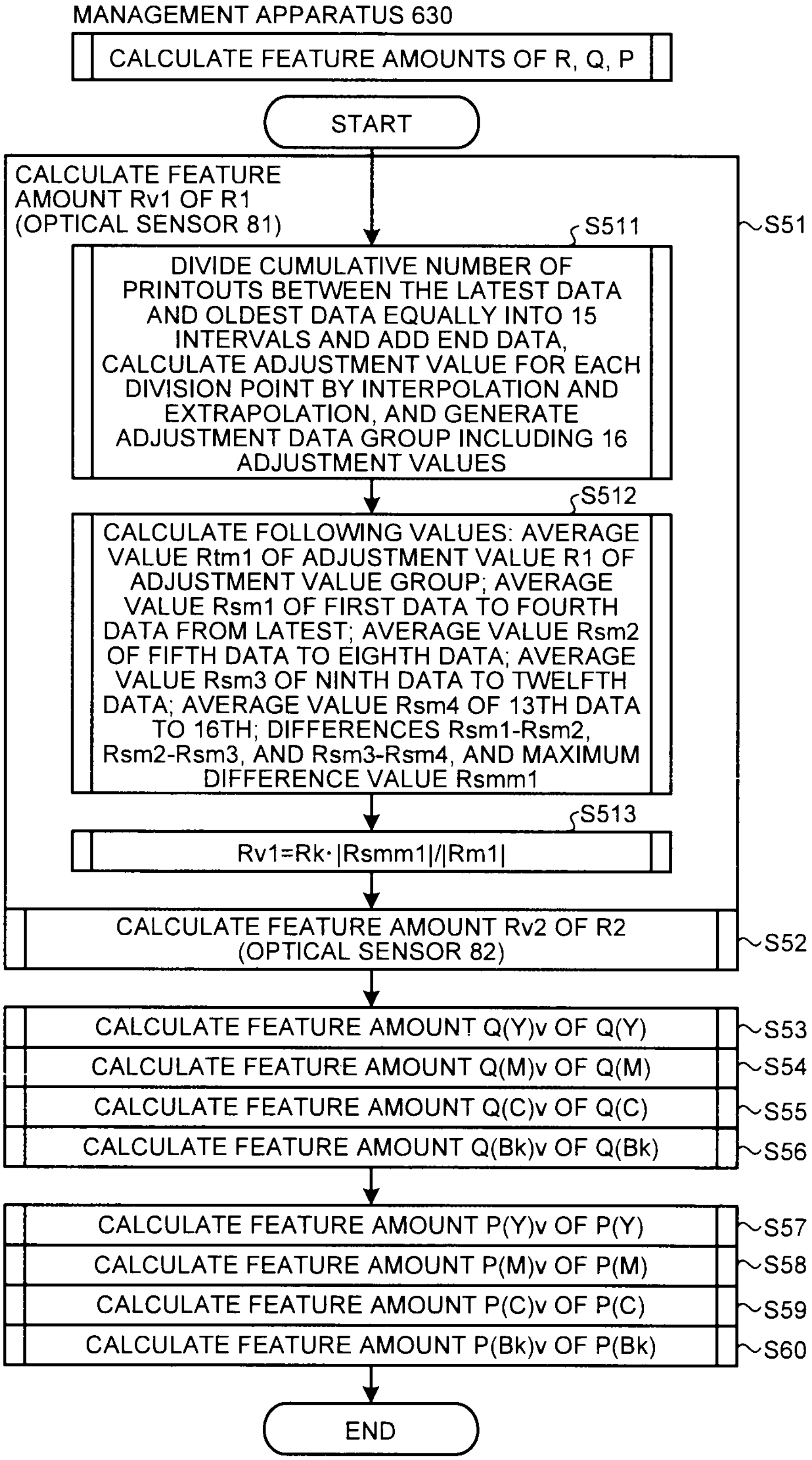
FIG. 16 is a flowchart illustrating an overview of generating, in the copying machine 601, target data (feature amount) of a luminous intensity adjustment value R of the optical sensors 81 and 82, a developing bias correction value Q of each color and an exposure amount correction value P of each color.

In the "abnormality occurrence symptom determination" PAD, the management apparatus 630 allows the feature amount calculator 633 of the inference engine of the failure symptom determination to extract 16 pieces of data, from the latest to older data, from each of status data R, Q, and P out of 31 types of status data of the copying machine as the function of feature amount calculation (step S31), and the feature amount calculator 633 calculates the feature mounts for each status data (R, Q, and P) (step S32). In the embodiment, the temporal distribution (change pattern) of 16 pieces of status data is converted into an index value representing the feature. This conversion processing is specified for each status data (R, Q, and P). The feature amounts include, as illustrated in FIG. 16, 10 types of feature amounts Rv1, Rv2, Q(Y)v, Q(M)v, Q(C)v, Q(Bk)v, P(Y)v, P(M)v, P(C)v, and P(Bk)v. An "abnormality occurrence symptom determination 1" at step S34 (described below) in which only these feature amounts are target data is used for determining cleaning defect (incomplete black cleaning) of the photosensitive element 40 (Bk) for forming a Bk image and/or cleaning defect (including stuck stain) of the intermediate transfer belt 10.

FIG. 16 illustrates only feature amount calculation of the luminous intensity adjustment value R, the developing bias correction value Q, and the exposure amount correction value P. As for a luminous intensity adjustment value R1 of the optical sensor 81, the difference between the cumulative number of the printouts of the latest data and the cumulative number of the printouts of the oldest data is divided equally into 15 intervals. The latest data and the oldest data correspond to both end data of 16 pieces of data. Each data value of a corresponding divided point is calculated by interpolation and extrapolation methods. As a result, 16 pieces of data including both end data is newly generated (step S511). Next, an average value Rtm1 of the new 16 pieces of data (the first data to 16th data from the latest data), an average value Rsm1 of the first data to the fourth data, an average value Rsm2 of the fifth data to the eighth data, an average value Rsm3 of the ninth data to twelfth data, and an average value Rsm4 of 13th data to 16th data are calculated. Then, the differences Rsm1−Rsm2, Rsm2−Rsm3, and Rsm3−Rsm4 are calculated to find the maximum difference value Rsmm1 (step S512). Then, a feature amount Rv1 of the luminous intensity adjustment value R is calculated by the following formula (step S513).

$$Rv1 = Rk \cdot |Rsmm1| / |Rm1|$$

Rk is the coefficient (fixed value) that adjusts the range of the calculated value. As described at step S51, the feature amount Rv1 of the luminous intensity adjustment value R1 of the optical sensor 81 is calculated. The calculation of the feature amount Rv2 of a luminous intensity adjustment value R2 of the optical sensor 82 at step S52, the calculation of the feature amount Q(Y)v, Q(M)v, Q(C)v, and Q(Bk)v of the developing bias adjustment values Q(Y), Q(M), Q(C), and Q(Bk) for adjusting each color toner density at step S53 to step S56, and the calculation of the feature amount P(Y)v, P(M)v, P(C)v, and P(Bk)v of the exposure amount adjustment values P(Y), P(M), P(C), and P(Bk) for adjusting each color toner density at step S57 to step S60 are the same as that of calculation of the feature amount Rv1 at step S51.

Figure 17:
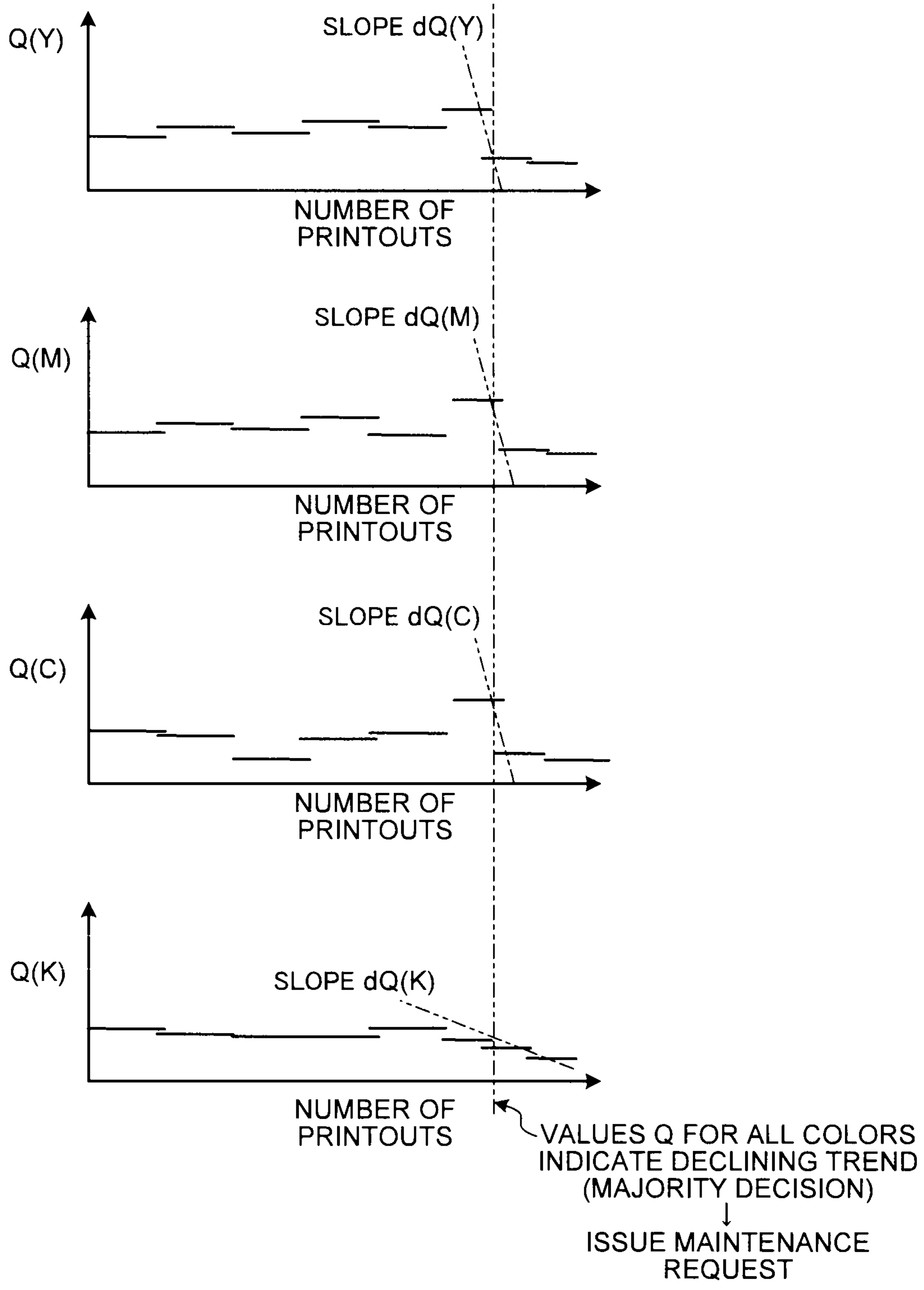
FIG. 17 illustrates graphs representing overviews of changes of developing bias adjustment values Q(Y), Q(M), Q(C), and B(Bk) when a toner density for each color is adjusted.

As illustrated in FIG. 17, the calculated feature amounts correspond to the slant or the speed of the adjustment value change of each of the developing bias adjustment values Q(Y), Q(M), Q(C), and Q(Bk) for adjusting each color toner density.

These feature amounts are data used for the abnormality occurrence symptom determination. The feature amount can be obtained by using various formulas in addition to the difference value. For example, a regression value of signal change, and a standard deviation, a maximum value, and an average of a plurality of pieces of recent data may be used to calculate the feature amount. Many methods for extracting features of such time-series signals are proposed, such as the ARIMA model. Any appropriate method may be employed.

Symptom of abnormality occurrence can be determined by detecting peculiar unstable movements, in various ways, of signals that are normally stable. Any appropriate feature amount extraction method may be selected based on this point of view. The indicator of time passage is not limited to the cumulative number of printouts. An accumulated operation time or an actual time passage can be used. The use of a feature amount including no temporal calculation factor and status data without being processed as data for the abnormality occurrence symptom determination does not adversely affect the merit of the present invention. For example, the detected status value at the determination stage may be used as data for the abnormality occurrence symptom determination. More specifically, target data of abnormality occurrence symptom determination is either one or both of the feature amounts produced based on status data and the status data.

Referring back to FIG. 15, the feature mounts produced by calculation and other produced target data are accumulated in the feature amount memory 634 (step S33). In the embodiment, the abnormality occurrence symptom determinations 1 to n at step S34 to step S37 are performed as n types of abnormality occurrence symptom determinations by using several pieces or all pieces of target data out of the produced target data group.

Figure 18:
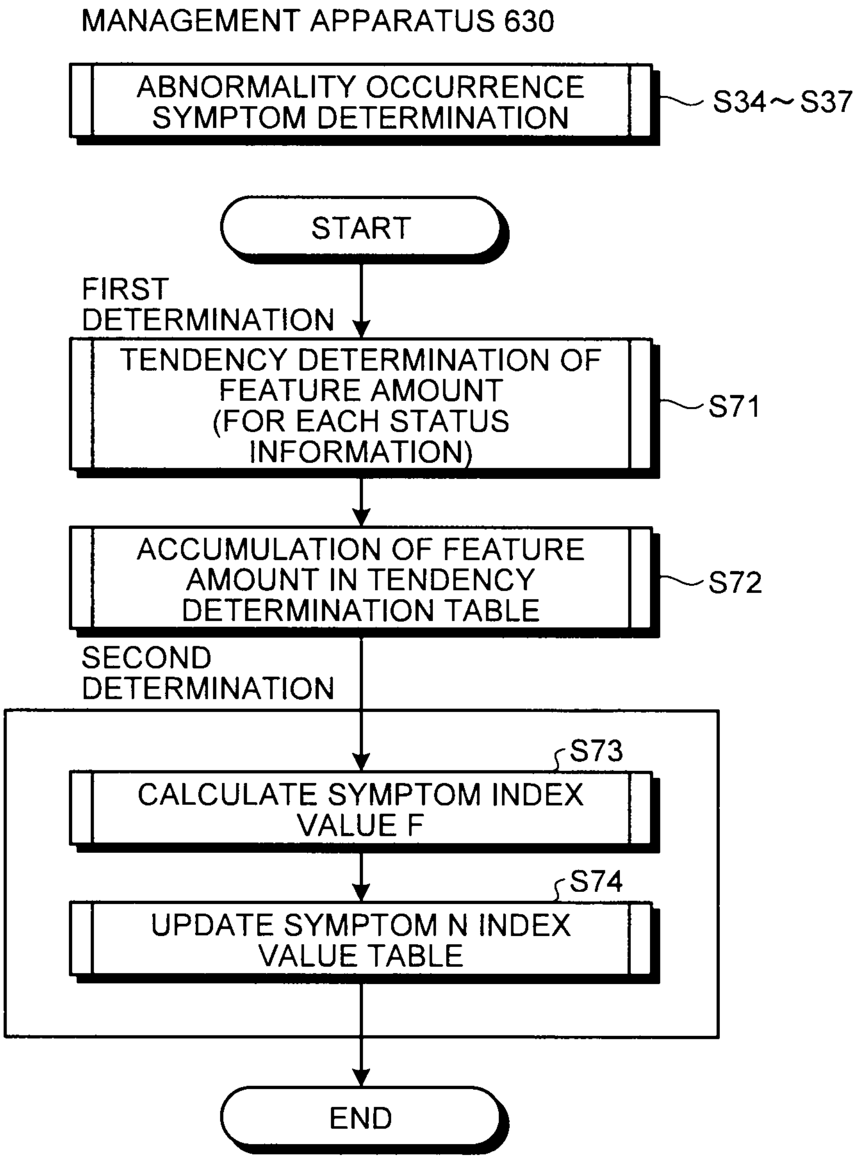
FIG. 18 is a flowchart illustrating an overview of data processing common to abnormality occurrence symptom determinations 1 to n illustrated in FIG. 15.

FIG. 18 illustrates common processing in the abnormality occurrence symptom determinations illustrated at step S34 to step S37. A first determination (preliminary determination: stamp determination (weak determination)) is described below.

At each abnormality occurrence symptom determination, in the first determination, the tendency of each calculated feature amount Cj is determined by using formula (1) (step S71), and the tendency determination results (stamp determination results) are accumulated in a tendency determination table (a region of the RAM in the management apparatus 630)

provided for each stamp determination (step S72). In the tendency determination (stamp determination), each feature amount is determined only whether the feature amount is larger or smaller than a reference value as a first determination unit.

More specifically, with reference to each feature amount (condition data) Cj (herein, C1 to C10), from the symptom determination table (FIG. 19) stored in the constant database 636, reference values bi and sgni allocated to Di that corresponds to a certain stamp determination and indicates the feature mount to be referred to are selected for each stamp determination, and an Outi value is calculated by using formula (1). The calculation result is classified into two values: "1" indicates that abnormality occurrence tendency is absent while "−1" indicates that abnormality occurrence tendency is present. Meanwhile, a weight αi is also selected for each stamp determination. A tendency determination table (results of calculation for each stamp determiner by using formula (1)) is illustrated in FIG. 25.

$$\text{Out } i=1 \leftarrow (sgn\ i \times (Di-bi)) \geqq 0$$

$$\text{Out } i=-1 \leftarrow (sgn\ i \times (Di-bi)) < 0 \qquad (1)$$

where bi is the threshold of the reference axis Di (condition data Cj) specified for each stamp determiner (weak determiner) and sgni is the determination polarity of the reference axis Di (condition data Cj) specified for each stamp determiner (weak determiner). Both bi and sgni are judgment conditions fixed by using the boosting method described later. When the calculation using formula (1) is performed to the number of stamp determiners (in the embodiment, D1 to D31), the weight αi is also selected for each stamp determiner.

Next a weighted majority decision calculation is performed on the tendency determination results by using formula (2) as a second determination unit (step S73).

$$F = \sum_{i=1}^{i=k} (\alpha i \times \text{Out } i) \qquad (2)$$

More specifically, the symptom determination index value F is calculated by formula (2) by using the Outi value calculated by formula (1) and the weight αi selected by the calculation using formula (1) (where i=1 to 31). The Outi value is calculated, as describe above, by formula (1) with the reference values bi and sgni allocated for Di of each stamp determination (in the embodiment, D1 to D31) in the symptom determination reference data table (FIG. 19). The reference values bi and sgni are selected in the order of Di, i.e., D1 to D31, and the calculation of the Outi is performed in this order.

The symptom determination index values F of the respective image forming functional units (image forming functional parts) are accumulated and updating in the symptom index value tables (a region of the RAM in the management apparatus 630) provided for each abnormality occurrence determination (step S74).

Figure 22:
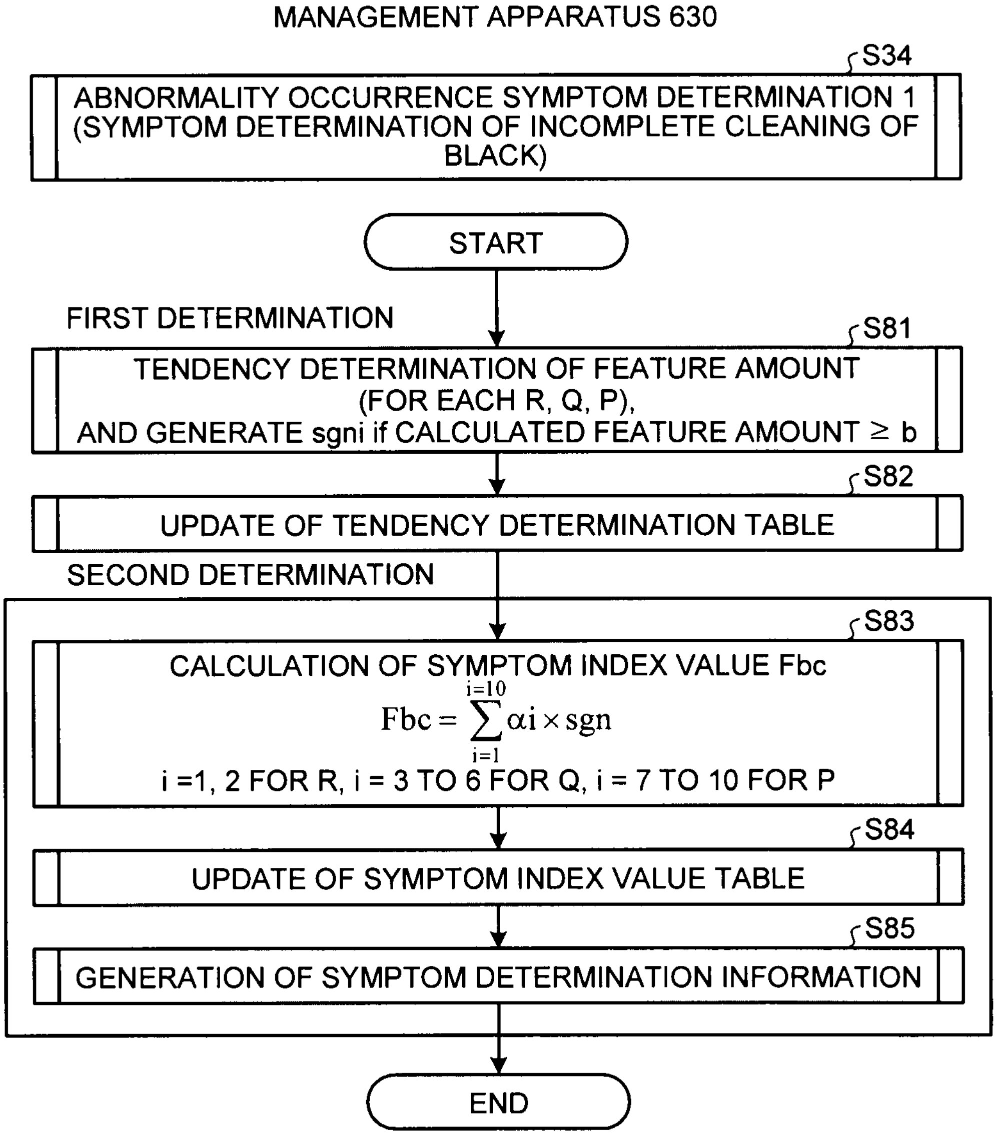
FIG. 22 is a flowchart illustrating a procedure of an abnormality occurrence symptom determination 1 illustrated in FIG. 15.

FIG. 22 illustrates the processing of the abnormality occurrence symptom determination 1 at step S34 that is the first step of the abnormality occurrence symptom determinations at step S34 to step S37. At step S34 (the abnormality occurrence symptom determination 1), each value of calculated target data (feature amounts) Rv1, Rv2, Q(Y)v, Q(M)v, Q(C)v, Q(Bk)v, P(Y)v, P(M)v, P(C)v, and P(Bk)v is classified into two values "0" and "1" as follows. If the value is equal to or smaller than a reference value b (No. 1 to 10) of the symptom determination reference data table for the abnormality occurrence symptom determination 1, "0" is allocated that represents no abnormality occurrence tendency is present, while the value is equal to or larger than the reference value b, "1" is allocated that represents abnormality occurrence tendency is present (step S81). Then, the tendency determination table is updated (step S82). The symptom determination reference data table used in this case is the same as that illustrated in FIG. 19. The status information No. 1 to 10 are provided for each piece of the target data (feature amounts) Rv1, Rv2, Q(Y)v, Q(M)v, Q(C)v, Q(Bk)v, P(Y)v, P(M)v, P(C)v, and P(Bk)v. Therefore reference value b is composed of b1 to b10.

Figure 20:
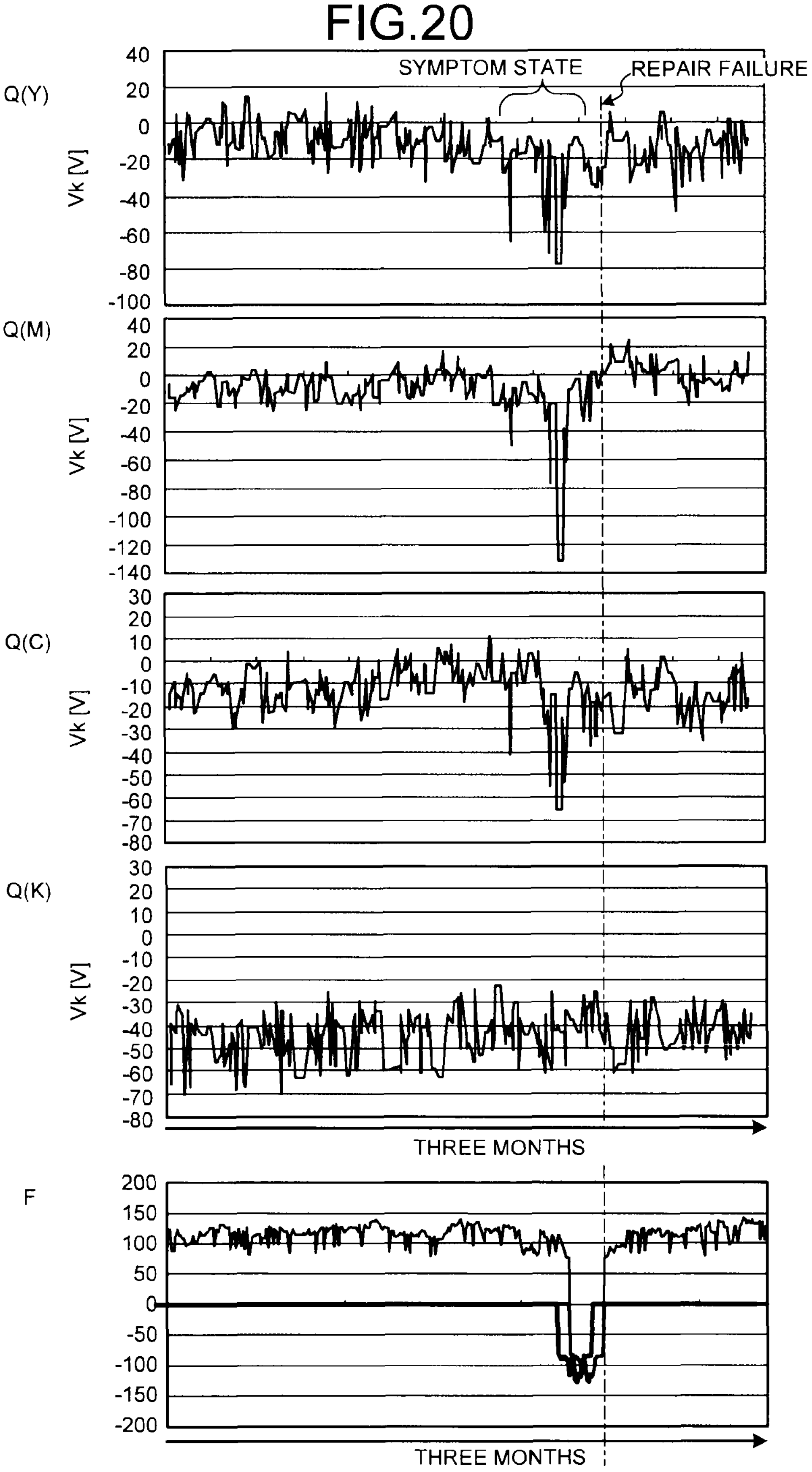
FIG. 20 illustrates graphs representing variations of the developing bias adjustment values Q for the respective colors in image formation in the copying machine 601 and the symptom determination index values F calculated by an abnormality occurrence symptom determiner generated based on the developing bias adjustment values Q.
Figure 21:
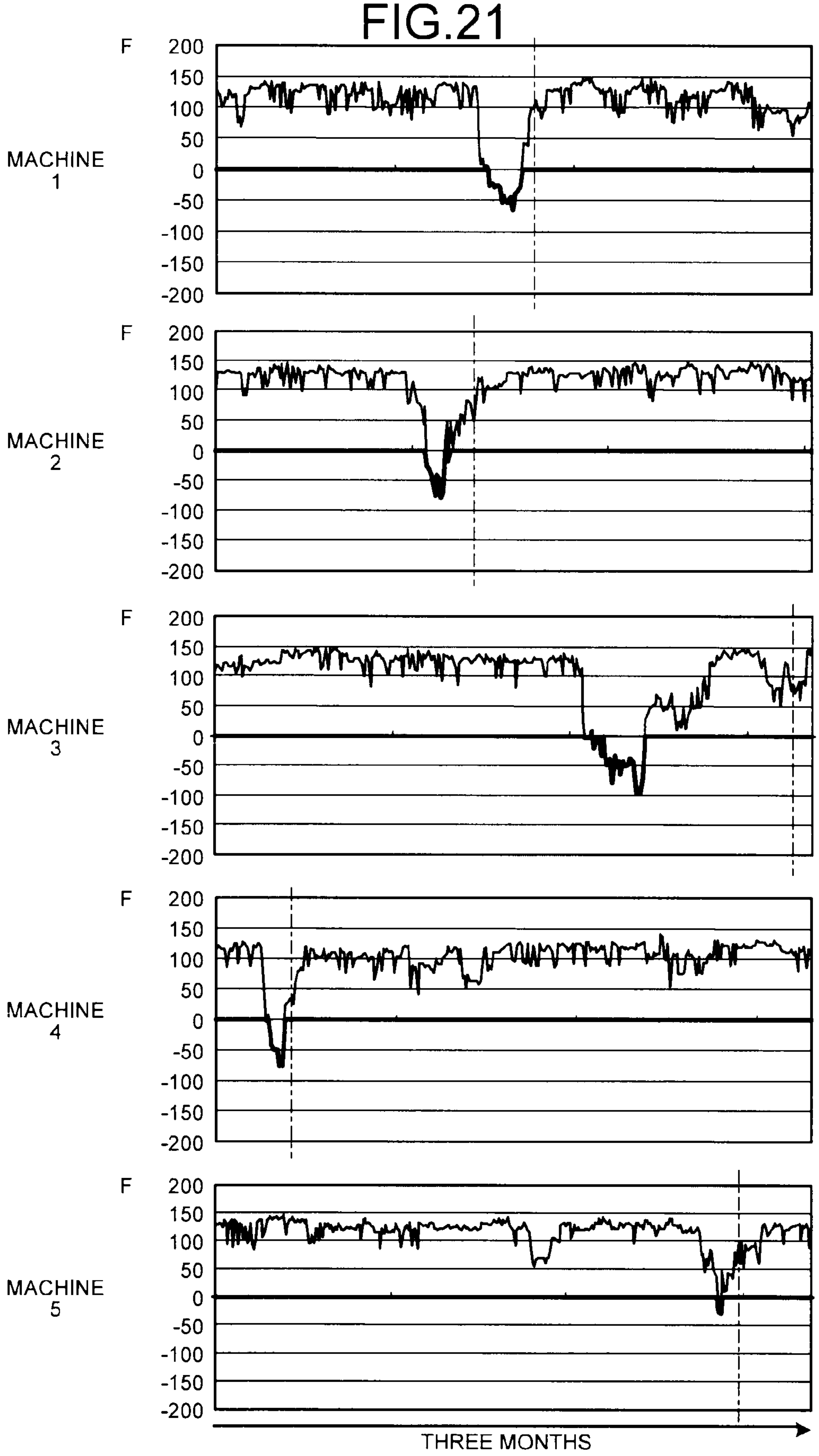
FIG. 21 illustrates graphs representing changes of the symptom determination index values F of five copying machines.

Then, the weighted majority decision calculation, which is the second determination unit, is performed on tendency determination results (step S83). More specifically, either a negative polarity (−) or a positive polarity (+) is given to the weight α (α1 to α10) allocated to each target data in the symptom determination reference data table based on the tendency determination result. If the tendency determination result is "1" (abnormality occurrence tendency is present), the negative polarity (−) is given while if the tendency determination result is "0" (no abnormality occurrence tendency is present), the positive polarity (+) is given. Then, the weights α are added. The polarity data is represented as "sgn". The added value is defined as a symptom determination index value Fbc. The symptom determination index value Fbc is accumulated in a symptom index value table 1 for the abnormality occurrence symptom determination 1 (step S84). An example of the symptom determination index value Fbc is shown at the bottom of FIG. 20, and other examples are illustrated in FIG. 21. When the symptom determination index value Fbc is less than or equal to zero, symptom determination information A1: "1" is produced that represents abnormality occurrence symptom is present while when the symptom determination index value Fbc is larger than zero, symptom determination information A1: "0" is produced that represents no abnormality occurrence symptom is present (step S85).

Referring back to FIG. 15, The 31 types of target data produced at step S32 are classified into abnormality occurrence symptom determination groups for respective abnormalities, such as incomplete cleaning, image abnormality, registration failure of transfer sheet, toner shortage, and hardware abnormality (some target data belong to multiple groups). At step S34 (the abnormality occurrence symptom determination 1), 10 types of target data (feature amounts) Rv1, Rv2, Q(Y)v, Q(M)v, Q(C)v, Q(Bk)v, P(Y)v, P(M)v, P(C)v, and P(Bk)v are used as a group to determine the symptom of incomplete cleaning. The "abnormality occurrence symptom determination 2" at step S35 to the "abnormality occurrence symptom determination n" at step S37 determine the symptom of the abnormality, such as image abnormality, registration failure of transfer sheet, toner shortage, and hardware abnormality.

Referring again to FIG. 15, when the abnormality occurrence symptom determinations 1 to n are performed (at step S34 to step S37), the diagnostic value information delivery unit 651 for each unit receives the symptom determination index values, and the symptom determination index values are converted by the diagnostic value information converter 652 for each unit, and the converted symptom determination index values are stored in the diagnostic value information storage unit 658 for each unit as the diagnostic value information.

When input to initialize repaired elements with completion of repair is received through the operation board 500, the engine control 510 of the copying machine 601 performs exceptional processing so as to avoid wrong judgment that a transitional change of the target data just after repair is determined as the symptom of abnormality occurrence. In the exceptional processing of the embodiment, the status data of the repaired element after repair is written in the status database (NV-RAM) with corrected data. When extracting 16 pieces of status data at step S31 and the corrected data is included in the status data, the feature amount calculator 633 of the management apparatus 630 does not produce the target data and does not perform tendency determination in the failure symptom determinations 1 to n at step S32, and the tendency determination data relating to the status data is set to "0", i.e., no abnormality occurrence tendency is present.

When collecting status data and identifying the abnormality of the status data, the engine control 510 of the copying machine 601 displays the abnormality on the display of the operation board 500, and transmits the status data set, the details of the abnormality (mode of the abnormality) and the occurrence of the abnormality to the management apparatus 630. The data collection & delivery unit 631 of the management apparatus 630 accumulates the received information in the status database 632 for the copying machine for accumulation, and displays the abnormality and the other information out of the received information on the display 640. The "abnormality" may be out of the symptom detection target of the abnormality occurrence symptom determination PAD, or may not be detected due to insufficient adjustment of the reference value and weight value with respect to the abnormality. In order to address such a case, the management apparatus 630 has an updating function (program) of the symptom determination reference table. The updating function can individually change the reference values and the weight values of the constant data table of the management apparatus 630. An operator having administrator right can individually change the reference values and the weight values of the symptom determination reference table of the management apparatus 630 by using the updating function.

The management apparatus 630 performs determiner generation processing with dialog and cooperation with an operator having the administrator right when the management apparatus 630 detects (determines) a symptom of abnormality occurrence notified by the copying machine without determining the occurrence of the symptom, based on status data collected from the copying machines of the same type as the copying machine and stored in the status database 632. In the processing, the management apparatus 630 produces (changes) the reference value b and the weight $\alpha$ that are used in the tendency determination (first determination) and the symptom determination (second determination) of the failure symptom determinations (1 to n) that are most useful for symptom determination of the abnormality (close symptom determination), produces the symptom determination reference table including them, and re-writes the corresponding symptom determination reference table of the constant database 636. After the processing, the management apparatus 630 determines the symptom of the abnormality having notified by the copying machine.

In the "abnormality occurrence symptom determination" PAD, only three values are used in the determination processing, i.e., the reference value b for each stamp determination for each target data, the sign (sgn) of the weight when the data is larger than the reference value, and the weight $\alpha$. In the weighted majority decision, the larger weight value $\alpha$ is given to the target data having a large influence, and the calculation is performed as $\Sigma$ sgn$\times\alpha$. Therefore, the processing load is very light.

Figure 23:
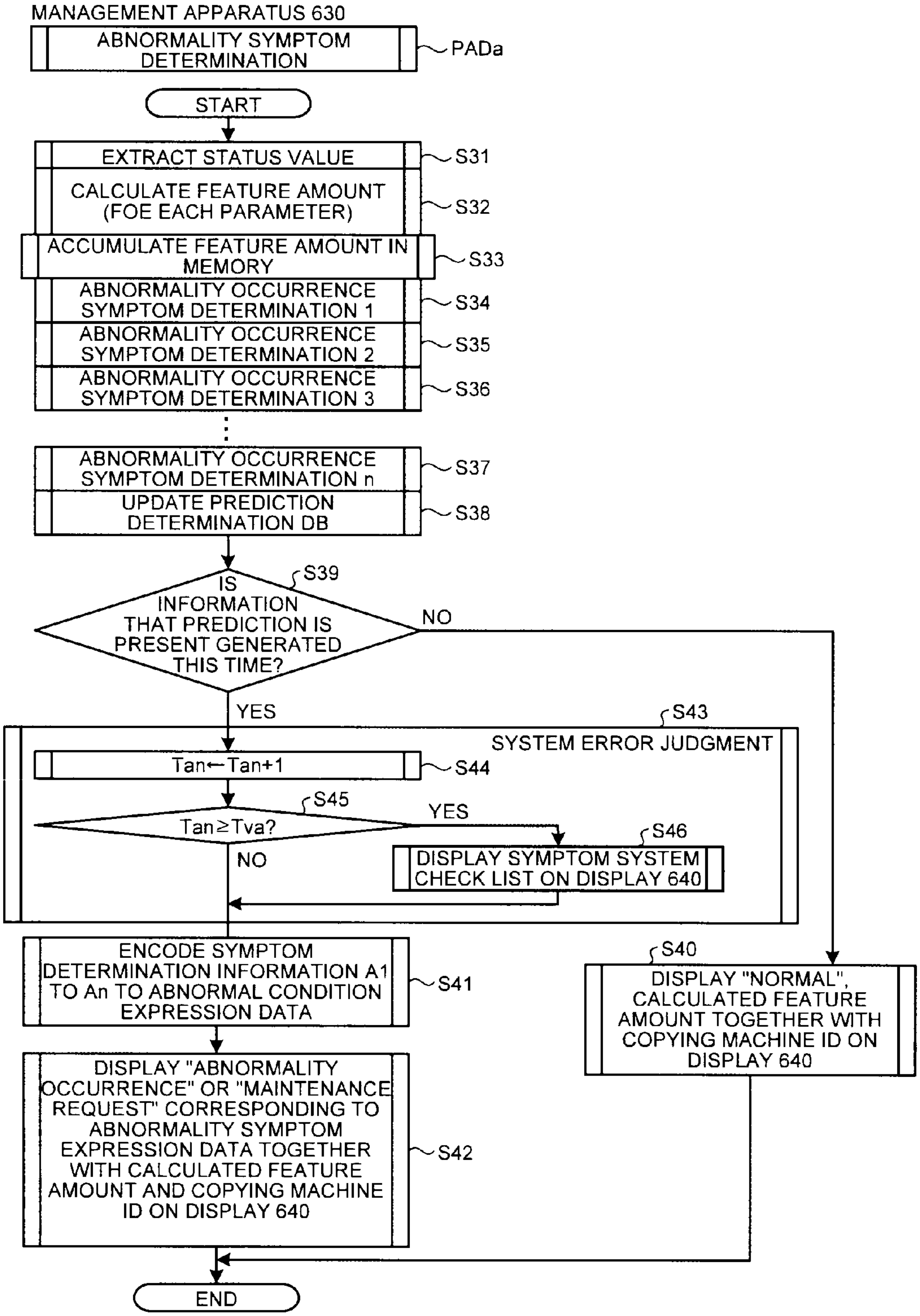
FIG. 23 is a flowchart illustrating an overview of abnormality occurrence symptom determination performed by the management apparatus 630 of a fourth embodiment.

The system error of the management system including many copying machines and the management apparatus 630 may be determined by the abnormality occurrence symptom determination. FIG. 23 illustrates an overview of an "abnormality occurrence symptom determination" PADa. In FIG. 23, after the abnormality occurrence symptom determinations 1 to n are performed, if "1" (abnormality occurrence symptom is present) is included in the produced symptom determination information A1 to An (YES at step S39), the system controller 638 of the management apparatus 630 updates Tan by adding the number of times that the presence of abnormality occurrence symptom is determined (step S44). Tan represents the number of times that the presence of abnormality occurrence symptom is determined of all of the copying machines registered in the status database 632. If updated Tan is equal to or larger than a set value Tva, necessity for an inspection of the symptom system is displayed on the display 640. In this way, the system error of the management system can be determined.

A procedure to produce the symptom determination reference table (FIG. 19) is described below. The symptom determination reference table included in the management apparatus 630 is produced by using a generally called boosting method that contains supervised learning algorithm. The boosting method is well known art. For example, the method is described in "Information geometry for statistical pattern identification" in Suhri-kagaku, No. 489, March 2004. In the method, status data of a normal condition and status data of an abnormality occurrence symptom condition are prepared. Both conditions are confirmed in advance. For example, status data logs are taken from an endurance testing of apparatuses. When abnormality occurrence is found in the testing, a time period in which a predictive condition occurs before the abnormality occurrence is estimated, and utilized as the above-described status data. The inventors have been collecting status data logs and abnormality occurrence cases of more than 10 images forming apparatuses for three months, and examined the abnormality occurrence cases.

FIG. 20 illustrates changes of the developing bias adjustment values Q of the respective colors, i.e., Q(Y), Q(M), Q(C), and Q(K), recorded for three months. During the three months period, a cleaning defect of Bk color occurred in one of copying machines operated in the market and the copying machine has been repaired. Although various data besides the developing bias adjustment values Q has been recorded and examined, only the status information Q (the developing bias adjustment values) is described herein because it has been markedly changed. As can be seen from FIG. 20, the developing bias adjustment values Q(Y), Q(M), and Q(C) varied prior to the cleaning defect of Bk color.

The target data generation (including feature mounts calculation) described at step S32 and step S51 have been performed as follows. Several pieces or all (j pieces) of the target data used for one of the "abnormality occurrence symptom determinations" (1 to n) have been chosen from the produced 31 pieces of the target data, and have been plotted in a graph in which the abscissa represents the cumulative number of printouts. The abnormality occurrence symptom period has been estimated by visual judgment. An interval corresponding to the abnormality occurrence symptom period has been labeled as "−1" (abnormality occurrence symptom period), and the other intervals are labeled as "1" (normal period). Learning has been repeated j times by the boosting method and b1 to bj, sgn1 to sgnj, and $\alpha$1 to $\alpha$j have been determined. The symptom determination reference table is produced by using b1 to bj, and $\alpha$1 to $\alpha$j. The symptom determination reference table illustrated in FIG. 19 is an example when j=31. An example of the symptom determination index value F (F value) calculated by using the symptom determination reference table is illustrated under the graph of Q(K) in FIG. 20. The learning is appropriately performed by using the labeled and supervised data, and the generation of a weak determiner (the first determination unit described at step S71 and step S81) that changes the F value to a negative value only in the symptom period, and a strong determiner (the second determination unit described at step S73 and step S74, and step S83 to step S85) that performs weighted majority decision has been confirmed. Then, whether the determiners can find appropriate results on test data that is not used for leaning has been examined. The feature amounts have been extracted from status information of five copying machines (machine 1 to machine 5) in which the similar abnormality occurrence cases occurred and examined in the same manner as described above. The results are illustrated in FIG. 21. As can be seen from FIG. 21, in each copying machine, the determiner output F value calculated by using the reference value b and the weight α changes to a negative value when the abnormality occurrence symptom condition prior to the occurrence of the similar abnormality occurrence case as intended. It has been confirmed that the determiners successfully determined the predictive conditions.

Figure 26:
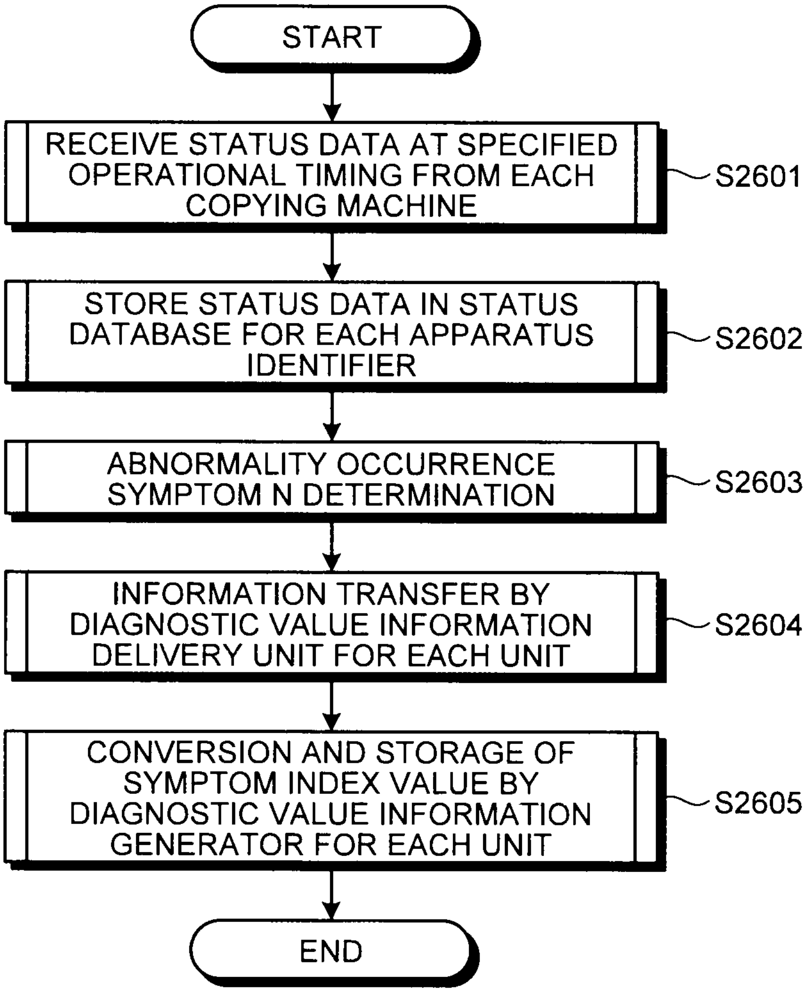
FIG. 26 is a flowchart illustrating a procedure of processing from receiving status data from the copying machine to storing diagnostic value information.

Processing from receiving status data from the copying machine to storing diagnostic value information performed by the management apparatus 630 is described below. FIG. 26 is a flowchart illustrating a procedure of the processing from receiving status data from the copying machine to storing diagnostic value information. The data collection & delivery unit 631 receives at specified operational timing the status data transmitted from each copying machine performing status notification processing illustrated in FIG. 14 together with the apparatus identifier and product serial number information of the copying machine as the transmission origin (step S2601).

The data collection & delivery unit 631 stores the received status data in the status database 632 together with the received date and time for each apparatus identifier (step S2602). FIG. 24 is an explanatory view illustrating an example of the status data registered in the status database 632 for each apparatus identifier. As illustrated in FIG. 24, the product serial number, the received date and time (received year, month, day, hour, and minute), the status data (e.g., total counter, Rv1, Rv2, and Qy) are registered by being associated with the apparatus identifier.

Then, the inference engine performs abnormality occurrence symptom determination processing described with reference to FIGS. 15, 16, 18, and 19 (step S2603). The inference engine transmits the symptom determination index value F of each apparatus identifier (each image forming unit) obtained by the abnormality occurrence symptom determination processing to the diagnostic value information delivery unit 651 for each unit.

Then, the diagnostic value information delivery unit 651 for each unit transfers the received symptom determination index value F of each apparatus identifier to the diagnostic value information converter 652 for each unit (step S2604). The diagnostic value information converter 652 for each unit converts the symptom determination index value F of each image forming unit, and stores the converted symptom determination index value F in the diagnostic value information storage unit 658 for each unit for each apparatus identifier (for each image forming unit) (step S2605).

Figure 27A:
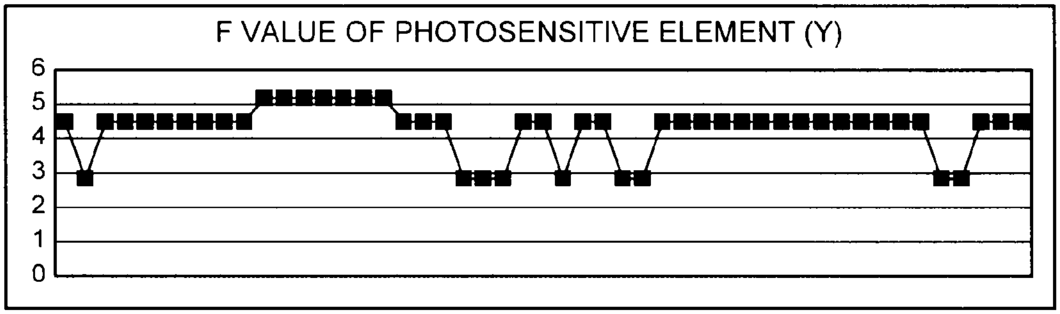
FIGS. 27A and 27B are graphs illustrating examples of symptom determination index values of the respective image forming units.
Figure 27B:
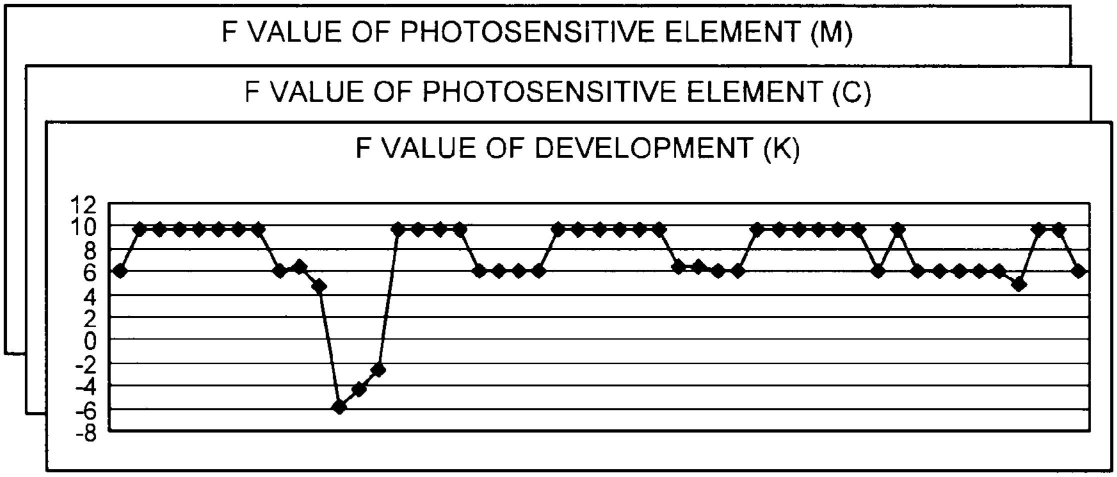

The MAX value and the MIN value of the symptom determination index value F of the image forming unit output by the abnormality occurrence symptom determination processing varies depending on image forming unit, and the range of the symptom determination index value F also varies depending on image forming unit. FIGS. 27A and 27B are graphs illustrating examples of symptom determination index values of the respective image forming units. As illustrated in FIGS. 27A and 27B, among the image forming units (functional parts), "the positive MAX value" of the photosensitive element (Y) is 5 while "the negative MIN value" of the development (K) is −6. The range varies depending on image forming unit. Simple comparison of the symptom determination index values having different ranges between the respective image forming units does not result in accurate comparison of the image forming units in the descending order of failure occurrence prediction (comparison in the ascending order of the symptom determination index value) at a specific time. The value of integrated diagnostic information produced by the integrated diagnostic information generator 653 may be inaccurate. As a result, improper maintenance operation may be performed.

In order to adjust the range, the "positive MAX value" and the "negative MIN value" out of the symptom determination index values in all of the image forming units up to the present are stored in a memory, for example. In addition, the conversion table is also produced that stores the "positive MAX value" and the "negative MIN value" out of the symptom determination index values up to the present for each image forming unit. The diagnostic value information converter 652 for each unit converts the symptom determination index value of each image forming unit by using the conversion table, and stores the converted symptom determination index value in the diagnostic value information storage unit 658 for each unit.

More specifically, the diagnostic value information converter 652 for each unit produces the conversion table storing the "positive MAX value" and the "negative MIN value" of the symptom determination index values of each image forming unit, and the "positive MAX value" and the "negative MIN value" of the symptom determination index values of all of the image forming units up to the present based on the symptom determination index value F of each image forming unit delivered from the diagnostic value information delivery unit 651 for each unit, and converts the symptom determination index value at the time when the status data is acquired with reference to the conversion table. Then, the diagnostic value information converter 652 for each unit stores the converted symptom determination index value in the diagnostic value information storage unit 658 for each unit as the diagnostic value information.

FIG. 28 is a flowchart illustrating a procedure of processing to produce the conversion table. FIGS. 30A, 30B, and 30C are explanatory views illustrating examples of symptom determination index values before conversion, during conversion, and after conversion.

The diagnostic value information converter 652 for each unit initializes a variable n used as a number of an image forming unit to zero (step S2801). Then, the diagnostic value information converter 652 reads the "positive MAX value" and the "negative MIN value" from the symptom determination index values of all of the image forming units so far (step S2802 and step S2803). Then, the diagnostic value information converter 652 for each unit increments the variable n by one (step S2804), and reads a "DnMAX value" that is the MAX value of each image forming unit and a "DnMIN value" that is the MIN value of each image forming unit (step S2805 and S2806). Here, Dn (D1, D2, and the like) are arranged in the order in which the symptom determination index value of each unit in the symptom index value table is temporarily stored as illustrated in FIG. 30B.

Next, the diagnostic value information converter 652 for each unit reads the symptom determination index value Fn of the image forming unit n, and assigns the symptom determination index value Fn to variable Ln (step S2807). Then, the diagnostic value information converter 652 for each unit determines whether or not the variable Ln is positive (step S2808).

If the variable Ln (symptom determination index value Fn) is positive (YES at step S2808), the diagnostic value information converter 652 for each unit determines whether the "positive MAX value" read at step S2802 is equal to or smaller than the variable Ln (step S2809). Then, if the "positive MAX value" is equal to or smaller than the variable Ln (YES at step S2809), the diagnostic value information converter 652 for each unit assigns the variable Ln to the "positive MAX value" (step S2810).

On the other hand, if the "positive MAX value" is larger than the variable Ln (NO at step S2809), the diagnostic value information converter 652 for each unit skips step S2810.

Then, the diagnostic value information converter 652 for each unit determines whether the DnMAX value is equal to or smaller than the variable Ln (step S2811). If the DnMAX value is equal to or smaller than the variable Ln (YES at step S2811), the diagnostic value information converter 652 for each unit assigns the variable Ln to the DnMAX value (step S2812).

On the other hand, if the DnMAX value is larger than the variable Ln (NO at step S2811), the diagnostic value information converter 652 for each unit skips step S2812.

If the variable Ln (symptom determination index value Fn) is negative (NO at step S2808), the diagnostic value information converter 652 for each unit determines whether the "negative MIN value" read at step S2803 is larger than the variable Ln (step S2814). If the "negative MIN value" is larger than the variable Ln (YES at step S2814), the diagnostic value information converter 652 for each unit assigns the variable Ln to the "negative MIN value" (step S2815).

On the other hand, if the "negative MIN value" is equal to or smaller than the variable Ln (NO at step S2814), the diagnostic value information converter 652 for each unit skips step S2815.

Then, the diagnostic value information converter 652 for each unit determines whether the DnMIN value is larger than the variable Ln (step S2816). If the DnMIN value is larger than the variable Ln (YES at step S2816), the diagnostic value information converter 652 for each unit assigns the variable Ln to the DnMIN value (step S2817).

On the other hand, if the DnMIN value is equal to or smaller than the variable Ln (NO at step S2816), the diagnostic value information converter 652 for each unit skips step S2817.

After performing processing as described above, the diagnostic value information converter 652 for each unit determines whether the symptom determination index values Fn of all of the image forming units have been read (step S2813), if they have not been read (NO at step S2813), the diagnostic value information converter 652 for each unit performs step S2804 to step S2817 until the symptom determination index values Fn of all of the image forming units are read. The conversion table is produced by the processing performed in this way.

FIG. 29 is a flowchart illustrating a procedure of conversion processing of the symptom determination index value for each image forming unit.

The diagnostic value information converter 652 for each unit initializes variable n used as an image forming unit number to zero (step S2901). Then, the diagnostic value information converter 652 for each unit reads the "positive MAX value" and the "negative MAX" (step S2902 and step S2903). Then, the diagnostic value information converter 652 for each unit increments the variable n by one (step S2904), and reads the "DnMAX value" that is the MAX value of each image forming unit and the "DnMIN value" that is the MIN value of each image forming unit (step S2905 and S2906).

Next, the diagnostic value information converter 652 for each unit reads the symptom determination index value Fn of the image forming unit n, and assigns the symptom determination index value Fn to variable Ln (step S2907). Then, the diagnostic value information converter 652 for each unit determines whether or not the variable Ln is larger than zero (step S2908).

If the variable Ln (the symptom determination index value Fn) is larger than zero (YES at step S2908), the diagnostic value information converter 652 for each unit converts the symptom determination index value Fn of the image forming unit n by the following formula, $$Mn = Ln \times (\text{"positive MAX value"}/\text{DnMAX value}),$$

and stores a symptom determination index value Mn after the conversion in the diagnostic value information storage unit 658 for each unit as diagnostic value information (step S2909).

On the other hand, if the variable Ln (the symptom determination index value Fn) is less than zero (NO at step S2908), the diagnostic value information converter 652 for each unit converts the symptom determination index value Fn of the image forming unit n by the following formula, $$Mn = Ln \times (\text{"negative MIN value"}/\text{DnMIN value}),$$

and stores the symptom determination index value Mn after the conversion in the diagnostic value information storage unit 658 for each unit as diagnostic value information (step S2910).

After performing processing as described above, the diagnostic value information converter 652 for each unit determines whether the symptom determination index values Fn of all of the image forming units have been read (step S2911), and if they have not been read yet (NO at step S2911), the diagnostic value information converter 652 for each unit performs step S2904 to step S2910 until the symptom determination index values Fn of all of the image forming units are read. The symptom determination index value of each image forming unit is converted by the processing performed in this way, the ranges of the variations for the symptom determination index values (after the conversion) of the image forming units are equalized with each other.

The processing of FIGS. 28 and 29 is performed every time when status data collected under a particular condition (e.g., every 1000 sheets) is acquired and subjected to the symptom determination.

With the progress of the processing in FIGS. 28 and 29, the symptom determination index values are converted in the order illustrated in FIG. 30A, 30B, and 30C. The symptom index value table is updated at step S73 and step S74 of FIG. 18 as illustrated in FIG. 30A: "the apparatus identifier=L36, the product serial number=111111, and the symptom determination date-time=2010/03/01 10:25:10"; and the symptom determination index values of the image forming units are "photosensitive element (Y)=5", "photosensitive element (M)=−2", "photosensitive element (C)=3", etc.

The diagnostic value information delivery unit 651 for each unit receives status data every 1000 sheets, for example, and calculates symptom determination index values, and the diagnostic value information converter 652 for each unit performs the processing of FIG. 28. As a result, the "symptom determination index value table=Dn" temporarily stored is used to update the conversion table at every receiving of status data. Specifically, the conversion table of FIG. 30B is updated based on the data of FIG. 30A. The data conversion to the data of FIG. 30B may be performed by the diagnostic value information delivery unit 651 for each unit.

The conversion table of FIG. 30B is produced and stored for each apparatus identifier. The diagnostic value information converter 652 for each unit performs conversion processing illustrated in FIG. 29 on the data of FIG. 30A read by the diagnostic value information delivery unit 651 for each unit by using the conversion table of FIG. 30B. The diagnostic value information converter 652 for each unit stores the symptom determination index values (diagnostic value information) after the conversion illustrated in FIG. 30C in the diagnostic value information storage unit 658 for each unit.

The latest symptom determination index values stored in the diagnostic value information storage unit 658 for each unit, at the time when a maintenance person requests diagnosing, are obtained based on the status data of the apparatus at the time. The symptom determination index values are significantly influenced by the replacement of consumable replacement parts (image forming units) of the apparatus. As described above, if a consumable replacement part is replaced with a new part, a residual toner collection amount is changed, for example. As a result, the status data is changed, resulting in the symptom determination index value being also changed.

When a maintenance person requests diagnosing to the management apparatus 630, the management apparatus 630 needs to correct the information with replacement part information and date or time of replacement of the replaced part (image forming unit), and the total counter (the cumulative number of image printouts) of the maintenance management system 680, and provide the corrected information to the maintenance person because the management apparatus 630 performing symptom determination and the maintenance management system 680 distinctive of each company are not synchronized with each other.

When performing a maintenance operation of a customer's apparatus, a maintenance person prepares a maintenance report describing the maintenance work (replaced part (image forming unit) information, cleaned and inspected items), reports to the customer, and inputs the contents of the maintenance report in the maintenance management system 680 distinctive of each company after returning to his or her office so as to be utilized in the next maintenance management operation. The input contents of the maintenance report are stored in the maintenance management system 680 as replacement part information.

FIG. 31 schematically illustrates maintenance management operation and maintenance reporting.

The symptom determination index values provided by the management apparatus 630 is influenced by the replaced image forming functional unit whose data stored in the maintenance management system 680 that is not synchronized with the management apparatus 630. Therefore, when receiving a diagnosis request from a maintenance person, the diagnosis request information reception unit 654 transmits the requested information (apparatus identifier (apparatus type identifier+product serial number information) to the integrated diagnostic information generator 653. The replacement part information acquisition unit 655 acquires replacement part information (information of the image forming functional unit) of the apparatus identifier and replacement date information for past two weeks from the maintenance request date from the maintenance management system 680 based on the apparatus identifier (apparatus type identifier+product serial number information). The period is not limited to past two weeks. Any period can be designated, such as past one week.

The weighting judgment table generator 656 for each replacement part information corrects the acquired replacement part information and the replacement date information according to the judgment table, and transmits the corrected replacement part information to the integrated diagnostic information generator 653.

The integrated diagnostic information generator 653 combines the corrected replacement part information and the symptom determination index value of each unit stored in the diagnostic value information storage unit 658 for each unit. The total diagnosed result information notification unit 657 transmits, to the PC 690 of the maintenance person who requested the diagnostic information, the combined value of the corrected replacement part information and the symptom determination index value of each unit stored in the diagnostic value information storage unit 658 for each unit as integrated diagnostic value information.

Figure 32:
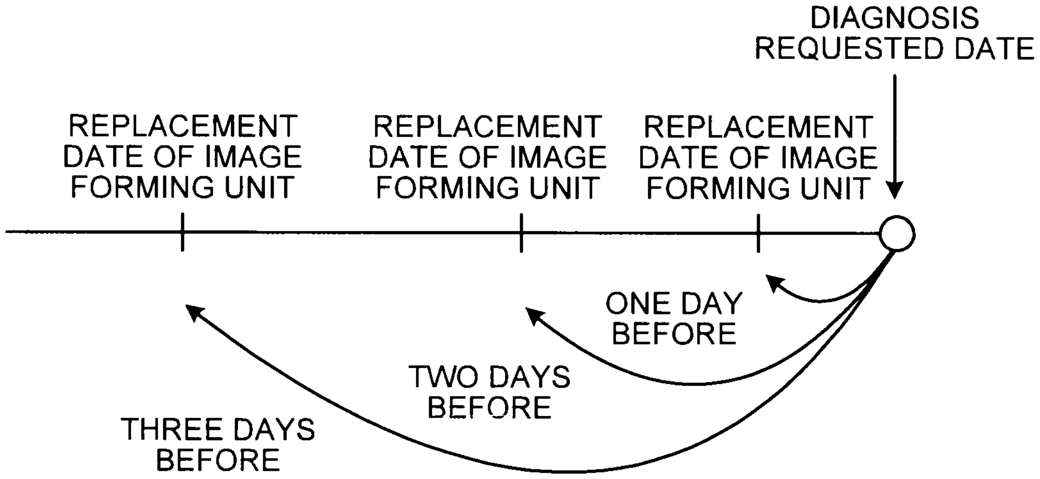
FIG. 32 is a schematic diagram illustrating a weighting determination table for each of replacement parts and an idea of weighting in relation thereto.

FIG. 32 is a schematic illustrating an idea of weighting in relation to the weighting determination table of the replaced parts. A higher value of the weight is assigned to the replacement part information for a longer time period from the replacement date to the diagnosis request date.

Figure 33:
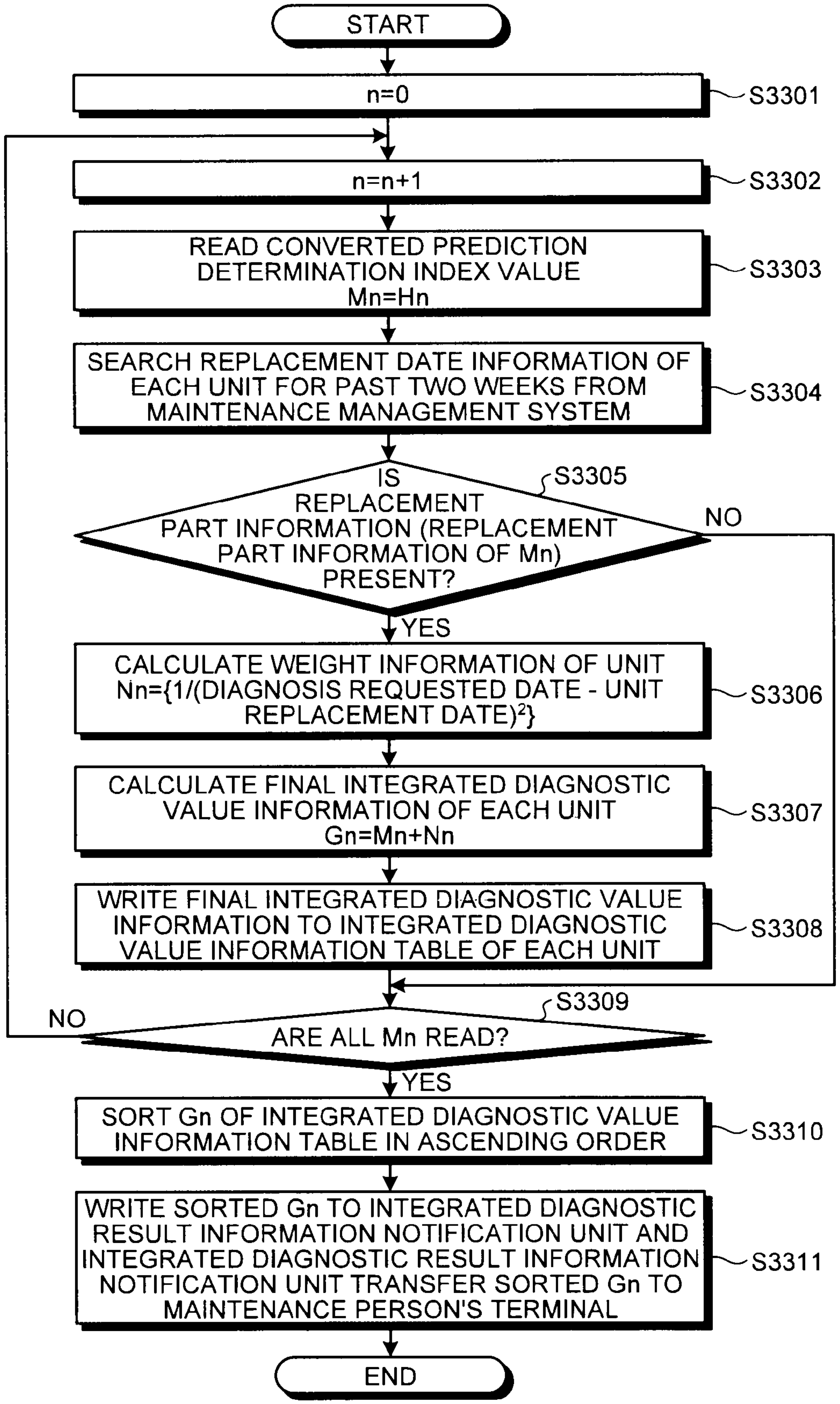
FIG. 33 is a flowchart illustrating a procedure of generation processing of integrated diagnostic value information.

FIG. 33 is a flowchart illustrating a procedure of generation processing of integrated diagnostic value information. The integrated diagnostic information generator 653 initializes a variable n indicating an image forming unit to zero (step S3301). Then, the integrated diagnostic information generator 653 increments the variable n by one (step S3302), and reads a symptom determination index value (diagnostic value information) Hn after conversion, and assigns the Hn to a variable Mn (step S3303).

Then, the integrated diagnostic information generator 653 reads replacement date information of each image forming unit for past two weeks counted from the present time from the maintenance management system 680 (step S3304), and examines whether or not the replacement part information of the Mn is present (step S3305). If the replacement part information of the Mn is present (YES at step S3305), the integrated diagnostic information generator 653 calculates a weight value Nn of the image forming unit by using a difference (diagnosis request date−replacement date of image forming unit) with the following formula (step S3306).

$$Nn=f[1/(\text{diagnosis request date}-\text{replacement date of image forming unit})^2]$$

In the embodiment, the difference (diagnosis request date−replacement date of image forming unit) is squared in the above formula. However, the difference may be raised to the first power or the nth power (n≧3). When an inverse of a subtraction between two positive values is used for a correction value, the correction value may become too large if the two values are rather close to each other. Therefore, it is preferable to use a square of the inverse so as to keep the correction value in an appropriate range.

In the embodiment, date information obtained from the diagnosis request date and the replacement date of the image forming unit is used as the correction value. In the image forming apparatus, a "standard number of sheets for replacement" is specified for each image forming unit so as to replace a consumable part before the occurrence of a failure based on reliability test results of the consumable part. The number of sheets used up to the present time of each image forming unit is included, as the information of each unit, in the status information transmitted for every 1000 output sheets. Using the information, the weight value Nn of the image forming unit may be calculated by the following formula.

$$Nn=[(\text{standard number of sheets for replacement of each image forming unit}-\text{the number of used sheets of each image forming unit})/\text{standard number of sheets for replacement of each image forming unit}]^2$$

Referring back to FIG. 33, the integrated diagnostic information generator 653 calculates final integrated diagnostic value information Gn for each image forming unit according to the next equation (step S3307).

$$\text{Integrated diagnostic value information } Gn \text{ for each image forming unit}=\text{symptom determination index value } Mn \text{ after conversion}+\text{weight value } Nn$$

Then, the integrated diagnostic information generator 653 writes the final integrated diagnostic value information Gn to a integrated diagnostic value information table of each image forming unit (step S3308).

On the other hand, if the replacement part information of the Mn is absent (NO at step S3305), the integrated diagnostic information generator 653 skips step S3306 to step S3308.

After performing processing as described above, the integrated diagnostic information generator 653 determines whether or not the diagnostic value information (symptom determination index value after conversion) Mn of all of the image forming units have been read (step S3309), and if they have not been read yet (NO at step S3309), the integrated diagnostic information generator 653 performs step S3302 to step S3308 until the diagnostic value information Mn of all of the image forming units are read.

If the diagnostic value information (symptom determination index value after conversion) Mn of all of the image forming units have been read (YES at step S3309), the integrated diagnostic information generator 653 sorts the integrated diagnostic value information Gn of the integrated diagnostic value information table in ascending order (step S3310). The total diagnosed result information notification unit 657 transmits the sorted integrated diagnostic value information Gn to the PC 690 of the maintenance person.

In the embodiment, estimated value information of failure prediction of each image forming unit up to the maintenance time can be displayed to a maintenance person in the order from high priority to realize the failure prediction based on information obtained by combining estimated value information of failure prediction, at the maintenance time of each image forming unit, obtained from status data, such as image control voltages, collected every fixed number of printouts (time) from apparatus, maintenance operation information (replacement part information), and a day entry. When urgently requested to address a failure, the maintenance person can find the root cause with simple operation, so that customers' apparatuses can be consistently maintained at good conditions. Consequently, reliability of judgment of symptom of likely occurrence of abnormality is improved and the root cause of the failure can be accurately estimated with reduced processing load.

Second Embodiment

The hardware of a management system of a second embodiment is the same as that of the first embodiment. The management apparatus 630 of the second embodiment performs the following operation with dialog and cooperation with an operator who manages the management apparatus 630 through the computer PCa, when a symptom of an abnormality notified from a copying machine is not determined that abnormality occurrence symptom is present based on part or all of the 31 types of target data produced in the first embodiment. The management apparatus 630 produces the reference value b and the weight α that are used in the tendency determination (first determination) and the symptom determination (second determination) for detecting (determining) the symptom of the abnormality by the above-described symptom determination reference table generation processing based on the status data collected from the copying machines of the same type as the copying machine and stored in the status database 632. The management apparatus 630 produces an additional abnormality occurrence symptom determination including processing of an additional symptom determination reference table including the produced values, the tendency determination of the target data using the additional symptom determination reference table (first determination) and the weighted majority decision and the symptom determination (second determination), and a display of the correspondence between the symptom and the determination result. Then, the management apparatus 630 adds the additional abnormality occurrence symptom determination to the inference engine. The inference engine produces a target data group. Afterward, the abnormality occurrence symptom determinations 1 to n of the first embodiment and the additional abnormality occurrence symptom determination are performed as serial processing. The other structures and functions of the second embodiment are the same as those of the first embodiment.

Third Embodiment

The hardware of a management system of a third embodiment is the same as that of the first embodiment. In addition to the status data for producing the 31 types of target data, the management apparatus 630 of the third embodiment produces an abnormality occurrence symptom determination that refers to other status data. More specifically, the management apparatus 630 performs the following operation with dialog and cooperation with an operator who manages the management apparatus 630 through the computer PCa, when a symptom of an abnormality notified from a copying machine can not be determined that abnormality occurrence symptom is present. The management apparatus 630 calculates part or all of the 31 types of target data produced in the first embodiment and additional several types of target data based on status data excluding the 31 types of data based on the status data collected from the copying machines of the same type as the copying machine in the status database 632. The management apparatus 630 produces a new target data group, the reference value b, and the weight α that are used for determining the symptom of the abnormality by the above-described symptom determination reference table generation processing. The management apparatus 630 produces an additional abnormality occurrence symptom determination including processing of an additional symptom determination reference table including the produced values, the tendency determination of the target data using the additional symptom determination reference table (first determination) and the weighted majority decision and the symptom determination (second determination), and a display of the correspondence between the symptom and the determination result. Then, the management apparatus 630 adds the additional abnormality occurrence symptom determination to the inference engine. The "target data generation" at step S32 of the existing "abnormality occurrence symptom determination" PAD is rewritten in the same manner as above such that the target data relating to the status data newly added in the additional abnormality occurrence determination is calculated at step S32.

After the additional abnormality occurrence symptom determination is added, the target data group is calculated (step S32). The abnormality occurrence symptom determinations 1 to n of the first embodiment and the additional abnormality occurrence symptom determination are performed as serial processing. The other structures and functions of the third embodiment are the same as those of the first embodiment.

In the embodiments, one set of the inference engine for failure symptom determination includes the feature amount calculator 633, the feature amount memory 634, the abnormality occurrence symptom determiner 635, and the constant database 636, and performs the abnormality occurrence symptom determinations 1 to n as serial processing (sequentially). The number of inference engines is not limited to one. N sets of the inference engine for failure symptom determination performing the respective abnormality occurrence symptom determinations 1 to n, and backup inference engines, if necessary, may be further provided, and the n sets of the inference engine for failure symptom determination may be operated in parallel and simultaneously.

The present invention can improve reliability of judgment of symptom of likely occurrence of abnormality, and accurately estimate the root cause of the failure with reduced processing load.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A management apparatus, comprising:

a receiver that is connected to a network and receives a plurality of pieces of status data based on control system data for stabilizing image forming from an image forming apparatus forming an image by a plurality of image forming units operating in conjunction with each other;

an inference unit that determines abnormality occurrence symptom of each of the image forming units based on the plurality of pieces of received status data, and calculates a symptom determination index value representing an index of the abnormality occurrence symptom of each of the image forming units;

a replacement part information acquisition unit that acquires, when receiving a diagnosis request from a terminal of a maintenance person maintaining the image forming apparatus, replacement part information including a replacement date of the image forming unit from a maintenance management system connected to the network;

a judgment table generator that calculates weight information with respect to the symptom determination index value based on the acquired replacement part information;

a integrated diagnostic information generator that calculates integrated diagnostic value information for each image forming unit based on the symptom determination index value and the weight information; and a integrated diagnostic information notification unit that transmits the integrated diagnostic value information to the terminal of the maintenance person.

2. The management apparatus according to claim 1, wherein the integrated diagnostic information generator obtains the integrated diagnostic value information for each of the image forming units, and sorts a plurality of pieces of the integrated diagnostic value information in accordance with a priority based on the symptom determination index value, and the integrated diagnostic information notification unit transmits the plurality of pieces of sorted integrated diagnostic value information to the terminal of the maintenance person.

3. The management apparatus according to claim 2, wherein the integrated diagnostic information generator sorts the pieces of integrated diagnostic value information in such a priority order that the integrated diagnostic value information having a lower value has a higher priority.

4. The management apparatus according to claim 1, wherein the judgment table generator calculates the weight information with respect to the symptom determination index value based on the acquired replacement date included in the replacement part information and a received date and time of the status data.

5. The management apparatus according to claim 4, wherein the judgment table generator calculates the weight information having a higher value for a longer time period from the acquired replacement date in the replacement part information to the received date and time of the status data.

6. The management apparatus according to claim 1, further comprising a diagnostic value information converter that converts the symptom determination index value of each of the image forming units based on a maximum value and a minimum value of the symptom determination index value of each of the image forming units and the symptom determination index value of past maintenance, wherein the integrated diagnostic information generator generates the integrated diagnostic value information based on the converted symptom determination index value.

7. The management apparatus according to claim 1, wherein the inference unit includes:

a first determination unit that determines whether the plurality of pieces of target data are equal to or smaller than reference values each set for a corresponding image forming unit; and a second determination unit that determines abnormality occurrence symptom of each of the image forming units by majority decision by weighting a determination result of the first determination unit for the pieces of status data for each of the information units with a weight set for each piece of status data to calculate the symptom determination index value.

8. A management system, comprising:

a plurality of image forming apparatuses; and a management apparatus connected to the image forming apparatuses with a network, wherein each of the image forming apparatuses includes a transmitter that transmits a plurality of pieces of status data based on control system data for stabilizing image forming to the management apparatus, and the management apparatus includes:

a receiver that receives the pieces of status data;

an inference unit that determines abnormality occurrence symptom of each of the plurality of image forming apparatuses based on the pieces of received status data, and calculates a symptom determination index value representing an index of the abnormality occurrence symptom of each of the image forming apparatuses;

a replacement part information acquisition unit that acquires, when receiving a diagnosis request from a terminal of a maintenance person maintaining the image forming apparatus, replacement part information including a replacement date of each of the image forming apparatuses from a maintenance management system connected to the network;

a judgment table generator that calculates weight information with respect to the symptom determination index value based on the acquired replacement part information;

a integrated diagnostic information generator that calculates integrated diagnostic value information for each of the image forming apparatuses based on the symptom determination index value and the weight information; and a integrated diagnostic information notification unit that transmits the integrated diagnostic value information to the terminal of the maintenance person.

9. A management method performed by a management apparatus, the method comprising:

receiving a plurality of pieces of status data based on control system data for stabilizing image forming from an image forming apparatus forming an image by a plurality of image forming units operating in conjunction with each other through a network with which the image forming apparatus is connected;

determining abnormality occurrence symptom of each of the image forming units based on the pieces of received status data, and calculating a symptom determination index value representing an index of the abnormality occurrence symptom of each of the image forming units;

acquiring, when receiving a diagnosis request from a terminal of a maintenance person maintaining the image forming apparatus, replacement part information including a replacement date of the image forming unit from a maintenance management system connected to a network;

calculating weight information with respect to the symptom determination index value based on the acquired replacement part information;

calculating integrated diagnostic value information for each image forming unit based on the symptom determination index value and the weight information; and transmitting the integrated diagnostic value information to the terminal of the maintenance person.

* * * * *